United States Patent
Greenhill et al.

(10) Patent No.: US 11,718,067 B2
(45) Date of Patent: *Aug. 8, 2023

(54) COMPOSITE MATERIAL

(71) Applicant: Greenhill AntiBallistics Corporation, New York, NY (US)

(72) Inventors: Zachary R. Greenhill, Rye, NY (US); Joseph J. Belbruno, Hanover, NH (US); Yuval Avniel, Missoula, MT (US)

(73) Assignee: Greenhill Antiballistics Corporation, Davidson, NC (US)

( * ) Notice: Subject to any disclaimer, the term of this patent is extended or adjusted under 35 U.S.C. 154(b) by 424 days.

This patent is subject to a terminal disclaimer.

(21) Appl. No.: 14/720,374

(22) Filed: May 22, 2015

(65) Prior Publication Data

US 2016/0159033 A1 Jun. 9, 2016
US 2021/0086475 A9 Mar. 25, 2021

Related U.S. Application Data

(63) Continuation of application No. 12/672,865, filed as application No. PCT/US2009/053462 on Aug. 11, (Continued)

(51) Int. Cl.
*B32B 5/30* (2006.01)
*B32B 5/16* (2006.01)
(Continued)

(52) U.S. Cl.
CPC .................. *B32B 5/30* (2013.01); *A42B 3/12* (2013.01); *B32B 1/00* (2013.01); *B32B 1/08* (2013.01);
(Continued)

(58) Field of Classification Search
CPC ........... Y10T 428/25; B32B 5/16; B32B 5/22; B32B 5/30; B32B 2250/42;
(Continued)

(56) References Cited

U.S. PATENT DOCUMENTS 2,978,584 A 4/1961 Loconti et al.
3,485,658 A 12/1969 Iler
(Continued)

FOREIGN PATENT DOCUMENTS

DE 3404272 10/1987
DE 3936991 10/1990
(Continued)

OTHER PUBLICATIONS

Shevchenko, Structural diversity in binary nanoparticle superlattices, 2006, Nature, vol. 439, pp. 55-59. (Year: 2006).*
(Continued)

*Primary Examiner* — Monique R Jackson
(74) *Attorney, Agent, or Firm* — Elevated IP, LLC

(57) ABSTRACT

Disclosed herein are engineered composite materials suitable for applications that can benefit from a composite material capable of interacting with or responding to, in a controlled or pre-determined manner, changes in its surrounding environment, such as to attenuate a compression wave. The composite material generally includes a plurality of repeating units, with each repeating unit including a first layer of particles having a first mean diameter, and a second layer of particles having a second mean diameter, and an intermediary material that allows mobility of and contact between the first particles within the first layer and mobility of and contact between the second particles within the second layer; the contact allowing momentum transfer between the particles. The first mean diameter and second mean diameter are different and are less than 500 nm. The first or second particles may be core-shell particles having a core that is partly or completely filled with a liquid, a gas and/or a gel, such as a fire suppressant, a medically active agent or a dye.

19 Claims, 21 Drawing Sheets

Related U.S. Application Data 2009, now Pat. No. 9,060,560, which is a continuation-in-part of application No. PCT/US2008/072808, filed on Aug. 11, 2008, said application No. 12/672,865 is a continuation-in-part of application No. PCT/US2009/053465, filed on Aug. 11, 2009, which is a continuation-in-part of application No. PCT/US2008/072808, filed on Aug. 11, 2008.

(60) Provisional application No. 61/153,539, filed on Feb. 18, 2009, provisional application No. 61/031,913, filed on Feb. 27, 2008, provisional application No. 60/955,335, filed on Aug. 10, 2007.

(51) Int. Cl.
| | |
|---|---|
| *F41H 5/04* | (2006.01) |
| *F42D 5/045* | (2006.01) |
| *B32B 27/40* | (2006.01) |
| *B32B 27/30* | (2006.01) |
| *B32B 27/36* | (2006.01) |
| *B32B 27/42* | (2006.01) |
| *B32B 1/00* | (2006.01) |
| *B32B 1/08* | (2006.01) |
| *B32B 27/38* | (2006.01) |
| *A42B 3/12* | (2006.01) |

(52) U.S. Cl.
CPC ............... *B32B 5/16* (2013.01); *B32B 27/30* (2013.01); *B32B 27/302* (2013.01); *B32B 27/36* (2013.01); *B32B 27/365* (2013.01); *B32B 27/38* (2013.01); *B32B 27/40* (2013.01); *B32B 27/42* (2013.01); *F41H 5/0492* (2013.01); *F42D 5/045* (2013.01); *B32B 2307/306* (2013.01); *B32B 2307/3065* (2013.01); *B32B 2307/41* (2013.01); *B32B 2307/412* (2013.01); *B32B 2307/56* (2013.01); *B32B 2307/7265* (2013.01); *B32B 2307/73* (2013.01); *B32B 2457/00* (2013.01); *B32B 2571/00* (2013.01); *B32B 2605/00* (2013.01); *Y10T 428/249971* (2015.04); *Y10T 428/249997* (2015.04); *Y10T 428/25* (2015.01); *Y10T 428/254* (2015.01); *Y10T 428/259* (2015.01)

(58) Field of Classification Search
CPC ... B32B 2250/226; F41H 5/0492; F41H 5/04; A63B 71/10; A42B 3/12; F42D 5/045
See application file for complete search history.

(56) References Cited

U.S. PATENT DOCUMENTS

| | | | |
|---|---|---|---|
| 4,014,926 A | 3/1977 | Dear et al. | |
| 4,090,967 A | 5/1978 | Falk | |
| 4,179,979 A | 12/1979 | Cook et al. | |
| 4,186,648 A | 2/1980 | Clausen et al. | |
| 4,585,685 A | 4/1986 | Forry et al. | |
| 4,719,151 A | 1/1988 | Chyung et al. | |
| 5,540,951 A | 7/1996 | Nahayama et al. | |
| 5,635,288 A | 6/1997 | Park | |
| 5,747,152 A | 5/1998 | Oka et al. | |
| 5,762,841 A | 6/1998 | Shimai et al. | |
| 5,834,101 A | 11/1998 | Hayashi | |
| 5,942,015 A | 8/1999 | Culler et al. | |
| 6,028,020 A | 2/2000 | Tanaka et al. | |
| 6,225,246 B1 | 5/2001 | Darcovich | |
| 6,537,654 B1 | 3/2003 | Gruber et al. | |
| 6,832,735 B2 | 12/2004 | Yadav et al. | |
| 7,002,754 B2 | 2/2006 | Baer et al. | |
| 7,268,364 B2 | 9/2007 | Aculon | |
| 7,471,503 B2 | 12/2008 | Aculon et al. | |
| 7,549,366 B2 | 6/2009 | Park et al. | |
| 7,625,149 B2 | 12/2009 | Aculon | |
| 7,685,922 B1 | 3/2010 | Martin et al. | |
| 7,691,478 B2 | 4/2010 | Aculon | |
| 7,740,940 B2 | 6/2010 | Aculon | |
| 7,832,023 B2 | 11/2010 | Crisco | |
| 7,879,437 B2 | 2/2011 | Aculon | |
| 7,901,777 B2 | 3/2011 | Aculon | |
| 7,989,069 B2 | 8/2011 | Aculon | |
| 8,025,974 B2 | 9/2011 | Aculon | |
| 8,048,487 B2 | 11/2011 | Aculon | |
| 8,053,081 B2 | 11/2011 | Aculon | |
| 8,067,103 B2 | 11/2011 | Aculon | |
| 8,178,004 B2 | 5/2012 | Aculon | |
| 8,236,426 B2 | 8/2012 | Aculon | |
| 9,060,560 B2 | 6/2015 | Greenhill et al. | |
| 9,328,788 B2 | 5/2016 | Greenhill et al. | |
| 9,982,736 B2 | 5/2018 | Greenhill et al. | |
| 10,926,513 B2 | 2/2021 | Greenhill et al. | |
| 10,954,167 B1 | 3/2021 | Garnier et al. | |
| 2002/0118435 A1* | 8/2002 | Foulger ............ G01N 33/54313 359/265 |
| 2003/0031438 A1 | 2/2003 | Kambe et al. | |
| 2003/0044543 A1 | 3/2003 | Okamoto | |
| 2003/0122111 A1 | 7/2003 | Glatkowski | |
| 2004/0007702 A1 | 1/2004 | Avniel et al. | |
| 2004/0038007 A1 | 2/2004 | Kotov et al. | |
| 2004/0071422 A1 | 4/2004 | Aylward et al. | |
| 2004/0247808 A1 | 12/2004 | Cooper et al. | |
| 2005/0066805 A1 | 3/2005 | Park et al. | |
| 2005/0158551 A1 | 7/2005 | Rhoads et al. | |
| 2005/0159001 A1 | 7/2005 | Kim et al. | |
| 2005/0189014 A1 | 9/2005 | Gaudiana et al. | |
| 2006/0011054 A1 | 1/2006 | Walthall et al. | |
| 2006/0286883 A1 | 12/2006 | Brown et al. | |
| 2007/0003753 A1 | 1/2007 | Asgari | |
| 2007/0220662 A1 | 9/2007 | Pierce | |
| 2007/0293107 A1 | 12/2007 | Folio et al. | |
| 2007/0295242 A1 | 12/2007 | Shim et al. | |
| 2008/0108122 A1 | 5/2008 | Paul et al. | |
| 2008/0131709 A1 | 6/2008 | Hanson et al. | |
| 2008/0286559 A1 | 11/2008 | Lee et al. | |
| 2009/0087644 A1 | 4/2009 | Supriya et al. | |
| 2009/0130425 A1 | 5/2009 | Whitaker | |
| 2009/0217812 A1* | 9/2009 | Whitaker ............... F41H 5/0421 89/36.02 |
| 2009/0314350 A1 | 12/2009 | Jung et al. | |
| 2009/0324910 A1 | 12/2009 | Gemici et al. | |
| 2010/0012004 A1 | 1/2010 | Telander | |
| 2010/0178512 A1 | 7/2010 | Giesenberg et al. | |
| 2010/0215985 A1 | 8/2010 | Kitano | |
| 2011/0091729 A1 | 4/2011 | Hanson | |
| 2011/0168003 A1 | 7/2011 | Kim | |
| 2011/0192274 A1 | 8/2011 | Fingerhut | |
| 2011/0195246 A1 | 8/2011 | Hanson et al. | |
| 2011/0198113 A1 | 8/2011 | Hanson | |
| 2011/0212320 A1 | 9/2011 | Greenhill et al. | |
| 2011/0314997 A1 | 12/2011 | Carberry et al. | |
| 2012/0003481 A1 | 1/2012 | Hanson | |
| 2012/0004388 A1 | 1/2012 | Hanson | |
| 2012/0088036 A1 | 4/2012 | Greenhill et al. | |
| 2012/0291620 A1 | 11/2012 | Yeshurun | |
| 2013/0006205 A1 | 1/2013 | McKiernan et al. | |
| 2013/0126146 A1 | 5/2013 | Chiang | |
| 2013/0273273 A1 | 10/2013 | Greenhill et al. | |
| 2014/0023805 A1 | 1/2014 | Greenhill et al. | |
| 2014/0099472 A1 | 4/2014 | Greenhill et al. | |
| 2014/0113086 A1 | 4/2014 | Greenhill et al. | |
| 2015/0194713 A1 | 7/2015 | Jin et al. | |
| 2015/0237929 A1 | 8/2015 | Greenhill et al. | |
| 2016/0071655 A1 | 3/2016 | Li et al. | |
| 2019/0115278 A1 | 4/2019 | Greenhill | |
| 2019/0128357 A1 | 5/2019 | Greenhill et al. | |

(56) References Cited

U.S. PATENT DOCUMENTS

| | | |
|---|---|---|
| 2021/0115211 A1 | 4/2021 | Allain et al. |
| 2021/0269366 A1 | 9/2021 | Garnier et al. |

FOREIGN PATENT DOCUMENTS

| | | |
|---|---|---|
| DE | 10107340 | 8/2002 |
| DE | 10305405 | 8/2004 |
| GB | 2365750 A | 2/2002 |
| JP | 2001129906 | 5/2001 |
| JP | 2001-192275 | 7/2001 |
| JP | 03-224577 | 10/2001 |
| JP | 2008-169935 | 7/2008 |
| JP | 2015-052095 | 3/2015 |
| WO | WO-2003/025493 | 3/2003 |
| WO | WO-2008/054867 | 5/2008 |
| WO | WO 2009/058453 | 5/2009 |
| WO | WO-2009/058453 | 5/2009 |
| WO | WO-2009/143405 | 11/2009 |
| WO | WO 2010/019609 | 2/2010 |
| WO | WO-2010/019609 | 2/2010 |
| WO | WO 2010/019612 | 2/2010 |
| WO | WO-2010/019612 | 2/2010 |
| WO | WO 2012/054472 | 4/2012 |
| WO | WO-2012/054472 | 4/2012 |
| WO | WO-2014/008031 | 1/2014 |
| WO | WO 2014/008031 | 1/2014 |
| WO | WO-2014/197082 | 12/2014 |
| WO | WO 2014/197082 | 12/2014 |
| WO | WO-2017/177040 | 10/2017 |

OTHER PUBLICATIONS

Sunkara, Solidification of Colloidal Crystals of Silica, 1995, Hybrid Organic-Inorganic Composites, Chapter 14, ACS Symposium Series, pp. 181-191. (Year: 1995).*
Sigalas, Classical vibrational modes in phononic lattices: theory and experiment, 2005, Z. Kristallogr. Vol. 220, pp. 765-809. (Year: 2005).*
Shevchenko, Structural Characterization of Self-Assembled Multifunctional Binary Nanoparticle Superlattices, 2006, J. Am. Chem. Soc., vol. 128, pp. 3620-3637. (Year: 2006).*
Wang, Self-Assembly of Two- and Three-Dimensional Particle Arrays by Manipulating the Hydrophobicity of Silica Nanospheres, 2005, J. Phys. Chem. B, vol. 109, pp. 22175-22180. (Year: 2005).*
Bertoldi, Mechanics of deformation-triggered pattern transformations and superelastic behavior in periodic elastomeric structures, 2008, Journal of the Mechanics and Physics of Solids vol. 56, pp. 2642-2668. (Year: 2008).*
Bertoldi, Mechanically triggered transformations of phononic band gaps in periodic elastomeric structures, 2008, Physical Review B vol. 77, 052105. (Year: 2008).*
Bertoldi, Wave propagation and instabilities in monolithic and periodically structured elastomeric materials undergoing large deformations, 2008, Physical Review B vol. 78, 184017. (Year: 2008).*
Kinge, Self-Assembling Nanoparticles at Surfaces and Interfaces, 2008, ChemPhysChem, vol. 9, pp. 20-42. (Year: 2008).*
Lvov, Alternate Assembly of Ordered Multilayers of SiO2 and Other Nanoparticles and Polyions, 1997, Langmuir, vol. 13, pp. 6195-6203. (Year: 1997).*
Ling, Supramolecular Layer-by-Layer Assembly of 3D Multicomponent Nanostructures via Multivalent Molecular Recognition, Apr. 2008, International Journal of Molecular Sciences, vol. 9, pp. 486-497. (Year: 2008).*
Shipway, Nanoparticle Arrays on Surfaces for Electronic, Optical, and Sensor Applications, 2000, ChemPhysChem, vol. 1, pp. 18-52. (Year: 2000).*
In the U.S. Patent and Trademark Office, Office Action in re: U.S. Appl. No. 13/314,472, dated Aug. 8, 2012, 16 pages.
In the U.S. Patent and Trademark Office, Applicant Initiated Interview Summary in re: U.S. Appl. No. 12/672,865, dated Apr. 2, 2014, 7 pages.
In the U.S. Patent and Trademark Office, Office Action in re: U.S. Appl. No. 12/672,865, dated Jan. 16, 2014, 23 pages.
In the U.S. Patent and Trademark Office, Applicant Intitiated Interview Summary in re: U.S. Appl. No. 12/672,865, dated Nov. 28, 2012, 9 pages.
In the U.S. Patent and Trademark Office, Final Office Action in re: U.S. Appl. No. 12/672,865, dated Sep. 27, 2012, 17 pages.
In the U.S. Patent and Trademark Office, Office Action in re: U.S. Appl. No. 12/672,865, dated Mar. 23, 2012, 11 pages.
In the U.S. Patent and Trademark Office, Final Office Action in re: U.S. Appl. No. 12/672,865, dated Jun. 18, 2014, 29 pages.
In the U.S. Patent and Trademark Office, Office Action in re: U.S. Appl. No. 12/672,865, dated Nov. 5, 2014, 68 pages.
In the U.S. Patent and Trademark Office, Applicant Initiated Interview Summary in re: U.S. Appl. No. 12/672,865, dated Oct. 1, 2014, 5 pages.
In the U.S. Patent and Trademark Office, Applicant Initiated Interview Summary in re: U.S. Appl. No. 12/672,865, dated Apr. 8, 2014, 4 pages.
In the U.S. Patent and Trademark Office, Examiner Initiated Interview Summary in re: U.S. Appl. No. 12/672,865, dated Apr. 8, 2014, 1 pages.
In the U.S. Patent and Trademark Office, Notice of Allowance in re: U.S. Appl. No. 12/672,865, dated May 7, 2015, 10 pages.
In the U.S. Patent and Trademark Office, Requirement for Restriction/Election in re: U.S. Appl. No. 14/039,088, dated Feb. 24, 2014, 6 pages.
In the U.S. Patent and Trademark Office, Office Action in re: U.S. Appl. No. 14/039,088, dated May 19, 2014, 33 pages.
In the U.S. Patent and Trademark Office, Final Office Action in re: U.S. Appl. No. 14/039,088, dated Feb. 4, 2015, 38 pages.
In the U.S. Patent and Trademark Office, Office Action in re: U.S. Appl. No. 14/035,531, dated Dec. 30, 2013, 6 pages.
In the U.S. Patent and Trademark Office, Final Office Action in re: U.S. Appl. No. 14/035,531, dated Jul. 9, 2014, 9 pages.
In the U.S. Patent and Trademark Office, Applicant Initiated Interview Summary in re: U.S. Appl. No. 14/035,531, dated Aug. 4, 2014, 3 pages.
In the U.S. Patent and Trademark Office, Examiner Initiated Interview Summary in re: U.S. Appl. No. 14/035,531, dated Oct. 8, 2014, 2 pages.
In the U.S. Patent and Trademark Office, Office Action in re: U.S. Appl. No. 14/035,531, dated Feb. 24, 2015, 12 pages.
Institute of Materials Research and Engineering Media Release, "Body armour and protective sports padding made from cornstarch solution?" Jul. 28, 2010, 4 pages.
U.S. Environmental Protection Agency, "Colorimetric Screening Procedure for RDX and HMX in Soil," EPA Method 8510 [online], Revision 0, Feb. 2007 [retrieved on Jul. 24, 2012]. Retrieved from the Internet: <URL: http://www.caslab.com/EPA-Methods/PDF/EPA-Method-8510.pdf>.
Zhang et al., "Self Cleaning Particle Coating with Anti reflection Properties," *Chem. Mater.*, 2005, 17, pp. 696-700.
International Search Report for related International Application No. PCT/US2008/072808, dated Sep. 17, 2009.
International Search Report for related International Application No. PCT/US2009/053462, dated Oct. 19, 2009.
International Search Report for related International Application No. PCT/US2009/053465, dated Jul. 26, 2010.
International Search Report for related International Application No. PCT/US2011/056696, dated May 8, 2012.
International Search Report for related International Application No. PCT/US2013/047515, dated Nov. 22, 2013.
Supplementary European Search Report for related European Application No. EP 11834986, dated May 2, 2014.
International Search Report for related International Application No. PCT/US14/27822, dated Jan. 27, 2015.
In the U.S. Patent and Trademark Office, Final Office Action in re: U.S. Appl. No. 14/035,531, dated Nov. 19, 2015, 13 pages.
In the U.S. Patent and Trademark Office, Office Action in re: U.S. Appl. No. 13/841,655, dated Nov. 27, 2015, 22 pages.
In the U.S. Patent and Trademark Office, Office Action in re: U.S. Appl. No. 13/880,270, dated Jan. 29, 2016, 7 pages.

(56) References Cited

OTHER PUBLICATIONS

In the U.S. Patent and Trademark Office, Office Action in re: U.S. Appl. No. 14/039,088, dated Oct. 13, 2015, 32 pages.
In the U.S. Patent and Trademark Office, Requirement for Restriction/Election in re: U.S. Appl. No. 13/839,777, dated Sep. 11, 2015, 8 pages.
In the U.S. Patent and Trademark Office, Requirement for Restriction/Election in re: U.S. Appl. No. 13/841,655, dated Jul. 2, 2015, 8 pages.
U.S. Appl. No. 13/839,777, in the U.S. Patent and Trademark Office, Final Office Action dated Oct. 17, 2016, 11 pages.
U.S. Appl. No. 13/839,777, in the U.S. Patent and Trademark Office, Office Action dated Aug. 8, 2017.
U.S. Appl. No. 13/839,777, in the U.S. Patent and Trademark Office, Office Action dated Feb. 11, 2016, 14 pages.
U.S. Appl. No. 13/880,270, in the U.S. Patent and Trademark Office, Final Office Action dated Feb. 26, 2018.
U.S. Appl. No. 13/880,270, in the U.S. Patent and Trademark Office, Final Office Action dated Nov. 3, 2016, 10 pages.
U.S. Appl. No. 13/880,270, in the U.S. Patent and Trademark Office, Office Action dated May 19, 2017.
U.S. Appl. No. 14/039,088, in the U.S. Patent and Trademark Office, Patent Board Decision—Examiner Affirmed dated Aug. 2, 2017.
Advanced Industrial, "Ultra High Temperature Materials," Mar. 2016, [online] [retrieved on Jun. 12, 2017], Retrieved from the Internet: <URL: https://web.archive.org/web/20160329142934/http://www.cncplastics.com/ultrahightemp.php>.
International Search Report and Written Opinion for related International Application No. PCT/US2017/026407, dated Jun. 28, 2017.
Kawakami et al., "Bubble sheet used as impact buffer, heat insulating material, has multiple air bubbles formed on surface of base sheet arranged in mutually crossing fashion along longitudinal direction," Thomson Scientific, week 200145; vol. 2001, Nr: 45.
Leeman et al., "Varve formation and the climatic record in an Alpine proglacial lake: calibrating annually-laminated sediments against hydrological and meteorological data," The Holocene, 1994, 4:1, pp. 1-8.

Weinlick, "Additive Roll-to-Roll Manufacturing Techniques Being Developed," Mar. 2015, [online] [retrieved on Jun. 12, 2017], Retrieved from the Internet: <URL: https://www.beyond.com/articles/additive-roll-to-roll-manufacturing-techniques-being-developed-16933-article.html>.
"Materials & Processes: Resin matrices for composites," CW Composites World: Delivering the Global Composites Market, Mar. 25, 2016. Retrieved from the internet Feb. 13, 2021.
Mangalgiri, "Polymer-matrix composites for high-temperature applications," Defense Science Journal 55(2):175-193, Apr. 2005.
U.S. Appl. No. 61/153,539, filed Feb. 18, 2009, Greenhill et al.
U.S. Appl. No. 61/394,066, filed Oct. 18, 2010, Greenhill et al.
U.S. Appl. No. 61/411,494, filed Nov. 9, 2010, Greenhill et al.
U.S. Appl. No. 61/477,674, filed Apr. 21, 2011, Greenhill et al.
U.S. Appl. No. 61/667,764, filed Jul. 3, 2012, Greenhill et al.
U.S. Appl. No. 62/319,005, filed Apr. 6, 2016, Greenhill Antiballistics Corp.
In the U.S. Patent and Trademark Office, Examiner's Answer to Appeal Brief in re: U.S. Appl. No. 14/039,088, dated Jun. 30, 2016, 35 pages.
In the U.S. Patent and Trademark Office, Notice of Allowance in re: U.S. Appl. No. 14/035,531, dated Mar. 22, 2016, 8 pages.
U.S. Appl. No. 13/839,777, in the U.S. Patent and Trademark Office, Final Office Action dated Jun. 4, 2018.
U.S. Appl. No. 13/839,777, in the U.S. Patent and Trademark Office, Office Action dated Mar. 28, 2019.
U.S. Appl. No. 13/880,270, in the U.S. Patent and Trademark Office, Final Office Action dated Jun. 11, 2019.
U.S. Appl. No. 13/880,270, in the U.S. Patent and Trademark Office, Office Action dated Jan. 2, 2020.
U.S. Appl. No. 13/880,270, in the U.S. Patent and Trademark Office, Office Action dated Sep. 27, 2018.
U.S. Appl. No. 15/992,022, in the U.S. Patent and Trademark Office, Office Action dated Jun. 28, 2019.

* cited by examiner

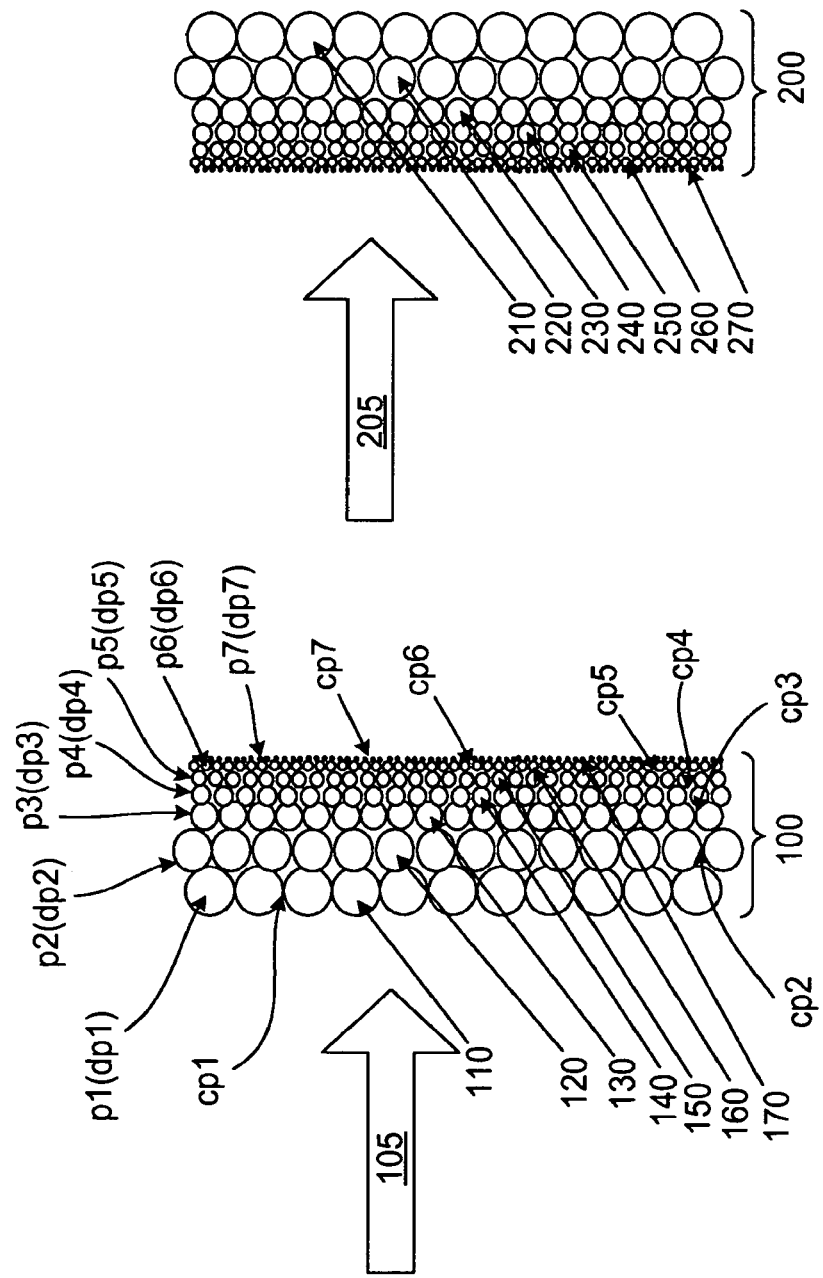

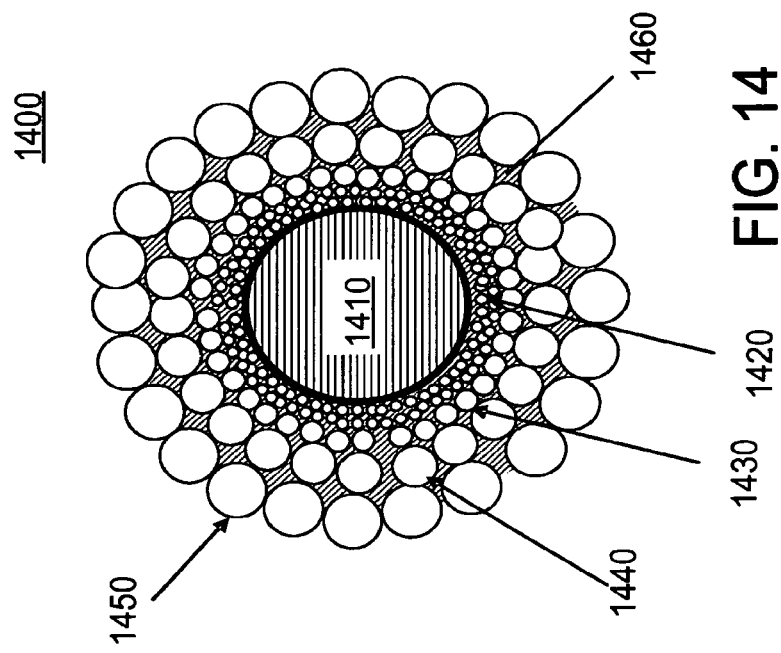
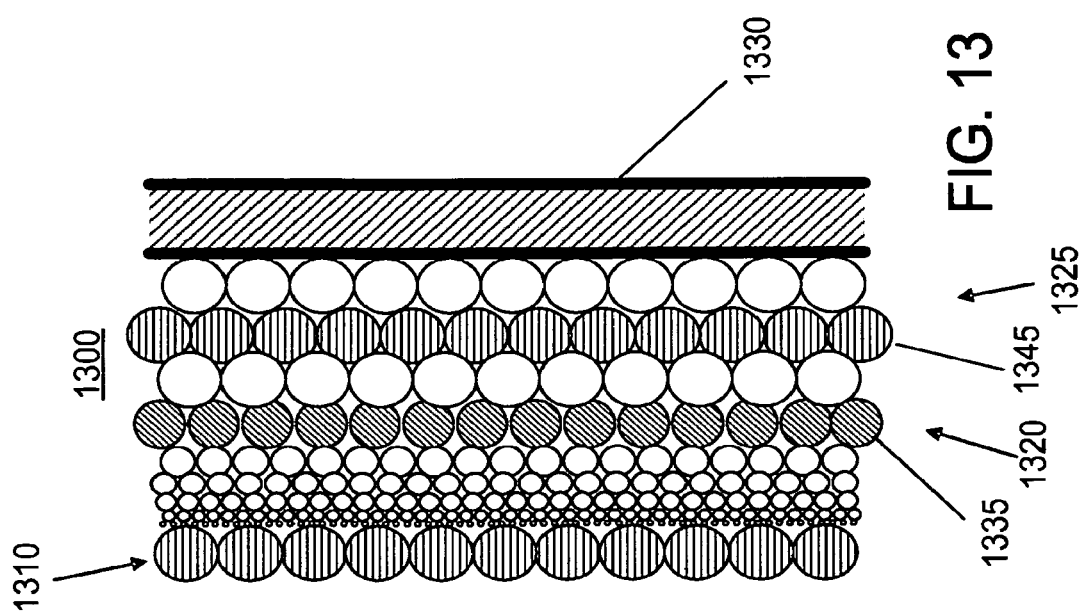

COMPOSITE MATERIAL

CROSS-REFERENCE TO RELATED APPLICATION(S)

This Application is a Continuation of U.S. application Ser. No. 12/672,865 filed on Feb. 9, 2010, now U.S. Pat. No. 9,060,560, which is a National Phase entry of International Application No. PCT/US2009/053462, filed Aug. 11, 2009, which claims the benefit of U.S. Provisional Application 61/153,539 filed on Feb. 18, 2009; and International Application No. PCT/US2009/053462, filed Aug. 11, 2009 is a Continuation-in-part of International Application No. PCT/US2008/072808, filed on Aug. 11, 2008, which claims the benefit of U.S. Provisional Application No. 61/031,913 filed on Feb. 27, 2008 and U.S. Provisional Application 60/955,335 filed on Aug. 10, 2007.

U.S. application Ser. No. 12/672,865 filed on Feb. 9, 2010, now U.S. Pat. No. 9,060,560, is a Continuation-in-part of International Application No. PCT/US2009/053465, filed Aug. 11, 2009, which claims the benefit of U.S. Provisional Application 61/153,539 filed on Feb. 18, 2009; and International Application No. PCT/US2009/053465, filed Aug. 11, 2009 is a Continuation-in-part of International Application No. PCT/US2008/072808, filed on Aug. 11, 2008, which claims the benefit of U.S. Provisional Application No. 61/031,913 filed on Feb. 27, 2008 and U.S. Provisional Application 60/955,335 filed on Aug. 10, 2007.

The contents of each of these applications are incorporated herein by reference in their entirety.

TECHNICAL FIELD

The present invention relates to a composite material and, in particular, to a composite material comprising one or more layers of particles.

BACKGROUND

Material designs for handling the impact of an external stimulus, such as a blast or projectiles, include, for example, woven fabrics, ceramic materials, and composite systems. Kevlar®, Zylon®, Armos®, Spectra® are commercially available fabrics made from high-strength fibers. Another material is ballistic steel, which is comprised of hardened high tensile steel, woven into fiber form. Further, boron carbide can be used as a material, for example, in the production of body armor.

Ceramic materials, in particular ceramic metal composites have found utility in light weight body armor; for examples, the Blast-Tamer wall system from General Plastics Manufacturing Co. (Tacoma, Wash.). The system consists of engineered polyurethane foam panels tied together with adhesive joints and aramid fiber.cord, with the space between the panels filled with sand.

SUMMARY

The invention is based in part on the fact that a composite material with a structure that includes microscale particles that can interact with each other can absorb, distort, and/or redirect a compression wave, such as, e.g., a shock wave accompanying an explosion. The invention is further based in part on the fact that a composite material with a specific gradient layer structure can absorb, distort, and/or redirect a compression wave, such as, e.g., a shock wave accompanying an explosion. The invention is also based in part on the fact that a composite material with core-shell particles can absorb, distort, and/or redirect a compression wave, such as, e.g., a shock wave accompanying an explosion. In general, composite materials (or composites) are engineered materials made from two or more constituent materials (e.g., particles, core-shell particles) with significantly different physical and/or chemical properties that retain their separate and distinct physical and/or chemical identities within the finished structure.

The invention is further based in part on the fact that a composite material with a gradient layer structure comprising particles with varying size arranged to form a gradient of the particle size may provide increased hardness (relative, e.g., to a material not in nanoparticle format) and shock absorbing features when smaller particles form the surface of the composite material or at least an interacting side of the composite material.

The invention is further based in part on the fact that a composite material may provide upon activation specific reactions and/or materials to its environment. For example, the composite material and/or at least one of the materials constituting the composite material can be further designed to mitigate and/or remediate primary and/or secondary effects resulting from the compression wave. Thus, some embodiments of the present invention can provide novel composite materials that through intelligent design of the composition of the materials and a structure within the composite material can not only reduce (mitigate and/or remediate) the impact of a shock wave (primary blast effect) with greater efficiency and efficacy but that can also mitigate and/or remediate one or more secondary blast effects. Moreover, the composite material and/or at least one of the materials constituting the composite material can be, for example, further designed to be activated through a chemical signature in its environment or through a physical condition (e.g., of a compression) wave to change a physical and/or chemical property such as color.

The invention is further based in part on the fact that a composite material may use a compression wave to work against itself to mitigate and/or remediate the primary and secondary effects of the compression wave. Similarly, when an incident shock wave is reflected from the composite material, the reflected shock wave can be distorted. When the incident and reflected shock wave form a combined shock wave, primary and secondary effects of the combined shock wave can be mitigated and/or remediated due to the distortion of the reflected shock wave.

In a first aspect, the invention features multilayer composite materials that include a gradient layer structure of a sequence of at least three gradient-contributing layers of microscale particles, wherein a mean particle size of particles of neighboring gradient-contributing layers in the cross section of the gradient layer structure varies from layer to layer, thereby forming a particle size gradient, and in contact with the gradient layer structure, a densely packed particle structure including densely packed microscale particles, wherein a mean particle size of the densely packed microscale particles does not form a particle size gradient in the cross section of the densely packed particle structure. In another aspect, the invention features methods that include attenuating a compression wave using a composite material.

In another aspect, the invention features liners that include a multilayer composite material.

In another aspect, the invention features receptacle that include a multilayer composite material.

In another aspect, the invention features systems that include a pipe; and a multilayer composite material.

In another aspect, the invention features helmet liner pads that include a multilayer composite material.

In another aspect, the invention features helmets that include a helmet structure and a multilayer composite material.

In another aspect, the invention features textiles that include a multilayer composite material.

In another aspect, the invention features transportation devices that include a body and a multilayer composite material.

In another aspect, the invention features composite materials that include a multilayer composite material, wherein the composite material includes a color changing sensor material.

In another aspect, the invention features safety structure that include a pair of structural elements and a multilayer composite material.

In another aspect, the invention features multilayer composite materials that include a first substrate and a layer structure of a sequence of layers of microscale particles in contact with the substrate at a first face of the layer structure, wherein at least one layer of microscale particles includes core-shell particles, the layer structure includes a region of neighboring layers that form a gradient layer structure such that a mean particle size of particles of the neighboring layers varies along the cross section of the gradient layer structure within a range of particle sizes, and the gradient layer structure forms a second face of the layer structure opposite to the first face of the layer structure with particles having a size at the lower end of the range of particle sizes.

In another aspect, the invention features multilayer composite materials that include a gradient layer structure of a sequence of layers of microscale particles, wherein a mean particle size of particles of neighboring layers in the cross section of the gradient layer structure varies from layer to layer, thereby forming a particle size gradient and at least one of the layers of the gradient layer structure is configured to have a thickness larger than a mean particle size of the particles of the respective layer Embodiments of the aspects can include one or more of the following features.

In the multilayer composite material, a thickness of the gradient layer structure and a thickness of the densely packed particle structure can have a ratio of thickness in the range from 0.1 to 10.

The particles can include at least one particle selected from the group consisting of solid particles and core-shell-particles.

The multilayer composite materials can further comprise at least one additional gradient layer structure and/or densely packed particle structure and wherein the gradient layer structure, the densely packed particle structure and the at least one additional gradient layer structures and/or densely packed particle structure are arranged as a sequence, where neighboring structures contact each other at a common interface.

In some embodiments, the gradient layer structure is a first gradient layer structure having a first particle size gradient in a first direction and the composite material further comprises a second gradient layer structure having a second particle size gradient in the first, opposite to the first, or in a third direction.

In some embodiments, the gradient layer structure can include at least one layer with a particle size smaller than 1 mm, 0.1 mm, 0.04 mm, 1000 nm, 500 nm, 100 nm, or 10 nm.

In some embodiments, the gradient layer structure can include at least one layer with a mean deviation below about 10% for a median particle size distribution.

In some embodiments, densely packed microscale particles of the densely packed particle structure can be at least partly arranged in a layer structure.

In some embodiments, the layer structure of the densely packed particle structure can include at least one layer with a particle size smaller than 1 mm, 0.1 mm, 0.04 mm, 1000 nm, 500 nm, 100 nm, or 10 nm. The layer structure can include at least one layer with a mean deviation below about 10% for a median particle size distribution.

The method can include forming a sequence of particle layers such that a gradient of the particle size over the sequence is defined as a change in size of particles populating different individual layers.

The methods can further use composite materials that include at least one a core-shell particle, which contributes to the attenuation of the compression wave. In some embodiments, energy absorbed with the at least one core-shell particle is used to release a core material from the core-shell particle.

The composite material can be used in various configurations including a coating, e.g., sprayed to an underlying substrate, a film (attachable to surfaces or free standing), a foil, a panel (e.g., molded from the composite material), powder or granular material (e.g., used as a filling material of hollow panels), or any structure made completely or to a large extent from the composite material. Some configurations can include a binding layer on the surface of the composite material. Some configurations can include a binding layer in between layers of the composite material. In addition, or alternatively, an intermediary material can be included within the composite material in between the particles.

In some embodiments, the particles can be sufficiently polar to hold together by themselves so that for the composite material no binding layer or intermediary material is needed.

In some embodiments, the gradient layer structure can be configured such that a change in particle size between neighboring layers of the gradient layer structure ranges from 5% to 50% of the mean particle size. The particle size of neighboring layers can change by at least 5%, 10%, 15%, 20%, 25%, 30%, 35%, 40%, 45%, or 50%. The particle size of neighboring layers can increase or decrease. For example, the gradient layer structure can include at least a first layer with a first particle size smaller than 1 mm and a second layer with second particle size smaller than the first particle size.

In some embodiments, a number of contact points per area between particles within neighboring layers can change according to the particle size gradient. The contact points can to some extent be "potential" contact points in a less densely packed layer.

In general, a layer includes particles of similar size. Specifically, a layer (and thus the particles of the layer) is characterized by a mean particle size. A layer can have generally any shape and configuration.

In some embodiments, at least one layer can be a layer of mono-dispersed particles (herein also referred to as mono-dispersed layer). The thickness of such a layer can be about the mean particle size of the particles of that layer. The particles of the mono-dispersed layer can be densely packed, i.e., most or all of the particles are in contact with neighboring particles of the mono-dispersed layer. Alternatively or at least in some regions, the particles can also be loosely packed thereby providing available volume in between neighboring particles that can be filled with other particles.

In some embodiments, the thickness of at least one of the layers can be larger than the mean particle size of that layer. Herein, such a layer is also referred to as a multi-particle layer and "multi-particle" refers to a thickness given by multiple particles being positioned along the direction of the cross-section of the layer. A multi-particle layer can be understood to include two or more sub-layers each of which correspond essentially to a layer of mono-dispersed particles. Thus, such a multi-particle layer has a thickness that is larger than the thickness of a layer of mono-dispersed particles (of the same type).

In some embodiments, a multi-particle layer can include two or more densely packed sub-layers wherein the particles contact neighboring particles within the sub-layer. Then, the overlap of neighboring sub-layers is mainly given by the geometry of the particles. If neighboring sub-layers are loosely packed, sub-layers can overlap each other to some extent.

In some embodiments, a multi-particle layer can include two or more loose packed sub-layers. These sub-layers can overlap in direction of the cross section of the sub-layers such that the combined thickness of two overlapping sub-layers is less than twice the thickness of one sub-layer. In embodiments of overlapping sub-layers, particles in each sub-layer may not be in contact with each other but particles of one sub-layer can be in contact with particles of the other sub-layer. In general, the thickness of the two sub-layers can be more than the mean particle size of the particles of the sub-layers and is generally less than twice the mean particle size of the sub-layers.

In some embodiments of a multi-particle layer, a layer can include at least two or more particles in direction of a cross-section of the layer.

In some embodiments, the particles within at least one of the layers can be in contact with each other (or at least being able to contact each other upon impact of a compression wave). In addition, the particles of neighboring layers can be in contact with each other or at least being able to contact each other upon impact of a compression wave.

The densely packed particle structure can be configured such that particles having a size ranges from 5% to 500% of the mean particle size. The densely packed particle structure can include at least 25%, 50%, 75%, or 100% core-shell-particles.

Within the densely packed particle structure, a number of contact points per area between particles within a region can change along the cross section according to the size of the particle.

The particles of the densely packed particle system can be arranged in a non-gradient layer structure. At least one of the layers of the non-gradient layer structure can have a thickness larger than a mean particle size of the particles of the respective layer. The at least one layer having a thickness larger than a mean particle size can be configured to include at least two sub-layers of particles.

At least one of the two sub-layers can be densely packed such that neighboring particles are in contact with each other within the at least one sub-layer. At least one of the two sub-layers is loosely packed such that neighboring particles are not in contact within the sub-layer. At least one of the two sub-layers can be loosely packed such that its particles are in contact with particles of a neighboring layer. At least one of the two sub-layers can be loosely packed such that its particles are in contact with particles of a neighboring sub-layer. At least two sub-layers of particles can overlap partially.

The thickness of the at least one layer having a thickness larger than a mean particle size is larger than or equal to about twice, three-times, four times, five times, six times, seven times, eight times, nine times, or ten times the mean particle size of the respective particles of that layer. The thickness of at least one of the layers of the non-gradient layer structure can be about the mean particle size of that layer.

In some embodiments, particles of the gradient layer structure and/or of the densely packed particle structure can be in contact with each other.

In some embodiments, particles of the gradient layer structure and/or of the densely packed particle structure are positioned with respect to each other such that at least some of the particles get into contact with each other during interaction with a compression wave.

In some embodiments, particles at least some of the particles of the gradient layer structure and/or of the densely packed particle structure are configured for unrestrained interaction between particles.

The particles can be configured for unrestrained movement and therefore interaction upon actuation, e.g., impact of a compression wave. The particles can be loose and unrestrained to allow moving and transferring momentum to neighboring particles.

The composite material can include, for example, as a layer, solid particles, hollow particles, core-shell-particles, microspheres, and spherical particles.

The gradient layer structure can include at least one layer with a particle size smaller than 1 mm, 0.1 mm, 0.04 mm, 1000 nm, 500 nm, 100 nm, or 10 nm.

The particles can provide essentially elastic interactions between neighboring spheres thereby enabling momentum distribution when transferring momentum from one of the layers to a neighboring layer via the particles. The mass of the particles is configured to allow no delay in reaction to a compression wave.

The gradient layer structure can include at least one layer with a mean deviation below about 1%, 5%, or 10% for a median particle size distribution.

The particles can be dispersed in a resin that allows momentum transfer to neighboring particles.

The gradient layer structure can include an intermediary material, e.g., for binding particles and/or layers together. The intermediary material can fill, for example, at least partially a volume surrounding the particles.

In some embodiments, the particles attach to each other without any intermediary material.

The gradient layer structure and/or of the densely packed particle structure can include a pore microstructure, which is at least partially filled with air, gas or an intermediary material. The intermediary material can be a material of the group consisting of ionomers, polymers, polymerizable monomers, resins, and cyclodextrins.

The gradient layer structure can be a first gradient layer structure having a first particle size gradient in a first direction and the composite material further comprises a second gradient layer structure having a second particle size gradient. The first and the second gradient can be directed in the same or in the opposite direction with respect to the layer structure. The composite material can further comprise a third gradient layer structure having a third size gradient in the direction of the first or second gradient structure.

The multilayer composite material can further include a substrate and the gradient layer structure or of the densely packed particle structure can be applied to the substrate. The substrate can be a housing, e.g., a housing of an electrical device, a helmet, a helmet liner, a helmet liner pad or pads, a waste receptacle, a pad, a frame, a wall, a panel, a waste receptacle liner, a liner, sports equipment such as a racket, a baseball, a golf ball, a thread, textile, cloth, cladding of a pipe, e.g., for a pipeline, and the surfaces of vehicles, vessels and crafts for land, sea, and aviation, side walls of a safety window (e.g., made of polymer or glass or a combination thereof) etc.

Materials of the substrate include, for example, substrates providing a polar surface. Glass, Poly(vinylchloride), nylon, Poly(methylmethacrylate), Poly(vinylpyridine), and Poly(vinylphenol) can, for example, provide a polar surface. A polar surface can, for example, be caused by an acid functionality at the surface. Some materials can provide a polar surface after a special surface treatment such as UV irradiation.

Additionally, various materials can be coated with a polar coating. An example of a polar coating is a coating that includes polar particles such as carbon nanoparticles with a phenylsulfonic acid functionality on their surface.

Additionally or alternatively, any of the polymers listed above can be used as coating material.

The multilayer composite material can be configured as a self supporting structure. The structure can have the form of a housing, e.g., housing of an electrical device, a waste receptacle, a pad, a frame, a wall, a panel, a waste receptacle liner, a liner, a bag, a foil, sports equipment such as a racket, a baseball, a golf ball, thread, textile, cloth, a helmet, a helmet liner pad or pads, a helmet liner, structural components of vehicles, vessels and crafts for land, sea, and aviation, etc.

The composite material can be a concentric gradient layer structure around a center particle. The center particle can be a core-shell particle. The center particle can be the inner layer of the concentric layer structure. An outermost layer or an innermost layer of the concentric layer structure can include particles of a largest particle size. The layers in a concentric layer structure can include mono-dispersed layers and/or multi-particle layers as generally discussed above. Multiple concentric gradient layer structures can be configured as a coating applied to a substrate or as a self supporting article. The concentric gradient layer structure can be attached to and/or applied onto a substrate.

The composite material can be configured such that a compression wave propagating in the gradient layer structure is distorted. An amplitude of a compression wave propagating in the composite material can be reduced. The composite material can be configured such that an impact energy of a compression wave propagating on the gradient layer structure is partially absorbed. The composite material can be configured such that after reflection of a shock wave a combined shock wave is reduced in destructive power. The composite material can be configured to mitigate and/or remediate a shock wave. The composite material can be configured such that when impacted by a shock wave, particles of neighboring layers interact thereby inducing primarily a lateral momentum transfer due to, e.g., a change in the number in contact points.

The multilayer composite material can further include a core-shell particle layer of core-shell particles having a shell surrounding a core material. For example, the gradient layer structure can include such a core-shell particle layer or core-shell particle. The core-shell particle layer can include one or more sub-layers of core-shell particles.

The shells can be configured to release core material when impacted by a neighboring particle of the composite material, e.g., caused by the impact of a compression wave.

At least one particle can contain a polymeric material such as urethanes, vinyls, epoxies, phenolics, styrenes, and esters.

At least one particle can contain on or more of ionomers, polymers, polymerizable monomers, resins, and cyclodextrins At least one particle can contain a fire suppressant of a group consisting of carbonate, bicarbonate or halide salts, telomer based materials that incorporate fluorinated materials, halocarbons, hydrofluorocarbons, hydroxides, hydrates, and polybrominated materials.

At least one particle can contain an agent material for generating a foam, e.g., a polymer foam based on, e.g., urethans, and styrenes.

At least one particle can contain a medically active material such as antibiotics and other medicine for infection, disinfectants, burn relief agents, materials used for medical triage treatment and biological/radioactive mitigating and/or remediative materials.

At least one particle can be a core-shell material and a material of the core, when released, is selected to react with at least one of another core material, a shell material, an intermediary material, and the material of neighboring particles.

Various particles and/or core-shell particles can be configured to provide a staggered chemical reaction, e.g., when impacted by a compression wave.

At least one of the particles can include a radio frequency (RF) shielding material, such as, for example, copper or nickel, cemet, and copper or nickel alloys.

At least one of the core-shell particles can include a shell material containing a polymeric material such as urethanes, vinyls, epoxies, phenolics, styrenes, and esters. The shell material can further include one or more of ionomers, polymers, polymerizable monomers, resins, and cyclodextrins.

At least one of the core-shell particles can include a core material containing a fire suppressant such as carbonate, bicarbonate or halide salts, telomer based materials that incorporate fluorinated materials, halocarbons, hydrofluorocarbons, hydroxides, hydrates, and polybrominated materials.

At least one of the core-shell particles can include a core material containing an agent material such as a polymer foam, urethans, and styrenes.

At least one of the core-shell particles can include a core material containing a medically active material such as antibiotics and other medicine for infection, disinfectant, burn relief agents, materials used for medical triage treatment, and biological/radioactive remediative materials.

At least one of the core-shell particles can include a core containing a material, when released, to react with at least one of another core material, a shell material, an intermediary material, and the material of neighboring particles.

At least one of the core-shell particles can include a core containing a material configured, when released, to mitigate and/or remediate a secondary blast effect of an explosion.

A core-shell particle can be a free and unrestricted in its movement.

The shells can be configured to provide the core material at a predefined physical condition. For example, the shell can be configured to rupture at a threshold pressure derived from the pressure accompanying, e.g., shock waves generated by a blast. The shell can be further configured to rupture at a specific pressure caused by the shock wave.

The core-shell particle layer can further include an intermediary material configured to evaporate during impact of the blast wave thereby providing unrestricted movement of the core-shell particles.

A position of a core-shell particle layer in a composite material can define a minimum strength of an impacting compression wave that is required to initiate the release of the core material.

Moreover, core-shell particles can have core material that change the physical properties of the core-shell particle compared to a solid particle. For example, gas-filled particles (herein referred to as hollow particles) can be more deformable than solid particles and thereby contribute differently to, e.g., the absorption of shock waves. The structure of the core-shell particles (shell thickness and/or type of shell material and core material) may be selected to provide elastic deformable particles or inelastic (and therefore breakable) particles for respective stress situations such as impacting shock waves.

In a transportation device, the composite material can be configured as at least one of a coating, a film, and a panel attached, e.g., to an exterior surface. Moreover, the composite material can be provided within a cavity of a structural component of the transportation device.

The composite material can be configured to reduce a compression wave to provide a predefined threshold pressure at the core-shell particle layer.

In some embodiments, the composite material is capable of absorbing an impact of a shock wave that, for example, is produced by an explosion or caused during operation of a device. In addition, or alternatively, in some embodiments, the composite material is capable of mitigating and/or remediating one or more secondary blast effects resulting from the explosion.

In some embodiments, the composite material is suitable for use in applications that can benefit from a material capable of interacting with or responding to changes in its surrounding environment. The interaction and/or response can be designed to be performed in a controlled and/or predetermined manner. Exemplary changes in the environment include changes based on variations of mechanical stress (caused by mechanical load, torsional strain, vibrations etc.), pressure, temperature, moisture, pH-value, electric or magnetic fields, and the like.

Examples of applications can include structural materials, ceramics, textiles and antiballistic and anti-shockwave materials. The field of applications can be in civil engineering, aerospace, automotive applications, military, energy and related infrastructure, electronics, sensors and actuators, lubricants, medical applications, and catalysis.

In particular, one can release catalysts upon actuation of the composite material, which can then be used to catalyze materials in various applications. For example, upon impact related fracture of liners or piping or containers, one can design the composite material to release materials that contain spills and clean up via catalysis. Applications include petroleum/oil based piping systems, chemical containers, and refining operations.

Additional applications can include shock wave and/or impact protection of electronic equipment, impact protection in automotive applications and sports equipment, coatings and claddings for buildings or oil pipelines (and the like). Oil pipelines, for example, are confronted with compression waves due to opening and closing of valves. To mitigate and/or remediate, for example, fire or leaking from an intentionally destroyed oil pipeline, the inside surface or the outside surface of the oil pipeline, or both, can further be provided with fire mitigating layers. This can be done alternatively or additionally to compression wave absorbing coating or cladding on the inner or outer surface of the pipeline.

In some embodiments, the composite material is capable of reacting to and/or interacting with one or more stimuli existing in a blast zone environment. For example, in some embodiments the material can absorb at least a portion of an initial blast impact and/or pre-over pressure air wave resulting from an explosion. In addition, or alternatively, the material can be designed to mitigate and/or remediate one or more related blast effects resulting from the blast impact itself. Thus, some embodiments can provide a novel material that through intelligent design of the material systems can not only reduce blast impact with greater efficiency and efficacy but that can also mitigate and/or remediate one or more secondary blast effects.

In some embodiments, the composite material can provide bomb blast mitigation and/or remediation by reducing the reflective value of the bomb blast by absorption of the bomb blast energy. In some embodiments, the primary mitigating and/or remediating process can be by absorption of the bomb blast shock wave. In some embodiments, the mitigating and/or remediating process can be by absorption of the pre-over pressure air wave that precedes the shock wave. Absorption of the shock wave and/or the pre-over pressure wave can occur through one or more mechanisms, including, for example, momentum transfer, destruction of the spatial symmetry of, e.g., the blast wave, plastic deformation, rupture of particles, e.g. filled and unfilled core-shell particles, restitution, and interparticle/interlayer shear.

In some embodiments, the composite material can provide a novel platform from which a wide variety of blast effects can be mitigated and/or remediated. For example, in a core-shell material the absorbed energy can be utilized to rupture, e.g., microcapsules to introduce a series or selection of core materials or material systems into the blast environment and to thus mitigate and/or remediate the blast effects. In some embodiments, the composite material can provide a relatively light weight material that can be applied to pre-existing structures or systems with no deleterious effects on the performance attributes of the pre-existing structure or system.

In some embodiments, the composite material can offer proactive mitigation by, for example, comprising RF shielding materials that can impede and thereby reduce the possibility of a remote detonation. Furthermore, destructive phenomena can also be addressed through the composite material including remediative solutions to chemical, biological, radioactive, optical, sonic, mechanical failure, and electromagnetic effects.

In some embodiments, textiles, materials of construction, and smart and thin film applications can benefit from the composite material as a multifunctional user defined "smart" material. Exemplary textile applications can include textiles for use in firefighting, law enforcement, military, defense, sports, and fashion. In some embodiments, composite material can be provided in a form such as a cloth or film suitable for forming uniforms, helmets and head gear, or being applied thereto when using them as a substrate that exhibit the beneficial effect of reacting to environmental changes in a predetermined manner. Exemplary uniforms, helmets, and head gear can include those protective uniforms, helmets, and head gear worn by fireman, law enforcement personnel, and military and/or combat personnel.

Examples of composite material applications include further material systems which are designed to utilize latent or introduced energy to perform a multiplicity of internally predictable actions utilizing energy from the system as an energy source for inducing said actions. Applications also exist which utilize the conversion of impact energy (from physical, optical, acoustic, compression etc.) to perform a variety of functions including energy conversion and utilization, actuation of sensors, signals and chemical reactions in a multi-step systems which can, in concert, perform a variety of complex user defined functions.

Some embodiments provide "bomb proof", impact or smart material applications. Examples of bomb proof applications include receptacles and liners (waste receptacles and bags etc.), construction (buildings and their facades, bridges and their structural members, pipes and pipelines (for fossil fuels, conduits, utilities), automotive (door panels, bumpers, dashboards, windshields and windows, undercarriages and roofs), aerospace (interior/exterior of planes, satellites, helicopters), and high tech (computer/hardware casings, cable protection).

In some embodiments, the composite material can be used in connection with military equipment, structures, vehicles, vessels and crafts for land, sea, and airborne forces to include armored and unarmored vehicles, aircraft, (which includes helicopters and unmanned drones), and nautical vessels such as submarines, ships, boats and the like.

For military and civilian uses, the composite material can be applied as an exterior coating, film, and/or as panel to pre-existing equipment or, alternatively, can be utilized as a composite material for forming structural components of the military vehicle, aircraft, or nautical vessel. Still further, the composite material can also be utilized to provide shielding of electromagnetic radiation (RF etc.) in any of the above-mentioned contemplated applications.

In some embodiments, the color changing sensor material of the composite material can be contained in at least one of the microscale particles, the core-shell particles, an intermediary material, a material of a binding layer, and a material of a binding film of the composite material.

In some embodiments, the color changing sensor material of a composite material can be configured to change color when exposed to at least one of gaseous explosive materials, material components of explosives, materials emitted from an explosive material, vapor of an explosive material, chemical components outgassed from an explosive material, and chemical components of an explosive material. The color changing sensor material can be further configured to change color when exposed to vapors signaling the presence of explosive material; either the explosive material itself or a chemical component of a manufactured explosive.

In some embodiments, the color changing sensor material of a composite material can be configured to change color when exposed to a compression wave.

In some embodiments, the core-shell particles in the composite material can include a core containing a material, which when released, reacts with at least one of another core material, a shell material, an intermediary material, and the material of neighboring particles.

To cause a change in the color of one or more of those materials. Thereby, a change in the color of the surfaces with which the sensor material makes contact can occur. In some embodiments, the released core material modifies the consistency (e.g., aggregate state) of one or more of the, e.g., shell material, intermediary material, and material of neighboring particles. Those modified materials can have features that mark (e.g., color) a contacting material (e.g., hair in case of using the composite material within a helmet embodiment). In some embodiments of the multilayer composite material, the first substrate can include a polar material to increase the adhesion of the microscale particles of the layer structure being in contact with the first substrate.

In some embodiments, the gradient layer structure can include a series of gradients having the same direction.

In some embodiments, the gradient layer structure can include a series of gradients having varying directions.

In some embodiments, the core-shell particles can form a layer of the gradient layer structure.

The core-shell particles can have a size at the upper end of the range of particle sizes.

The multilayer composite material can further include a second substrate at the second face of the layer structure. The first substrate, the layer structure, and the second substrate can be at least partially transparent.

Certain implementations may have one or more of the following advantages. Some implementations can absorb the compression of a bomb blast rather than containing bomb blast within a receptacle. Absorption is more effective as it reduces the destructive power of a bomb rather than contains the destructive power. Some implementations can offer remediation of blast effects. Some implementations can offer a large selection of other functions in situ. Functions can be actuated, for example, in real time by the impinging compression wave. The actuation can be performed at any time. Some implementations can be applied to existing objects and structures without changing initial form or function. Some implementations can be easily augmented to accommodate case specific responses and can be designed to offer user defined properties. Some implementations can be tunable to offer user defined complex and multifunctional performance characteristics. Some implementations can offer a novel material design approach capable of engineering directly into the material a predictable series of responses to an external stimulus, thereby generating a smart material. Some implementations can enable utilizing and combining the properties of individual materials in concert or in series. The details of one or more embodiments of the invention are set forth in the accompanying drawings and the description below. Other features, objects, and advantages will be apparent from the description and drawings, and from the claims.

BRIEF DESCRIPTION OF DRAWINGS

FIG. 1 is a schematic cross sectional view of a first composite material with a gradient layer structure having a decreasing particle size in impact direction.

FIG. 2 is a schematic cross sectional view of a second composite material with a gradient layer structure having an increasing particle size in impact direction.

FIG. 13 is a schematic cross sectional view of a planar gradient layer structure including a core-shell particle layer.

FIG. 14 is a schematic cross sectional view of a concentric gradient layer structure surrounding a core-shell particle.

Like reference symbols in the various drawings may indicate like elements.

DETAILED DESCRIPTION

Figure 3:
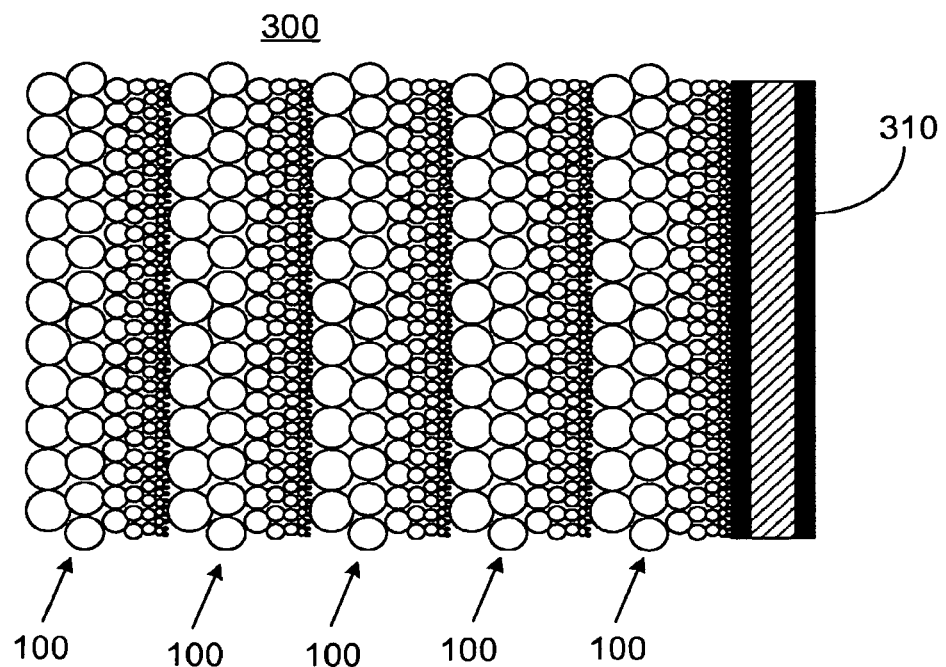
FIG. 3 is a schematic cross sectional view of a third composite material with a plurality of gradient layers structures as shown in FIG. 1.

In some aspect, the invention relates to an engineered composite material that is based on a structure of particles with a gradient layer structure having different particle sizes in neighboring layers and a densely packed particle structure that has essentially no restriction to the distribution of the particle size over the cross section.

For the gradient layer structure, the layers can be arranged to have a (constant or varying) gradient of the particle sizes, e.g., increasing, decreasing, or alternating particle size.

In contrast, the densely packed particle structure is a non-gradient particle structure with, for example, particles of a single size only, or particles of two sizes. The particles of the densely packed particle structure can be arranged in monolayers or layers a few particles thick, thereby forming a densely packed layer structure of the particles. Such a layered densely packed particle structure can be generated, for example, layer by layer. In addition, a densely packed particle structure can also be generated as a bulk, e.g., by drop coating.

A densely packed particle structure is described in more detail, for example, in PCT patent application, filed on even date herewith and entitled "DENSELY PACKED PARTICLE STRUCTURE" by Z. R. Greenhill, Y. C. Avniel, and J. J. BelBruno, the contents of which is hereby incorporated by reference in its entirety.

Such a gradient layer structure can be capable of absorbing, for example, the energy of an explosion, pressure waves, sound waves, shock waves, and compression waves. In general, the layers of the composite material, e.g., of the gradient layer structure or a layered densely packed gradient structure, can be mono-dispersed layers or multi-particle layers, i.e., a layers that have a thickness given by a single (mono-dispersed layer) or multiple particles (multi particle layer) being positioned along the direction of the cross-section of the layer. Within a multi-particle layer, the particle size is essentially constant.

A specific situation occurs for a multi-particle layer within a gradient layer structure, Then, the interaction between same size particles takes place in addition to interaction between different size particles. This interaction is similar to the interaction between particles of the densely packed particles having the same size. Depending on the numbers of layers, one may consider those multi-particle layers a separate unit of a densely packed particle structure sandwiched between to gradient layer structures. In general, one can in general consider multi-particle layer structures of approximately the same thickness, number of layers, or efficiency as, the gradient layer structure to be a densely packed particle structure. Multi-particle layers of smaller size, number of layers, or efficiency than the gradient layer structure can be considered to be part of the gradient layer structure.

Examples of gradient layer structures and/or densely packed particle structures are discussed, for example, in connection with FIGS. 1 to 6, 9, 13 to 24, 43 to 55. The physical environment generated by a bomb blast is discussed below in connection with FIGS. 7 and 8, and a potential explanation for the effect of the invention is discussed in connection with FIGS. 9 and 10. The presented gradient layer structures and/or densely packed particle structures can provide an increased lateral momentum and energy transfer during propagation of an incident wave. For example, when gradient layer structure and/or a densely packed particle structures are subjected to the impact of a blast, the shock wave from the blast travels across the structures, and it is assumed that the shock wave is increasingly deflected in different directions by, e.g., the alternating amount of contact points within neighboring layers.

In such multilayer composite materials, the particle size can range from about 1 nm to several millimeters, for example, from 150 nm to 1 mm. The material of the particles can comprise, e.g., (porous) silica; aluminum hydroxide; polymeric materials; metal spheres, and ceramics. As shown specifically in FIGS. 3 to 5, a composite material can include several layer structures with identical or reversed direction of the gradient and sections of no gradient. The layers can be planar or have a specific shape. Moreover, the structures can be applied to a substrate having a specific shape, see FIG. 3. Alternatively, the structures can be concentric as for example described in connection with FIG. 6.

While most of the drawings shown herein illustrate a layer just by a string of single particles, any of the layers shown herein can in general be a layer of mono-dispersed particles or a multi-particle layer having more than one sub-layer (a sub-layer itself being, for example, a dense mono-dispersed particle layer). Examples are described in connection with FIGS. 25 to 32, which show composite materials that include gradient layer and densely packed particle structures based on layers of mono-dispersed particles and multi-particle layers. In the drawings, densely packed particle structures are often illustrated as a single layer but are in general multilayer structures or non-layered structures having the thickness of the size of several particles.

In some aspects, a composite material includes core-shell particles having a core surrounded by a shell. The core can be partly or completely filled with solid, liquid, gasous, and/or gel-like material. Depending on the specific application, the shell materials of the core-shell particles can be configured to be pliable during interaction with a compression wave, thereby attenuating the compression wave in addition to any structural attenuation effect of several particles. The attenuation effect of a core-shell particle depends on the material of the shell (e.g., its elasticity) and the physical properties of the core material. A gas filling of a so called hollow core-shell particle (or a partly with a solid filled core-shell particle) will itself essentially not contribute to the physical properties of the core-shell particle, while a complete solid or liquid filling can modify the physical properties of the core-shell particle.

Figure 11:
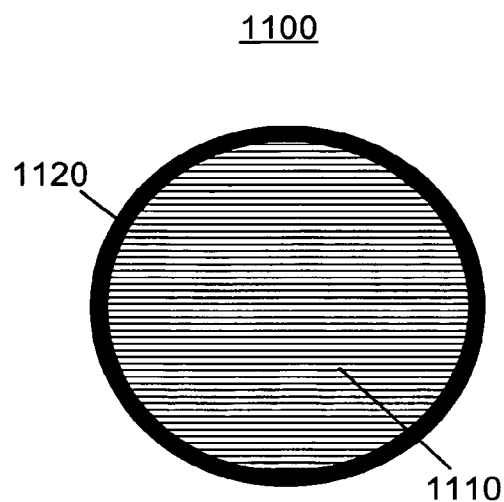
FIG. 11 is schematic illustration of an exemplary core-shell particle.

In some aspects, a composite material includes core-shell particles such as filled microspheres, see FIG. 11 that are "filled" with one or more application specific materials within one or more core-shell particles. Depending on the specific application, the shell materials of the core-shell particles can be configured such that given a specific physical pressure, the core material is released. In exemplary embodiments, the composite material can include a mono-layer of mono-dispersed core-shell particles or a layer having a thickness of multiple core-shell particles (multi-core-shell particle layer with more than one sub-layer). Exemplary materials for the core can include for fire suppression materials such as potassium bicarbonate, aluminum and/or magnesium hydroxide; for energy absorption porous silica, silica, and/or Perlite; and for RF shielding copper, and/or nickel.

In some applications, the physical properties of core-shell particles are essentially determined by the shell and the filling (core-material) is, for example, a gas, a gas-liquid mixture, or a gas-gel mixture, or a gas-solid mixture, which does not or only to some extent contribute to the interaction with, for example, a pressure wave.

Moreover, in some aspects, the core-shell particle layer can be combined with a gradient layer structure as discussed, for example, in connection with FIGS. 13, 14, 17, 22, and 24. In general, throughout the composite material one or more mono-dispersed layer of core-shell particles and/or one or more multi-core-shell particle layers can be provided.

Figure 15:
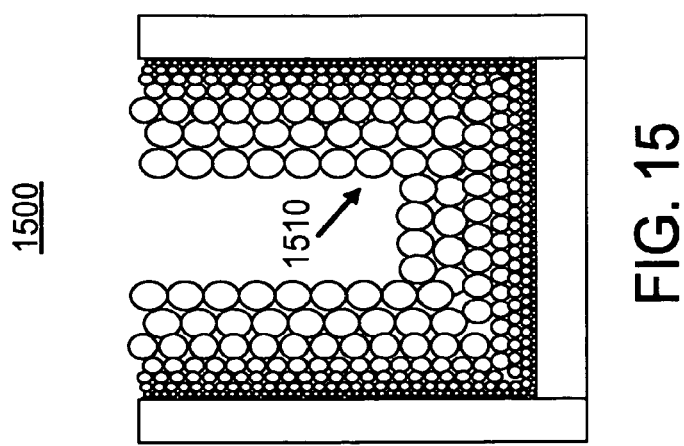
FIG. 15 is a schematic cross sectional view of a container coated with a composite material as shown in FIG. 1.
Figure 24:
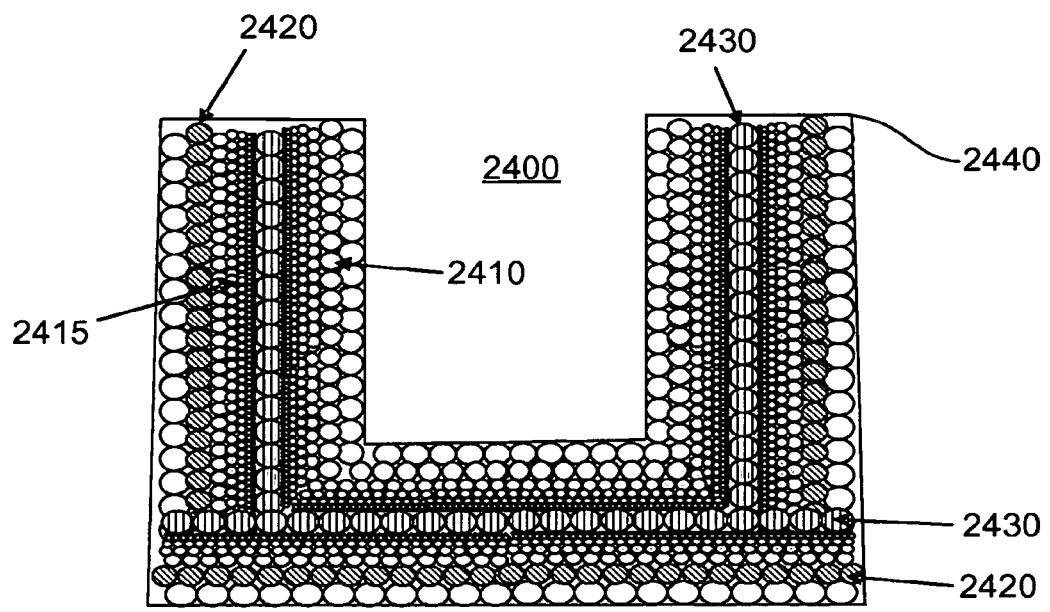
FIG. 24 is a schematic cross sectional view of an exemplary waste receptacle made from a multilayer composite material.

In various applications, the composite materials based on gradient layer structure and densely packed particle structure with or without core-shell particles can be applied to devices such as containers as shown in FIGS. 15 and 24 as examples for waste receptacles. The composite material can further applied to fibers and used in connection with textiles as discussed in connection with FIGS. 16 and 17. Exemplary textile applications can include textiles for use in firefighting, law enforcement, military, defense, sports, and fashion. Such cloth or film can be suitable for forming uniforms, helmets, helmet liners, helmet liner pads etc. that exhibit the beneficial effect of reacting to environmental changes in a predetermined manner. Specific examples can include inner liners for uniforms or jackets that are either attachable or fused into the cloth.

Additional applications can involve the suppression of compression waves (including shock waves) in pipes. Shock waves are, for example, generated through valve operation in oil pipelines as discussed in connection with FIG. 18. The composite material can further be applied to surfaces that require impact resistance. Examples include housing of hand held devices, helmets, vehicles or components thereof, as discussed in connection with FIGS. 19, 21 to 24. The composite material in those applications can be applied as a coating (e.g. film) or provided as a liner. The composite material can further be used in connection with cushions, for example, the helmet pads shown in FIG. 21. Additional applications can involve the suppression of compression waves to make wall structures or windows safer.

In general, for composite material in applications, which require a minimum transparency, the material and the size of the particles can be selected appropriately. In general, particle sizes below about 200 nm can enhance the transparency. For example, 30-50 layers of silica particles of 200 nm size is transparent.

The composite material can be generally comprised of a plurality of adjacent layers whereby each layer is comprised by a plurality of particles having a predetermined median particle size diameter. In gradient layer structures, the predetermined median particle size of each adjacent layer (be it a layer of mono-dispersed particles or a multi-particle layer), when viewed in cross section, forms a particle size gradient such that median particle size of each layer sequentially decreases (or increases) across the cross section of the material. The particle size gradient is accompanied by an inverse "gradient" in the amount of contact points per unit of area. For example, a decreasing particle size within the gradient layer structure results in an increase of particle surface contact points per unit of area because more particles interact in each adjacent layer. Similarly, an increasing particle size within the gradient layer structure results in a decrease of particle surface contact points per unit of area because less particles interact in each adjacent layer. A gradient layer structure can, in general, include changes in the gradient, i.e., in the steepness of the change of the particle size and the direction of the change in the particle size.

In contrast to the gradient layer structure, densely packed structures may have a constant number of particles and therefore, amount of contact points. In general, allowing random particles size distributions, also the number of particles and contact points changes randomly. In practice, the random particle size distribution is, however, restricted by the particles provided and controlled during the manufacturing.

The size of the particles forming the surface of the composite material or the side of the composite material that interacts with an incoming distortion can additionally influence the physical properties of the composite material. The influence on the surface hardness is discussed below, for example, in connection with Example 7.

Herein various aspects are discussed for layer structures, even though similar considerations are also applicable for a non-layered densely packed particle structures.

The plurality of adjacent layers are configured such that the proximity of the particles within the various layers and the proximity of particles from one adjacent layer to another adjacent layer are sufficiently close to one another to allow a transfer, dissipation, and/or conversion of energy to take place when the gradient layer structure is subjected to the impact energy from, for example, a blast. Specifically, a momentum transfer response only occurs when the particles are touching and compressed. Once the contact between particles is not possible, the particles can become an amalgamation of independent systems which in themselves interact as a multitude of systems.

FIG. 1 shows a schematic cross-sectional view of an exemplary composite material 100. The direction of an impact, e.g., the compression wave of a blast, is indicated through arrow 105 and is directed toward a surface of a composite material 100. The composite material 100 includes a plurality of adjacent layers 110-170. Each of the layers 110-170 of the material includes particles p1-p7 having a predetermined median particle size dp1-dp7, respectively. The relative particle size distribution with respect to the median particle size dp1-dp7 of the particles p1-p7 within any given layer 110-170 is small. For example, the coefficient of variation is below 20%, or below 10%, or even below 5%.

With respect to the gradient structure, each layer of the composite material 100 can be distinguished from the adjacent layer or layers by the difference in particle sizes contained therein. Additionally, within each of the layers 110-170 of FIG. 1, particle surface contact points cp1-cp7 between particles of each of the layers 110-170 are indicated. As can be easily seen, the smaller the particle the more contact points per unit of area.

In FIG. 1, the particle sizes of each adjacent layer form a particle size gradient and satisfy the relationship dp1>dp2>dp3>dp4>dp5>dp6>dp7. It should be understood that the specific median particle sizes selected for a given layer of the material are not as critical as long as a desired particle size gradient is provided.

The gradient can be expressed as the change in size of the particle diameters populating individual layers. For example, the particle diameters can shrink (or increase) progressively by a factor spanning the range of 5% and 50%. The shrinking or increasing can be linear or non-linear.

In direction of a decreasing median particle size, the median particle size of the adjacent layers 110-170 can be chosen such that number of particle surface contact points cp1-cp7 per unit area increases at least by one. For example, if one of the layers 110-170 has n particle surface contact points then the neighboring layer having a smaller particles has at least n+1 particle surface contact points per unit area. Accordingly, the number of particle surface contact points fulfills the relation: cp7>cp6>cp5>cp4>cp3>cp2>cp1.

Microscale particles (e.g. sub-millimeter size particles) can be used to manufacture the composite material and the selection of the size, at least in part, is dependent upon the desired end use application for the composite material. For example, the particle sizes can be less than about 1,000 μm in size, less than about 500 μm, less than about 250 μm, or even less than about 125 μm. Particle size down to the single nanometer scale can be applied.

In case of the composite material 100 of FIG. 1, the particles of layer 110 can have a relative median particle size of about 150 μm, the particles of layer 120 can have a relative median particle size of about 75 μm, the particles of layer 130 can have a relative median particle size of about 40 μm, the particles of layer 140 can have a relative median particle size of about 10 μm, the particles of layer 150 can have a relative median particle size of about 2 μm, the particles of layer 160 can have a relative median particle size value of 0.75 μm and the particles of layer 170 can have a relative median particle size value of 0.15 μm.

The example of FIG. 1 has seven layers. However, it should also be understood that the plurality of layers can comprise less or more layers, for example three or more layers. Examples for the number of layers in a composite material having a gradient in the particle size can include less than seven layers (e.g., two, three, four, five, six), or more layers (e.g. at least ten, twenty, thirty, forty layers). Table 1 shows example layer structures for a gradient of 5% to a gradient of 50% starting at a maximum particle size of 40 μm and having up to 40 layers within a gradient layer structure. The indicated median particle sizes decrease layer by layer 5%, 10%, . . . 50%. For a gradient of 20%, two layer structures are shown having 20 or 28 layers. Example polymeric particles can include monodisperse polystyrene microspheres and Polybead® Hollow Microspheres. Additional particles and particle materials are discussed below.

TABLE 1

| Gradient | 5% | 10% | 20% | 20% | 25% | 40% | 50% |
|---|---|---|---|---|---|---|---|
| Layer 1 | 40.00 | 40.00 | 40.00 | 40.00 | 40.00 | 40.00 | 40.00 |
| Layer 2 | 38.00 | 36.00 | 32.00 | 32.00 | 30.00 | 24.00 | 20.00 |
| Layer 3 | 36.10 | 32.40 | 25.60 | 25.60 | 22.50 | 14.40 | 10.00 |
| Layer 4 | 34.30 | 29.16 | 20.48 | 20.48 | 16.88 | 8.64 | 5.00 |
| Layer 5 | 32.58 | 26.24 | 16.38 | 16.38 | 12.66 | 5.18 | 2.50 |
| Layer 6 | 30.95 | 23.62 | 13.11 | 13.11 | 9.49 | 3.11 | 1.25 |
| Layer 7 | 29.40 | 21.26 | 10.49 | 10.49 | 7.12 | 1.87 | 0.63 |
| Layer 8 | 27.93 | 19.13 | 8.39 | 8.39 | 5.34 | 1.12 | 0.31 |
| Layer 9 | 26.54 | 17.22 | 6.71 | 6.71 | 4.00 | 0.67 | 0.16 |
| Layer 10 | 25.21 | 15.50 | 5.37 | 5.37 | 3.00 | 0.40 | 0.08 |

TABLE 1-continued

| Gradient | 5% | 10% | 20% | 20% | 25% | 40% | 50% |
|---|---|---|---|---|---|---|---|
| Layer 11 | 23.95 | 13.95 | 4.29 | 4.29 | 2.25 | 0.24 | |
| Layer 12 | 22.75 | 12.55 | 3.44 | 3.44 | 1.69 | 0.15 | |
| Layer 13 | 21.61 | 11.30 | 2.75 | 2.75 | 1.27 | 0.09 | |
| Layer 14 | 20.53 | 10.17 | 2.20 | 2.20 | 0.95 | | |
| Layer 15 | 19.51 | 9.15 | 1.76 | 1.76 | 0.71 | | |
| Layer 16 | 18.53 | 8.24 | 1.41 | 1.41 | 0.53 | | |
| Layer 17 | 17.61 | 7.41 | 1.13 | 1.13 | 0.40 | | |
| Layer 18 | 16.72 | 6.67 | 0.90 | 0.90 | 0.30 | | |
| Layer 19 | 15.89 | 6.00 | 0.72 | 0.72 | 0.23 | | |
| Layer 20 | 15.09 | 5.40 | 0.58 | 0.58 | 0.17 | | |
| Layer 21 | 14.34 | 4.86 | 0.46 | | 0.13 | | |
| Layer 22 | 13.62 | 4.38 | 0.37 | | 0.10 | | |
| Layer 23 | 12.94 | 3.94 | 0.30 | | | | |
| Layer 24 | 12.29 | 3.55 | 0.24 | | | | |
| Layer 25 | 11.68 | 3.19 | 0.19 | | | | |
| Layer 26 | 11.10 | 2.87 | 0.15 | | | | |
| Layer 27 | 10.54 | 2.58 | 0.12 | | | | |
| Layer 28 | 10.01 | 2.33 | 0.10 | | | | |
| Layer 29 | 9.51 | 2.09 | | | | | |
| Layer 30 | 9.04 | 1.88 | | | | | |
| Layer 31 | 8.59 | 1.70 | | | | | |
| Layer 32 | 8.16 | 1.53 | | | | | |
| Layer 33 | 7.75 | 1.37 | | | | | |
| Layer 34 | 7.36 | 1.24 | | | | | |
| Layer 35 | 6.99 | 1.11 | | | | | |
| Layer 36 | 6.64 | 1.00 | | | | | |
| Layer 37 | 6.31 | 0.90 | | | | | |
| Layer 38 | 6.00 | 0.81 | | | | | |
| Layer 39 | 5.70 | 0.73 | | | | | |
| Layer 40 | 5.41 | 0.66 | | | | | |

In Table 1, a constant gradient of 5% is given. However, one could alternatively vary the gradient. For example, a gradient layer structure can include the layers 1 to 7 with a gradient of 25%, followed by layers 35 to 40 with a gradient of 5%. Additionally, that gradient layer structure can include layers 11 to 28 with a gradient of 25%.

Additionally, a composite material can have a layer structure that includes a series of repeating layer sequences wherein the order of layers within a layer sequence can be inverted and/or the layers of a sequence can be modified.

For example, as shown in FIG. 1, any one of the layers 110-170 can include a mono-dispersed layer of particles p1-p7 and thus has a thickness approximately equal to the median particle size diameter of the particles p1-p7 within that layer 110-170, respectively. Then, composite material 100 would be pure gradient layer structure. Alternatively, any one or more layers can also be comprised of a plurality of sub-layers of the particles forming a multi-particle layer. Then, the thickness of a given layer can optionally be greater than the median particle diameter size of the particles within a given layer of the system. Specifically, layers with smaller particles can include, for example, more than one particle, e.g., up to 20 particles.

Figures 43, 44, 45:
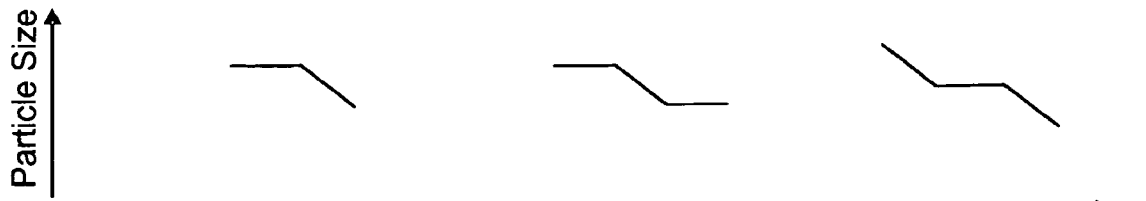
FIGS. 43 to 48 are schematic plots of particle sizes distribution of the layers of a composite material.

As any of the layers 110-170 can, in principle, be a multi-particle layer and therefore be considered a densely packed particle structure. For example, the largest particles of layer 100 can include 10, 20, 30, 40, or 50 layer of the same size. A corresponding particle size distribution is shown in FIG. 43.

Additionally (or alternatively), layer 170 of the smallest particles can be formed as a densely packed particle structure. A corresponding particle size distribution is shown in FIG. 44.

Alternatively (or additionally), one of the inner layers, e.g., layer 140 can be formed as a densely packed particle structure. A corresponding particle size distribution is shown in FIG. 45.

As further shown in FIG. 1, the energy from a blast impact 105 is directed initially toward the first layer 110 which is comprised of a plurality of particles having the largest median particle sizes. Thus, the energy of the blast impact will then propagate though the material in the direction of largest particle size to smallest particle size, i.e., from layer 110 toward layer 170.

As used herein, the terms "nano" and "nanoscale" particles generally refer to particles having a size on the scale of nanometers, such as, for example, particles having at least one aspect equal to or less than about 100 nm. As used herein, the terms "macro" and "macroscale" particles generally refer to particles larger than nanoscale, preferably particles having at least one aspect greater than about 100 nm, or more preferably particles having at least one aspect greater than about 500 nm. As used herein, the terms "meso" and "mesoscale" particles generally refer to particles having aspects between nanoscale and macroscale systems. As used herein, the terms "micro" and "microscale" particles generally refer to particles from the nanoscale to particles having at least one aspect in the order of thousand micrometers, e.g., in the range of 0.1 nm to 1000 μm.

It should be noted that these sizes and ranges can vary and/or overlap and that therefore the definitions provided herein are intended only to serve as a general guide and not to limit the various embodiments. Nanoscale particles can often exhibit different properties than corresponding macroscale analogs. Mesoscale particles can often exhibit properties that can be attributed to both nano and macro systems.

In some embodiments, the composite material includes macroscale particles, mesoscale particles, and/or nanoscale particles, such that the energy that is dissipated (e.g. frictional energy) can be increased. In some embodiments, combinations of mesoscale and/or nanoscale particles achieve application specific mechanical properties and the amount of dissipated energy can be increased.

In a composite material, frictional energy dissipation can be increased by populating space devoid of macroscale (large) particles with nanoscale and/or mesoscale (small) particles. The choice of particle size used is a function of a particle size gradient, material composition, and desired properties. The small particles can also be used to adjust the materials mechanical properties (e.g. mechanical strength). In addition, or alternatively, the small particles can introduce further material systems that can be beneficial upon actuation of the system, e.g. by a bomb blast.

It should also be understood that the composite material is not limited only to configurations whereby the layer comprising the largest median particle size forms the surface layer and therefore, receives the initial energy of, e.g., the impact from a blast. For example, as shown in FIG. 2, a composite material 200 can also be formed to comprise the reversed particle size gradient, wherein the first layer to receive the impact energy from the blast is layer 270. According to this embodiment, the energy of the blast impact will propagate though the material along a direction 205 from the smallest particle size to the largest particle size, i.e., from layer 270 toward layer 210. In the structure of FIG. 2, the gradient has the opposite direction to the gradient of FIG. 1 and accordingly, the number of contact points decreases for layers being further away from the surface subjected to the impact.

In some embodiments, a plurality of the above described materials can be stacked or arranged sequentially one upon the other. For example, as shown in FIG. 3, a composite material sequence 300 includes a plurality of composite materials 100 (large to small particle size gradient as discussed in connection with FIG. 1) can be stacked or arranged sequentially on top of a substrate 310. Specifically, FIG. 3 shows five composite materials 100. To this end, it should be understood that any desired number of the layer sequence as shown for the composite materials 100 can be stacked or arranged in sequence.

Figure 4:
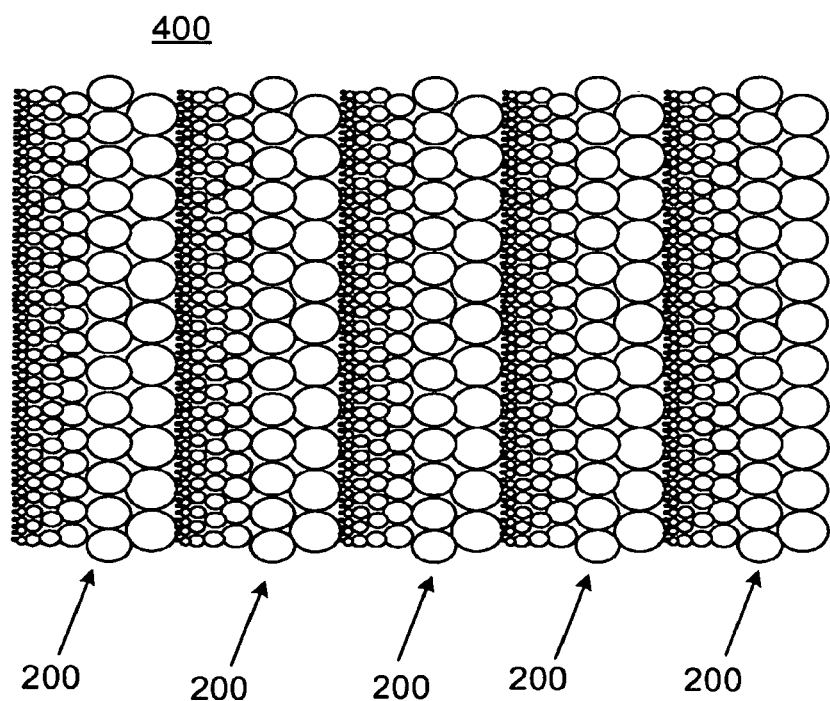
FIG. 4 is a schematic cross sectional view of a fourth composite material with a plurality of gradient layers structures as shown in FIG. 2.

Likewise, as shown in FIG. 4, a composite layer sequence 400 includes a plurality of layer sequences as shown for the composite material 200 (small to large particle size gradient as discussed in connection with FIG. 2) can be stacked or arranged sequentially. Once again, it should be understood that any desired number of layer sequences can be stacked or arranged in sequence. A larger number of gradient layer structures and gradient layers can provide self standing structures, while fewer layers or gradient layer structures can provide a flexible composite material that can be applied to structured surfaces. In FIG. 4, a substrate is not explicitly shown, thereby indicating a self standing structure. However composite layer sequence 400 can alternatively be attached to a substrate, for example at the large particle side.

Figure 5:
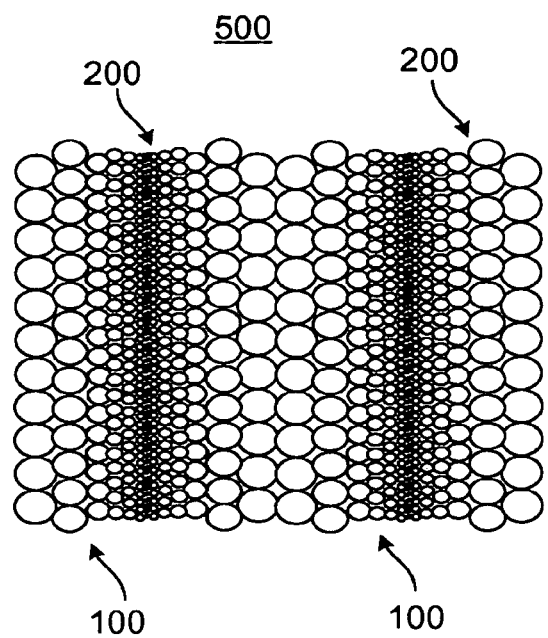
FIG. 5 is a schematic cross sectional view of a fifth composite material with a plurality of gradient layers structures as shown in FIGS. 1 and 2.

In some embodiments, and as shown in FIG. 5, a plurality of the composite materials 100 and 200 can be stacked or arranged in an alternating or staggered arrangement to form a composite material 500 so that the interface of two adjacent materials 100 and 200 can comprise either a divergence or a convergence of particle size gradients. Once again, it should be understood that according to this embodiment, any desired number of the composite materials 100 and 200 can again be stacked or arranged in the manner as described. While in FIG. 5 larger particles form the surface, one can alternatively form the gradient structure such that the smallest or medium size particles form the surface (see, e.g., FIG. 31). Opposing surfaces of a composite material can also be provided with different size particles.

Figure 6:
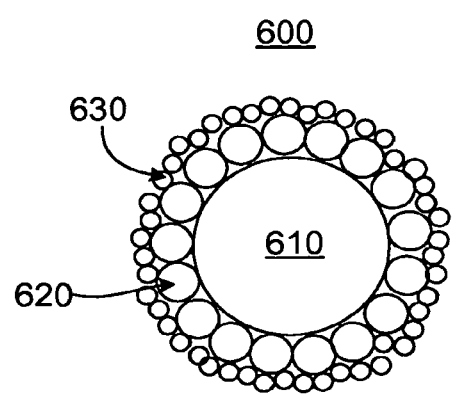
FIG. 6 is a schematic cross sectional view of a sixth composite material with a plurality of concentric particle layers.

As illustrated in FIGS. 1 to 5, the composite material can be provided as a plurality of substantially parallel or sequential layers which can, for example, be attached, applied or deposited sequentially onto a substrate. However, in some embodiments and as shown in FIG. 6, the plurality of layers can be oriented concentrically, thereby forming a concentrically layered particle 600. The concentrically layered particle 600 includes a central particle 610 that is surrounded by a plurality of concentric layers, only two layers 620 and 630 are shown but many more could be applied. The concentric layers are each comprised of particles of decreasing size as the layers extend farther from the central or core particle 610. As exemplified in FIG. 6, the central particle 610 has a predetermined particle size dp1. First outer concentric layer 620 is comprised of a plurality of particles having a median particle size dp2 that is less than the dp1. The second outer concentric layer 630 is comprised of a plurality of particles having a median particle size dp3 that is less than dp2. Once again, although this embodiment has been exemplified in FIG. 6 as having the central particle 610 surrounded by two concentric particle layers 620 and 630, it should be understood that any number of concentric particle layers can be applied and a central particle is not required and could be replaced by free space or a few contacting inner particles.

As discussed above for the embodiments of FIGS. 1-5, the direction of the gradient can be reversed or different types and/or directions of gradients can be used within a gradient structure.

Similarly, in the above discussion, one or more layers (except the core particle 610 can be the densely packed particle system. In a respective discussion of FIGS. 43 to 54, consider the layer number extends then in radial direction, while in planar embodiments the layer number extends along the cut through the layer structure.

It should be appreciated that one advantage of the concentrically layered particles 600 is its potential ease of large scale application. In particular, a plurality of the individual concentrically layered particles 600 can be suspended in a medium and subsequently applied onto a desired substrate. This technique can thus enable the generation of a product with desired energy absorption effect that is based on a single application of concentrically layered particles 600 rather than on a plurality of successive applications of the in order to provide the different layers such as, e.g., the layers 110-170 of composite material 100.

The individual layers which are populated by the different sized particles have a number of distinct attributes. In some embodiments, the layer thickness can at least for the layers of larger particles be as close as possible to the particle diameter, while for layers of smaller particles multi-particle layers may be applied having a thicknesses of, e.g., 2-20, 5-15, and 7-12 particles, e.g., 3, 4, 5, 6, 7, 8, 9, 10, 11, or 12 particles. As discussed above, one can in general consider multi-particle layer structures of approximately the same thickness, number of layers, or efficiency as the gradient layer structure to be a densely packed particle structure. Multi-particle layers of smaller size, number of layers, or efficiency than the gradient layer structure can be considered to be part of the gradient layer structure.

The particles within the layers can be in a densely packed structure, thereby providing a high number of contact points between the particles or particles after being moved only for a short distance (e.g. less then the particle size).

The composite material can be used to mitigate and/or remediate the damage of high intensity compression waves, such as shock waves caused be an explosion. While not wishing to be bound by theory, several mechanisms are presented which are assumed to be responsible for the mitigating features of the composite material.

Figure 7:
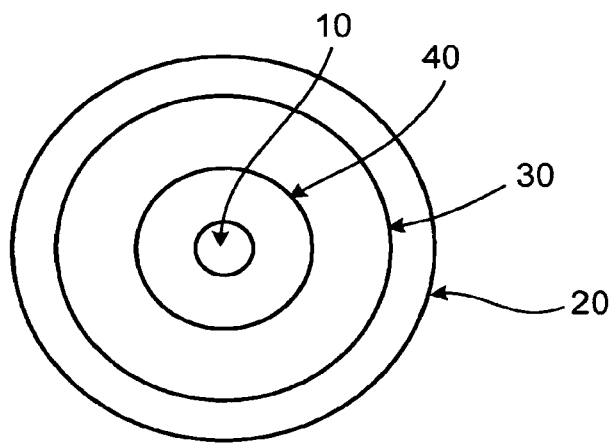
FIG. 7 is a schematic illustration of blast environment.

When an explosive device detonates, it can impact the surrounding environment, in particular the blast zone, through various distinct ways. In particular, as shown in FIG. 7, the explosion of a bomb 10 results in an initial bomb blast with a shock wave 20 of high pressure, i.e., a compression wave, followed by a low pressure zone 30.

The bomb blast can be viewed as a three dimensional wave emanating from the origin of the bomb blast. The leading edge of the blast wave exhibits a nearly discontinuous increase in pressure, density and temperature. The transmission of a bomb blast through a medium is inherently a nonlinear process and can be described by nonlinear equations of motion. Considering an ideal bomb blast produced from a spherical and symmetric source and propagated in a still and homogenous medium, the resulting bomb blast will also be perfectly spherical and therefore the characteristics of the blast wave are functions of a distance R from the center of the source and the time to travel a distance t.

Figure 8:
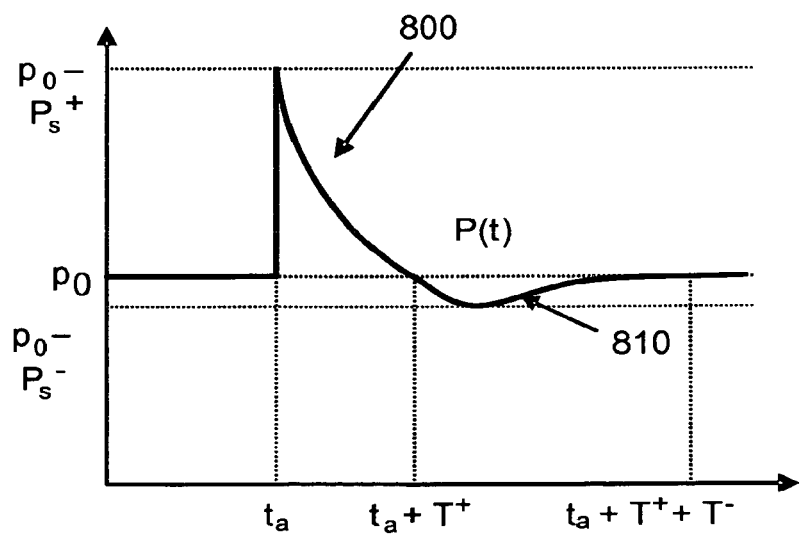
FIG. 8 is a graph of a temporal pressure development in a shock wave.

As shown in FIG. 8, the pressure changes across the shock wave 20 and the low pressure zone 30. Prior to the impact of the shock wave 20, at a given point, the pressure is equal to the ambient pressure $p_0$. At a time $t_a$ that coincides with the arrival of the shock front, the pressure rises discontinuously to a peak pressure of $p_0+P_s^+$ (over-pressure 800 in the shock wave zone 20). The pressure then decays to ambient pressure in a total time $t_a+T^+$, drops to a reduced pressure $p_0-P_s^-$ (under-pressure 810 in the low pressure zone 30), and eventually returns to ambient pressure $p_0$ in a total time $t_a+T^++T^-$.

When compression of a medium exceeds the ability of thermal motion to dissipate the energy, the over-pressure 800 occurs. The peak pressure $p_0+P_s^+$ of the over-pressure 800 can be correlated to the damage produced from the explosion and is considered a primary source of bomb related injuries. Through increasing the over-pressure 800, the reflection of a blast wave from a surface can magnify its destructive power several times. For example, when the shock wave 20 impacts upon a solid surface, it can reflect off the surface and increasing up to nine times in destructive power. Thus, being able to control the reflection of the blast wave based, for example, on coatings of the composite material can allow reducing the destructive power.

The explosion can further result in the formation of a fire ball 40, which trails the blast. Additional secondary blast effects can present distinct threats to life, limb, and property. For example, radioactive materials can cause significant health issues to victims initially impacted by a detonation, along with individuals who later come into contact with blast victims and/or materials exposed to radioactive materials. Chemical agents, such as, for example, nerve, blister, blood, and choking agents, can be released into the environment causing poisoning in people and the environment. Biological materials and/or biological toxins (e.g., *Bacillus anthracis*), viral agents (e.g., SARS and smallpox), biological toxins (e.g., ricin), or other types of biological materials (e.g., Q fever) can incapacitate, kill, or contaminate the environment.

In the case of electromagnetic weaponry, humans can suffer tissue damage, and electronic systems can suffer irreversible damage. Sonic blasts can rupture living tissue, destroy hydraulic, electronic, and mechanical systems and can propagate large distances from the initial blast source. In addition, other substances can cause a plethora of destructive responses by, for example, malicious intent or natural tendency. Although not shown, another blast effect is caused by accelerating particulate material and shrapnel that can also result from the force of the blast.

As described below in connection with, for example, FIGS. 11-24, an embodiment of a composite material can be configured to mitigate and/or remediate one or several of those secondary blast effects.

Figure 9:
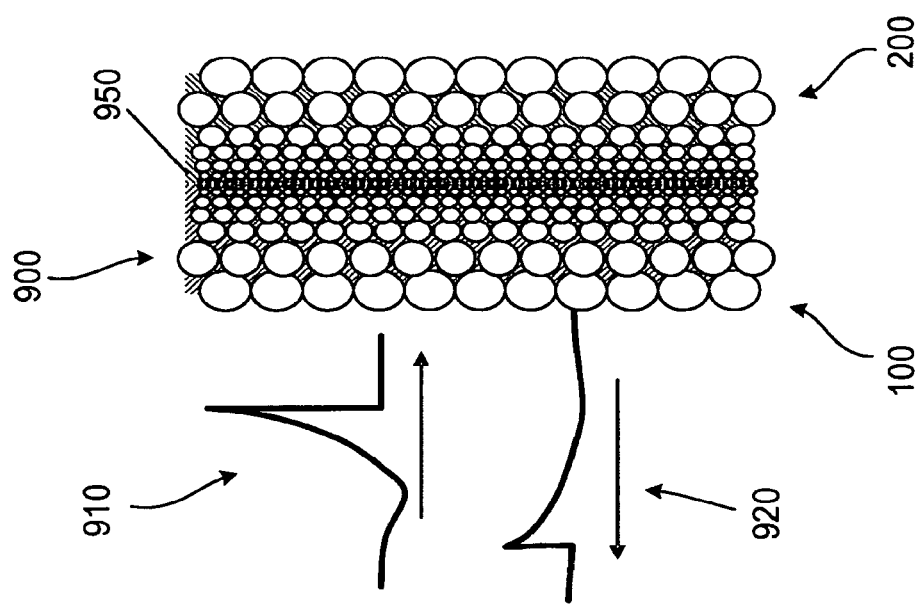
FIG. 9 is a schematic illustration of a reflection of a shock wave at a seventh composite material.

While not wishing to be bound by theory, several mechanisms are explained in connection with FIGS. 9 and 10. As illustrated in FIG. 9, the mechanisms are considered to contribute to the reduction of the destructive power of a shock wave 910 when reflected from a composite material 900 with a gradient layer structure. Exemplary mechanisms include energy absorption, wave dispersion, and braking of the wave symmetry.

Figure 10:
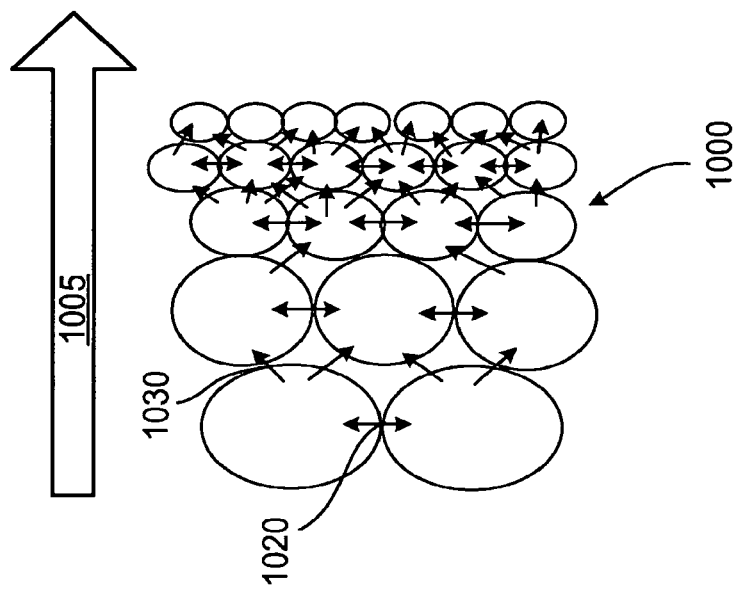
FIG. 10 is a schematic illustration of momentum transfer in a gradient layer structure.

While in FIGS. 9 and 10 essentially gradient layers are shown, it is noted that the densely packed particle structure can be based, for example, on one or more of the indicated layers. In addition, while most of the discussion of the densely packed particle structure refers to layers, similar considerations can most of the time be performed for non-layered structures.

In FIG. 9, a reflected shock wave 920 is illustrated to have a reduce amplitude corresponding to an energy absorption mechanism during reflection. The energy absorption can be based on internal friction (due to shear forces between the layers), inelastic interaction between particles, and/or the breaking of particles or particle shells.

In addition, the reflected shock wave 920 can be stretched in time (as shown), e.g., dispersed due to a modified momentum transfer mechanism based on the gradient structure and/or densely packed particle structure as discussed in connection with FIG. 10. The propagation of the shock wave in the direction of arrow 1005 through a gradient layer structure 1000 depends specially and temporally on the momentum transfer between the particles, e.g., of the various layers of the gradient layer structure 1000. As indicated in FIG. 10 through double arrows 1020, momentum can be transferred between particles of the same layer. A momentum transfer between particles of neighboring layers is in general not parallel to the propagation direction of the shock wave through the composite material. Arrows 1030 indicate the momentum transfer direction between particles of neighboring layers, which is given through the contact points of those particles. Thus, the momentum associated with the impacting shock wave can be redirected and then partially absorbed within the layers. Based on the large number of contact points and momentum transfer events, the increased particle numbers in the layers with the smaller particles are assumed to contribute to the reduction in energy.

Figure 20:
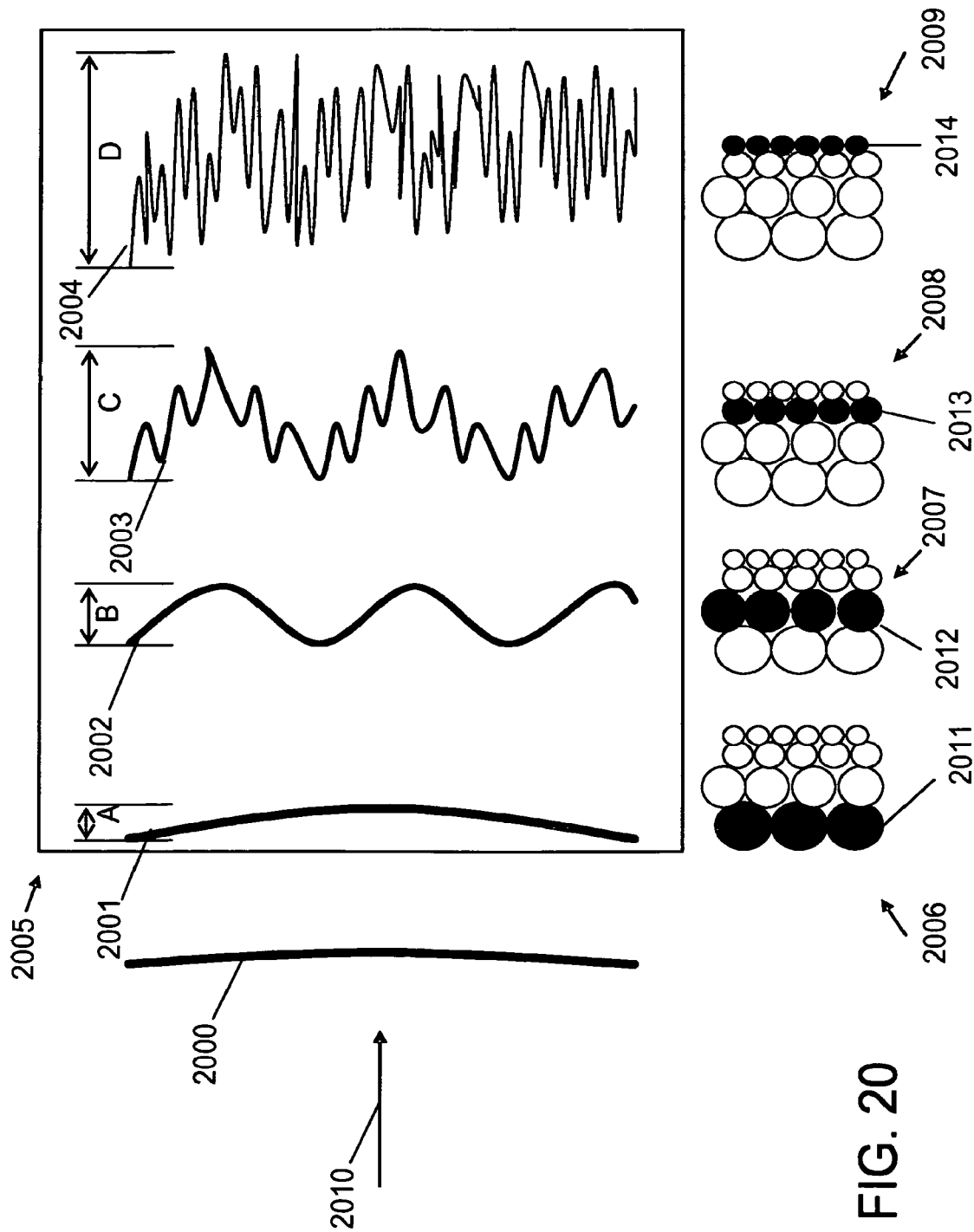
FIG. 20 is a schematic illustration of a compression wave deformation in a gradient layer structure.

Moreover, as explained in connection with FIG. 20 the symmetry of a wave front 2000 of, e.g., a shock wave can be distorted during propagation within a composite material 2005 along a direction 2010 of propagation. FIG. 20 shows a sequence of schematic illustrations of the wave front 2000 at four positions within the composite material 2005. Four schematic drawings 2006, 2007, 2008, and 2009 of the composite material 2005 illustrate additionally the location of four increasingly distorted wave fronts 2001, 2002, 2003, and 2004. Layers with black spheres correspond to the position of the wave front within the gradient layer structure 2005.

As shown in FIG. 20, the incident wave front 2000 is assumed to be essentially a planar wave that is well defined and has a large amplitude (shock wave). In FIG. 20, the magnitude of the amplitude is illustrated by the thickness of the lines representing the wave front.

Within the composite material 2005, the wave front of the compression wave becomes distorted. Specifically, when interacting with particles of various sizes of the various layers of the gradient layer structure 2005, and, in particular, when advancing from one layer to another, the planar form of the wave front is distorted.

For example, and while not wishing to be bound by theory, at some locations in the plane of the wave front, the shock wave propagates slower than at others. For a first layer 2011 of the gradient layer structure 2005, the upper and lower parts of the wave front 2001 are delayed. Thus, in the first layer 2011, the spatial extent of the compression wave in the direction 2010 of propagation increases to a spreading A.

When the wave front reaches a second layer 2012, a third layer 2013, and a forth layer 2014, the wave front is spread accordingly over larger and larger spatial extents B, C, and D. As the distorting affect of the composite material 2005 extends over the complete wave front, the shape of the wave front is distorted at all spatial positions within the "surface" of the wave front, which is illustrated by the large positional fluctuation in the direction of propagation of the wave front at the forth layer 2014.

In FIG. 20, the illustration of the deformation of the wave front is to be understood to be explanatory with regard to an interaction of the composite material that can vary from layer to layer, for different types and sizes of particles, etc. While FIG. 20 illustrates the deformation based on a gradient from large to small particles, also a reversed gradient can interact with an incoming shock wave layer by layer in a similar manner.

At the same time, the amplitude of the compression wave is reduced during propagation of the wave front from layer to layer indicated through thinner lines for the wave fronts at subsequent layers. Thus, the form of a compression wave can be perturbed and stretched. Disruption of the wave form can further assist in diminishing the destructive potential of a reflected wave. For example, it causes destructive interference of a reflected and not-reflected part of the shock wave, thereby reducing, for example, the combined danger of bomb blasts close to reflecting surfaces.

As explained in connection with FIGS. 7 and 8, a shock wave resulting from an explosive blast can take the form of a sharp change in gas properties on the order of a few mean free paths, for example micrometer scale changes in thickness at atmospheric conditions. While not wishing to be bound by theory, the percentage of energy lost or dispersed as a wave travels across a composite medium based on loose particles is not as dependent on the size and velocities of the particles. The mechanisms can be a function of the number of particles across the gradient and the amount by which the particles average size successively decreases across the gradient. Thus, the normalized kinetic energy of a wave can be assumed to decay with the number of particles present in the composite material. Factors intrinsic to a compression wave that can influence the propagation characteristics of a wave impacting a composite material can include further, for example, energy flux, intensity, and pressure associated with the compression.

The reduction in energy of a compression wave can vary for any particular embodiment of a composite material. In particular, the reduction in energy, in accordance with the various embodiments, can be a function of one or more of the proposed contributing mechanisms. The level of energy reduction within a composite material can be analyzed by determining the contributions from, e.g., the energy dissipated by molecular friction in view of the potential, kinetic and surface energies within the system, by rupture of the particles, and redirection of the momentum thereby reducing. While not wishing to be bound by theory, the level of energy reduction resulting from the at least partial destruction of the spatial symmetry can be, for example, a function of the number of layers of graded particles, the differences in median particle sizes and masses, and other particulars of the wave form itself.

An energy balance analysis as a function of particle to particle interaction can be calculated by determining: the geometry of each particle, Poisson's ratio, Young's modulus, and inter granular surface contact area. For two perfectly spherical particles having radii $R_1$ and $R_2$, and shared contact surface $C_{12}$, the energy between the two spheres can be expressed as a function of contact area:

$$Energy_{c_{12}} = \frac{8}{15}\left(\left(\frac{1-\sigma_1^2}{E_1}\right)+\left(\frac{1-\sigma_2^2}{E_2}\right)\right)^{-1}\sqrt{\frac{R_1 R_2}{R_1 + R_2}} * C_{12}^{\frac{5}{2}}$$

wherein σ is Poisson's ratio, E is the Young's modulus, and subscripts 1 and 2 refer to the individual grains. Poisson's ratio, as used herein, is defined as the ratio of the relative strain normal to the applied load (transverse strain) divided by the relative strain in the direction of the applied load (axial strain). Young's modulus, as used herein, is defined as a measure of the stiffness of a material, and is also known as the modulus of elasticity, elastic modulus or tensile modulus.

Thus, a reduction in energy can be related to real time effects, such as, for example, a reduction in shock wave amplitude, shock wave over pressure, area of fragmentation, area of blast damage, the relative destructive power of the shock wave, and changes in the mechanical energy generated by the blast. In various embodiments, order of magnitude reductions in each component can be expected.

In other words, when subjected to the impact of a blast, the impact energy from the blast travels across the composite material and is increasingly deflected in different directions by the interaction with the increasing number of contact points. This multidirectional deflection results in a net reduction of energy as the directional components increasingly cancel due to opposing directional components. For a gradient structure, the deflection due to a size gradient in the average particle sizes of a layer can also cause breakdown in the translational symmetry of the impact wave, further resulting in a reduction of energy.

As exemplified schematically in FIG. 10, as the impact energy comes in contact with ever changing particle sizes the impact is differentiated into an ever changing amount of separate energies each with a distinct vector quantity, characterized by its magnitude and direction. As the direction of the impact energy travels across the gradient it is then deflected in different directions. The deflection results in a net reduction of energy as the directional components increasingly cancel due to opposing directional components.

Further, the impact energy could also dissipate through inter-granular friction, re-orientation of momentum transfer and the resulting shear forces within the composite material as the compression wave traverses the composite material causing re-orientation of the particles.

In addition, a blast wave is also disrupted as a result of a breakdown of translational symmetry, a reduction in the blast wave energy due to increasing attenuation, or a combination thereof.

While not wishing to be bound by theory, in one embodiment a compression wave traveling across a composite material can be squeezed within the gradient structure due to the reduction or increase in particle size across the gradient of a composite material, resulting in at least the partial destruction of the spatial symmetry of the wave. This can also be expressed as a breakdown of translational symmetry, wherein a solitary wave loses its reflection symmetry and is diminished and/or destroyed. In some embodiments, such a breakdown in translational symmetry can result in a significant reduction in energy.

In other embodiments, such a breakdown in translational symmetry results in a destruction of a wave. In other embodiments, the translational symmetry relates to the momentum conservation law, as described by Noether's theorem. As momentum must be conserved, the speed of the smaller particles will increase, and thereby disrupt the wave form, and thereby reduce the increase of the destructive power of the wave e.g. upon reflection.

While not wishing to be bound by theory, for the gradient shown in FIG. 9, the leading edge of an impact wave advances first on progressively smaller particles having less mass, the smaller particles can, in various embodiments, move at a faster rate than the larger particles, resulting in a change in the propagation of the wave. Such a change can be, for example, in the form of a non-linear increase in wavelength (stretching) of the wave, a non-linear change in the wave amplitude, and/or a change in the waveform itself. While not wishing to be bound by theory, a similar effect on the wave form may be caused when an impact wave advances on progressively larger particles on the back side of the composite material 900 or within a densely packed microscale particle structure.

As the waveform changes, the wave can, in various embodiments, experience a decrease in kinetic energy and an increase in frequency. The increase in wave form frequency, in turn increases the attenuation of the particles experiencing the waveform. The maximum attenuation achievable for a particular system can depend on, for example, the radii and number of individual particles in the system. Thus, through the selection of materials, it can be possible to create a specific level or system of attenuations for a wave.

Changes, such as increases, in the attenuation of a wave can assist in the dissipation of a wave's energy. For example, the frictional dissipation of energy for larger, e.g. macroscale particles can be on approximately the same scale as collision energy dissipation. For microscale particles (e.g., nanoscale), the frictional dissipation can be greater than the collision energy dissipation.

In various embodiments, composite materials can provide engineered material systems, enabling the utilization of elastoplastic and finite plastic deformation regimes, while providing control over reflection of the stress wave propagation to effectively dissipate shock wave progressions.

The effect of a composite material can also be viewed based on the propagation of the wave. Waves are transmitted through gases, plasma, and liquids as longitudinal waves, also called compression waves. Through solids, however, waves can be transmitted as both longitudinal and transverse waves. Longitudinal waves are waves of alternating pressure deviations from the equilibrium pressure, causing local regions of compression and rarefaction, while transverse waves in solids, are waves of alternating shear stress. Shear stress is one way in which our invention reduces the energy of the wave.

Matter in the medium experiencing the wave is periodically displaced by the compression wave. The energy carried by the wave can convert back and forth between the potential energy of the extra compression (in case of longitudinal waves) or lateral displacement strain (in case of transverse waves) of the matter and the kinetic energy of the oscillations of the medium.

In regards to kinetic energy, a propagating wave moves the molecules in the medium which is carrying it, i.e. compression and rarefaction as the wave travels through the medium. In order for the compressions and rarefactions to occur, the molecules must move closer together (compression) and further apart (rarefaction). Movement implies velocity, so there must be a velocity component which is associated with the displacement component of the wave. The resulting velocity is a function of the materials (packing structure, density, stiffness, mass, inertia). Pressure is a scalar quantity and has no direction; pressure relates to a point and not to a particular direction. Velocity on the other hand is a vector and must have direction; things move from one position to another. It is the velocity component which gives a wave its direction. The composite material changes and/or splits the velocity vector as a function of particles impinging upon one another, thereby reducing the energy in the system.

The velocity and pressure components of a wave are related to each other in terms of the density and springiness of the medium experiencing the wave. A propagating medium which has a low density and weak spring would have a higher amplitude in its velocity component for a given pressure amplitude compared with a medium which is denser and has stronger springs.

Mechanical waves originate in the forced motion of a portion of a deformable medium. Mechanical waves are characterized by the transport of energy through motions of particles about an equilibrium position. In case of the composite material, particles of a first layer subject to an incoming compression wave are accelerated by the change in pressure and pushed in the direction of the second layer. As one layer of the composite material after the other is affected, the wave progresses through the medium. In this process the resistance offered to deformation by the consistency of the composite material, as well as the resistance to motion offered by inertia, must be overcome. As the disturbance propagates through the composite material, it carries along amounts of energy in the forms of kinetic and potential energies. The transmission of energy is affected because motion is passed on from one particle to the next and not by any sustained bulk motion of the entire medium.

Deformability and inertia are essential properties of a medium for the transmission of mechanical wave. If a medium were not deformable, any part of the medium would immediately experience a disturbance in the form of an inertial force, or acceleration, upon application of a localized excitation.

When, e.g., the particle diameters progressively shrink in radius by some factor, the spatial symmetry of the solitary wave is destroyed. The leading edge of the wave is assumed to travel progressively faster whereas the trailing part of the wave is assumed to travel progressively slower. This is due to the lighter mass of the smaller particles moving faster than their larger neighbors. Thus, it is assumed that progressively less energy is carried by the leading edge.

Thus, the resulting lag and/or compression of a shock wave 20 traveling through a composite material can be used to muffle the shock wave 20 within the composite material and, when used with, e.g., elastic materials, can provide a mechanical and/or electrical/magnetic advantage.

The induced change in the wave form can be utilized to provide a smart material that, for example, allows utilizing a specific change in the wave form to actuate mechanical sensors or actuators incorporated into the material or those incorporated into or on the substrate upon which the invention is coated. As an example, the shock wave can be used to provide an electrical stimulus to piezoelectric materials, which in turn can actuate a variety of electrical systems.

Returning to the structural features of the composite material, it should be appreciated that the plurality of particles can provide a level of porosity within the composite material that depends on the particle size. Thus, the composite material can includes voids or spaces where particle contact points do not exist. The porosity can be a continuous pore microstructure within a given layer of particles or even throughout the entire composite material itself. Alternatively, the resulting pore microstructure can also be discontinuous with respect to a given layer of particles and even discontinuous throughout the entire material itself.

The level of porosity (continuous, discontinuous, or a combination thereof) can affect material properties. When producing a composite system layer by layer, one can provide a layer specific porosity. In addition, the size of the pores differs in individual layers along the particle size gradient. The varying densities within the composite material can further perturb a compression wave (amplitude, frequency, spatial form).

In some embodiments, no binding layer or intermediary material between the particles is required to hold the composite material together. In some embodiments, nanoscale and mesoscale particles but also some macroscale particles can provide surface interaction that does not require a glue-like binding material and nevertheless provides the particle sufficient mobility for momentum transfer. A similar binding between a substrate and a layer contacting the substrate can be used.

For example, in some embodiments, functionalized polymer based microparticles of alternating layers can provide carboxylic acid and amine groups on their surface. The coupling between the acid and base functionalities can be used to bind the layers. To provide, for example, a phenylsulfonic acid functionality on the surface of a substrate, polar carbon nanoparticle (produced, for example by Cabot Corp. with the product name Cabot Emperor 2000) can be incorporated in the substrate or a coating of the substrate. In particular, carbon nanoparticle based paint materials (e.g., jet black paint) can be used as the layer upon which the composite layer structure is built. For example, one would first paint a substrate with a nanoparticle paint and then apply the first particle layer.

As substrate materials, hydrophilic-glass or treated polycarbonate work well. Both of these materials can be made more hydrophilic by applying a layer of poly-L-lysine or indoor Rain-X, a commercial antifogging material. An example of a binding between a UV treated polycarbonate substrate and the layer contacting the substrate and between the particles of the layers is described below in EXAMPLE 4.

In addition or alternatively, based on an adjusted pH value during manufacture of the composite material, one can use electrostatic interactions to bind the layers of microparticles.

In some embodiments, some of the microparticles can carry their own binding coating. For example, microparticles of one of the layers, can be functionalized with a hydrophobic coating, which is configured to hold the microparticles to a hydrophobic (polymer) surface. Thus, such a binding coating can build up an attractive force to a neighboring layer of polymeric microparticles. Thus, alternating layers within the gradient layer structure can be coated and non-coated to form the composite material.

In some embodiments, charged particles can be based on an ionomer (charged polymer) as a binder. If microparticles are positively charged using a functionalized coating, a layer of microparticles can be followed by a layer of ionomer microparticles that binds the next layer.

The above implementations to hold particles together can be applied to the complete composite material or only to layers of smaller (nanoscale and/or mesoscale) particles. The implementations can be applied between layers of microparticles as well as within one layer between particles. Within a composite material, the implementations can be used together if feasable or vary within the composite material.

In some applications, one will need to complement the composite material with an intermediary material, which can be within the composite material, and/or with a binding layer (a top layer or a layer between layers), such that at least some of the microparticles (e.g., the larger microparticles of the layer structure) or all microparticles are held together.

For example, a polymer filling, e.g. polymerizable monomers, a resin filling and/or cyclodextrin filling can be used as a intermediary material. The cyclodextrin can act in a similar manner as the above discussed ionomer. The cyclodextrin does not need to fill the pore microstructure completely and uses electrostatics to bind microparticles.

In some embodiments, a resin can fill the pore microstructure and add to some extent to or even increase the thickness of a layer. Between layers, one can also add a polymer film that can be made as thin as several nanometers thereby adding slightly thickness to the layer structure.

Intermediary materials can be used to fill the accessible volume. For example, the porosity of the composite material 900 in FIG. 9 can at least be partially filled with an intermediary material 950. In general, the intermediary material can span a portion of at least one particle layer, span an entire particle layer, or can even span the entire composite material. The intermediary material can provide some kind of support for the particles without essentially affecting the mobility of the particles and the involved momentum transfer between particles.

The selection of an intermediary material can depend, at least in part, upon the particular desired effect and the particular end use application for the composite material. For example, one can introduce oil into the porosity of the composite material using capillary effect. Intermediary materials can, for example, be utilized to alter the energy absorption characteristics of the composite material. For instance, the intermediary material can be used to augment the compression behavior of the material.

Alternatively, or in addition, a fire retardant can be incorporated into the system as an intermediary material. Moreover, examples for an intermediary material can include materials that when combined via pressure and temperature, interact with the surrounding material to change the characteristics of the resulting material to produce foam, aerogel, solgel etc.

Furthermore, the intermediary material can change the density of a given layer to further disrupt the wave form of the compression wave. The intermediary material 950 can further change the stiffness of the composite material 900, thereby allowing the composite material to be free standing, for example. The intermediary material can further be used to impart cosmetic or aromatic value to the composite material.

In any of the composite materials illustrated in the drawings, intermediary material can in principle be used or it can be applied either in whole or in part throughout the structure.

In addition to the energy absorption properties provided by the gradient layer structure and the densely packed particle structure, the composite material can include core-shell particles 1100 as shown in FIG. 11. The core-shell particles can themselves modify the energy absorption and in addition can provide in some embodiments a material release function to the composite material. The core-shell particles 1100 includes a core-material 1110 (e.g., solid, liquid, gaseous, gel-type material) within a shell 1120. The core material can fill the encapsulated material completely or partly, e.g., the core is filled with different aggregate states. Further, combinations of materials can be encapsulated. Examples for a core-shell particle 1100 include filled microspheres (or spheres) and other encapsulating particles that encapsulate one or more core materials 1110. In some core-shell particles the core can be hollow (e.g., filled with a gas).

The thickness of the shell 1120 can be, for example, between 30% and 1% of the diameter of the core-shell particle 1100. The score-shell particle can be a microscale particle. In some embodiments using a large amount of a specific core-material, the core-shell particles can have a diameter of several millimeters.

The shell material of the shell 1120 can be pliable such that the shell 1120 can deform, e.g., upon impact of a compression wave of a bomb blast. The shell material of the shell 1120 can in addition or alternatively be pliable such that the shell 1120 can deform when subjected to, for example, over pressure. The deformation and pliability can contribute to the energy absorption process.

The core-shell particles (as well as the particles in general) can be spherically or asymmetrically shaped. The shell 1120 can be a continuous wall surrounding the core or can be designed to have droplets of the core material embedded through the microcapsule. In some embodiments, the shell can be porous.

Upon impact of a compression wave, the particle shells 1120 within an impacted layer can deform such that a portion of the energy associated with compression wave is therefore absorbed by the core-shell particle. As the shell 1120 deforms, it can also apply pressure to particles adjacent to it, thus transferring a portion of the impact energy to the energy required for subsequent deformation and angular pressure on neighboring particles.

Moreover, to provide specific features in a, pre-blast environment, for example, the core material can be configured to have various features. For example, it may operate as RF shielding to impede remote detonation of bombs.

Additionally, or alternatively, the core material 1110 can, for example, include an agent material (e.g., a secondary blast agent), the presence of which can be utilized to interact with secondary blast effects in a post blast environment in a predetermined manner. For example, in one embodiment, the core-shell particles 1100 can encapsulate one or more agent materials capable of mitigating and/or remediating secondary blast effects, such as flash, fire, chemical agent release, biological agent release, radiation release, and shock wave caused damages. To that end, agent materials can include without limitation, fire retardants, flash suppressants, medicinal treatments, and the like.

The core-shell particle 1100 can also encapsulate one or more agent materials that when combined through actuation or actuation and rupture, can interact with each other or with the blast environment to produce a desired effect. For example, in one embodiment it is contemplated that separate agent materials can be encapsulated such that when combined through rupture of several core-shell particles 1100 the materials react to generate fast setting structural foam. Such foam can, for example, assist in mitigating and/or remediating oil loss from ruptured pipelines as explained in connection with FIG. 18 below.

In use, the shell 1120 of the core-shell particle 1100 can deform under the impact pressure from a shock wave to a deformation where shell rupture occurs, thus releasing the core material 1110 as an agent material, e.g., a secondary blast agent, which is thereby directly released into the blast zone. The released agent materials can then directly interact with the environment to mitigate and/or remediate, e.g., one or more secondary blast effects.

Moreover, it is contemplated that by exposing an agent material to a combination of relatively large pressure and heat changes, the released agent material can, for example, be consumed in or can otherwise participate in a reaction that produces further reaction products that can also be beneficial to remediation and/or mitigation of blast effects.

Figure 12:
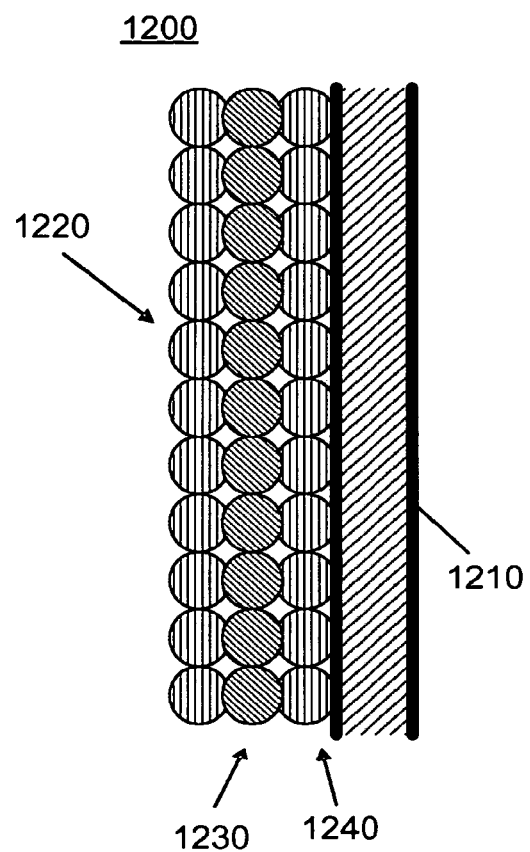
FIG. 12 is a schematic cross sectional view of a planar layer structure of mono-dispersed core-shell particles on a substrate.

As shown in FIG. 12, core-shell particles can form a composite material 1200 that can be applied as a coating or as a film to a substrate 1210, for example, before or after applying a gradient layer structure. The composite material 1200 includes three mono-dispersed layers of core-shell particles 1220, 1230, and 1240. The core material of the layers 1220 and 1240 is indicated to be the same (vertical hatching) and to be different from the center layer 1230 (diagonal hatching). Under certain conditions, e.g., under high pressure caused by an explosion, the shells of the core-shell particles rupture and release the core material. The core material can provide mitigation for itself and/or in combination and/or after reaction with each other. The functionality of the composite material 1200 can thereby be adapted to the specific application.

Thus, as shells rupture in successive layers, agent materials contained in different core-shell particles can be sequentially introduced into the blast zone allowing more complex systems to be introduced and allowing sequential reactions to occur in a predefined manner. This staggering of additional agent materials (secondary agent materials, tertiary agent materials, quatemary agent materials, etc.) in a pre-designed manner can further allow sequential reactions whose sum reaction is greater than their individual contributions.

The composite material 1300 of FIG. 13 includes a single mono-dispersed core-shell particle layer 1310, a gradient layer structure 1320, a densely packed particle structure 1325, and a substrate 1330.

Mono-dispersed layer 1310 made of core-shell particles is provided in front of gradient layer structure 1320. Moreover, layer 1335 of the gradient layer structure 1320 includes core-shell particles and layer 1345 of the densely packed particle structure 1325 includes also core-shell particles. Thus, the advantages of the composite material can be combined with the advantages of the core-shell particles. This allows further adapting threshold conditions within the gradient layer structure for the release of the core-material.

Similarly, core-shell particles can be included in concentric gradient layer structures. In FIG. 14, a composite material 1400 includes as a center particle a core-shell particle 1410. A layer 1420 having a thickness of multiple particle diameters is formed around the core-shell particle 1410 as a densely packed particle structure. Then, three concentric layers 1430, 1440, 1450 consisting of mono-dispersed particles of increasing size are applied. An intermediary material 1460 provides structural cohesion of the particles.

FIG. 55 shows a cross-section of a densely packed particle structure that includes (from left to right) a core-shell particle size small, a solid particle size small, a core-shell particle size large, a solid particle size small, a solid particle size large. Due to the difference in size, the small particles can fill spaces between the large particles thereby interlocking the different particle layers.

Plotting the size of the particles over the layers provides access to the type of structures included in a composite material. For some of the presented examples, the particle size dependence was illustrated in FIGS. 43 to 45. However, the composite material is not restricted to two or three structural units, where a structural unit is a gradient structure or a densely packed structure. (It is noted that also a gradient structure includes densely packed particles but with the additional requirement of a particle size gradient). One can repeat structural units, alternate structural units, repeat combination of structural units, or combine different combinations of structural units.

Additional examples of combinations of structural units are shown in FIGS. 46-48. In the configuration shown in FIG. 46, a gradient structure is provided on each side of a densely packed particle structure, such that on both sides small particles form the outer surface, i.e., the gradients have opposite direction.

Figures 46, 47, 48:
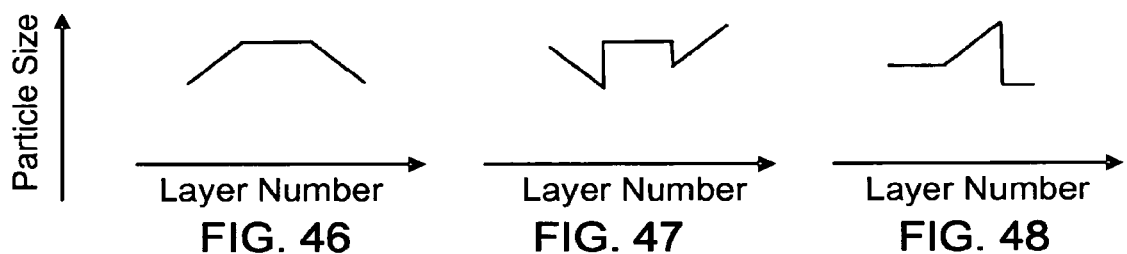

In the configuration shown in FIG. 47, two outer gradient structures form gradients in different ranges of particle sizes with large particles form the outer surfaces. An inner densely packed particle structure includes also larger particles.

In the configuration shown in FIG. 48, densely packed particle structures 4810 and 4820 of different particle sizes and thicknesses form a sandwich structure with an inner one-directional gradient structure.

As discussed herein, the particles of the gradient structures and densely packed particle structures can be solid particles or core-shell particles. FIGS. 49-54 illustrate various examples of distributing and mixing these particles with in a composite material. A similar freedom exists for different types of particles, such as shapes, materials etc.

Figures 49, 50, 51:
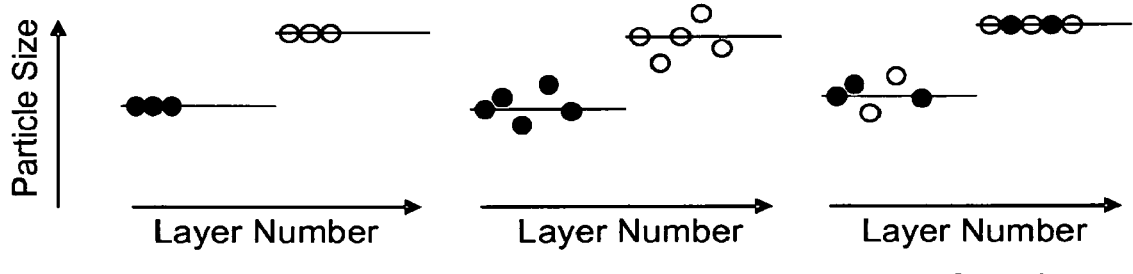
FIGS. 49 to 54 are schematic plots of particle sizes distribution of the layers of a composite material based on solid and core-shell particles.

In FIG. 49, two densely packed particle structures of different size are in contact with each other, one having exclusively solid particles and the other exclusively core-shell particles. Even though three particles are indicated, each densely packed particle structure may have 10, 20, 30, . . . 50, 60, . . . 100 layers or a thickness of 10, 20, 30, . . . 50, 60, . . . 100 (non-layered particles). In addition, the layers may be looser so that there is some overlap between neighboring layers as described above. For small numbers of particles for each size, one may repeat the sequence of the two sizes to form a densely packed particle structure.

While in FIG. 49 the particles of each type were essentially of the same size, FIG. 50 shows an embodiment in which each type of particle covers a range of sizes that are randomly arranged within each densely packed particle structure. Even though the first and the last particle of densely packed particle structure may not have the same size, this difference is not considered to be a gradient in view of the fluctuation of the particle size. While the solid particles of the densely packed particle structure having a smaller size has the same size in the first and fifth layer, the core-shell particles of the first and fifth layer decrease slightly in size. Due to the fluctuation in particle size of the core-shell particles, the second layer from the right has even a smaller size than the fifth layer.

FIG. 51 illustrates that particles within a densely packed particle structure can include solid and core-shell particles either within a range of particle sizes (left side) or with the same size (right side).

Figures 52, 53, 54:
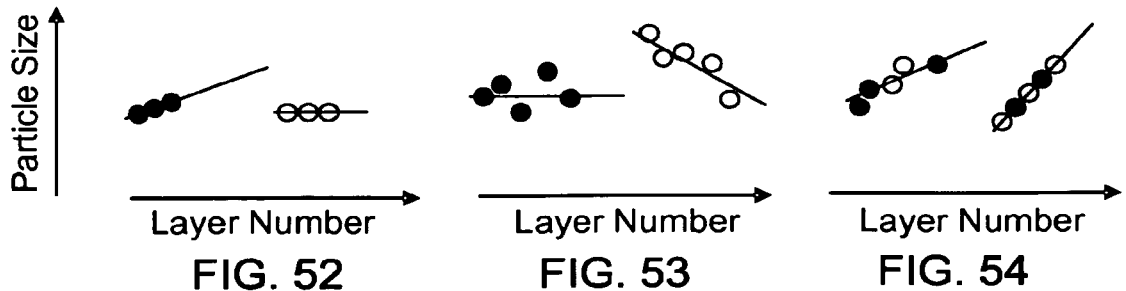

While FIGS. 49 to 51 referred to two densely packed particle structures only, FIGS. 52-54 illustrate similar particle size distributions for gradient structures and densely packed particle structure (FIG. 52), densely packed particle structure and gradient structures (FIG. 53), and for two gradient structures (FIG. 54).

Based on the above described composite materials, exemplary applications are described in connection with FIGS. 15-19, 21-24, and 42.

FIGS. 15 and 24 illustrate the application of the composite material in the context of waste receptacles. In FIG. 15, the composite material is attached to a support structure of a container 1500, forming for example, the structural basis for a waste receptacle. The inner surface of the container 1500 is coated with a composite material 1510 including a gradient layer structure and a densely packed particle structure that forms the inner surface of the container 1500. The composite material is representative for various configurations of the composite material, and the combinations of gradient layer structures, densely packed particle structure, and core-shell particle layers as discussed within this application, for example, in connection with FIGS. 3-6, 9, 11-14, 22, and 24, whereby the directions of the gradients illustrated in those figures is only exemplary and can be for example, reversed or vary in direction and strength.

Thus, any explosion initiated within the container 1500 and generating a shock wave is reduced in its destructive power because the shock wave looses intensity when traveling through the gradient layer structure and when reflecting from the coated walls of the container 1500. Additionally or alternatively, the outer surface of the container can be coated with a gradient layer structure.

Moreover, instead of being applied as a coating, the composite material 1510 can be attached as a film or panel. In some configurations, the support structure can be only a frame and the composite material forms, for example, transparent walls to that frame.

Alternatively, or in addition, the waste receptacle itself may consist entirely of the gradient layer structure as will be discussed below in connection with FIG. 24.

Moreover, the composite material can be transparent, opaque, or non-transparent and it can be manufactured, for example, as a film or as a bag, e.g., a waste receptacle liner. Moreover, it can be made as individual bags or in rolls, which separate at serrations. The film can be applied onto a substrate of any shape. The composite material can mitigate and/or remediate by absorption and dissipation in a predetermined manner, for example, effects of a bomb blast, which originates on either side of the composite material. In addition, the composite material can use the shock wave to mitigate and/or remediate the bomb blast by rupturing and/or vaporizing core-shell materials, such as microcapsules, which populate the gradient layers as one of the gradient layers or as a layer attached to the gradient layer structure. The core-shell material can be hollow or filled with material (core-material), concentric and/or non-concentric as discussed within this application.

Materials suitable as core material for core-shell particles of a core-shell particle layer, e.g., next to a gradient layer structure 1510 or forming a layer within the gradient layer structure 1510 or the densely packed particle structure, include flame retardants and suppressants, foam-generating materials and dispersants, materials which suppress and/or deform acoustic waves, materials which suppress smoke and dust, for example. The core material can further contain materials associated with medical treatment, for, for example, burns, infection, inflammation, pain, antibiotics, and materials used for triage medical treatment, materials which impede RF transmission, and/or electrical impulses, in order to reduce the risk to first responders from secondary devices placed and planned to be activated by remote signal, and material which impede the dispersal of biological and radioactive agents.

The composite material can further contain a sensor material that changes color when activated by a specific chemical signature of matter in its environment, e.g., carried by solid particles, gases, and/or liquids. The sensor material can be contained in the particles of the composite material, e.g., in filled or hollow microspheres and/or core-shell particles of the gradient layer structure 1510 and/or a core-shell particle layer (e.g., core-shell particle layer 2220 in FIG. 22). The sensor material can additionally, or alternatively be contained in a film or coating material, e.g., forming an outside surface of the composite material. Moreover, in addition, or alternatively, the sensor material can be contained in a binding layer (e.g., binding layer 2440 in FIG. 24) and/or in an intermediary material of the composite material (e.g., intermediary material 950 of in FIG. 9).

For example, explosives that release a (gaseous) material with a specific chemical signature can yield a concentration above a predetermined concentration in, e.g., a closed or partly closed waste receptacle. Then, the sensor material acts as a (chemically triggered) sensor and identifies the presence of the explosive in the waste receptacle by changing its color. The composite material with the sensor material can be part of a waste receptacle or of a waste receptacle liner or any structure subject to be used for hiding an explosive.

Example sensor materials for detecting explosives such as C-3, SemtexH, and TNT include a mixture comprised of zinc, glacial acetic acid and the NitriVer 3 Reagent supplied, e.g., by the Hach Co. (Cat #1407899). These materials can be combined in solution with water and can then be applied as a sensing film that is dried onto the gradient layer structure, onto the core-shell particle layer, and/or in between particle layers. In addition, or alternatively, these materials can be presented separately as, e.g., microscale particles (such as nanoscale particles) or coatings on microscale particles (such as nanoscale particles) in the gradient layers. Example particles that can be coated include, for example, zinc particles and polymer particles with acid groups. Moreover, the materials can be provided as a shell material of a core-shell particle. The reaction and detecting of, for example, TNT or RDX as described above can be adapted from the method as described in EPA METHOD 8510 "COLORIMETRIC SCREENING PROCEDURE FOR RDX AND HMX IN SOIL" Revision 0, U.S. Environmental Protection Agency, February 2007 (http://www.epa.gov/SW-846/pdfs/8510.pdf), the contents of which are hereby incorporated by reference in their entirety.

The inner layers of the composite material 1510 can provide gradient layer structures and densely packed particle structure with particles in size and sequence such that a distortion of the compression wave is achieved. Moreover, the reflected wave can be distorted and/or diminished such that, for example, the primary and secondary effects of the combined compression wave (based on the reflected wave and the initial compression wave of the bomb blast) are at least to some degree mitigated and/or remediated.

An inner layer of the composite material, with which a person usually cannot get in contact, can also include particles (microparticles, core-shell particles etc.) that contain a rodenticide for, e.g., rat control. In case of a bomb blast, the rodenticide vaporizes and/or incinerates and would not harm the environment. The layers, which contain the rodenticide, can be changed by generation of manufacture to account for the evolution of immunities in the area's rodent population.

As noted above, the composite material 1500 and the composite material 2400 can alternatively, or in combination, also be implemented in a liner that is used with a waste receptacle or used as a separate bag for waste material. In some embodiments that apply the composite structure to waste receptacles, the composite material as part of the liner or the receptacle is transparent.

When, for example, a bomb detonates within the container (waste receptacle), by the use of a timing device, (because RF shielding makes detonation by a radio signal sent to a cell phone or other radio receiver at the bomb ineffective), layers of the composite material closest to the detonation absorb the blast energy and cause rupture of the core shell particles within the composite material, which release their contents. As the shock wave moves through the composite material to the inner layer particles, deformation of the shock wave increases.

Further, as the shock wave propagates, the core-shell particles rupture in a predetermined sequence and can introduce materials into the blast environment that act, for example, as a flame retardant and dispersant and suppressant, sound suppressant, smoke and dust suppressant. The core-shell particles can further introduce into the environment materials that are used to treat burns and other wounds, impede the dispersal of biological and radioactive agents, as well as RF shielding materials and materials which impede electrical impulse, designed to reduce the risk to first responders from a second detonation caused by other devices placed and planned to be triggered by a remote signal after their arrival to aid blast victims.

Figure 17:
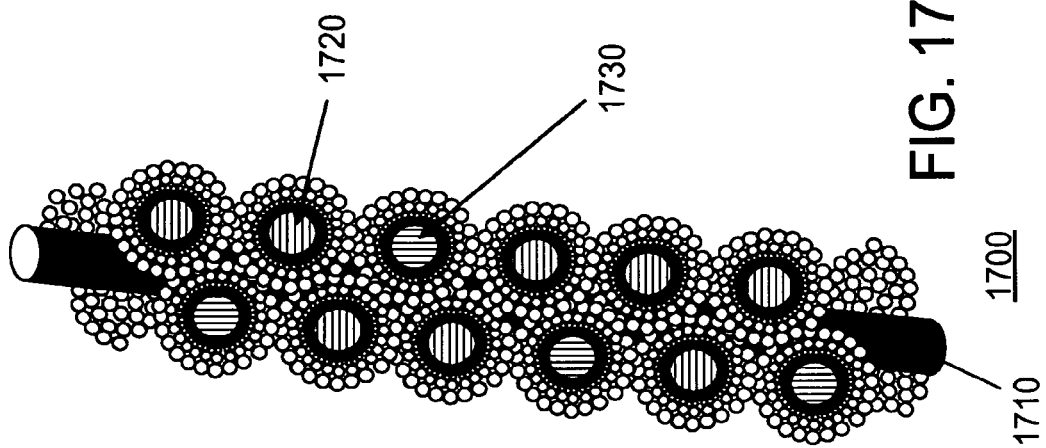
FIG. 17 is a schematic cross sectional view of a fiber coated with a composite material as shown in FIG. 12.
Figure 16:
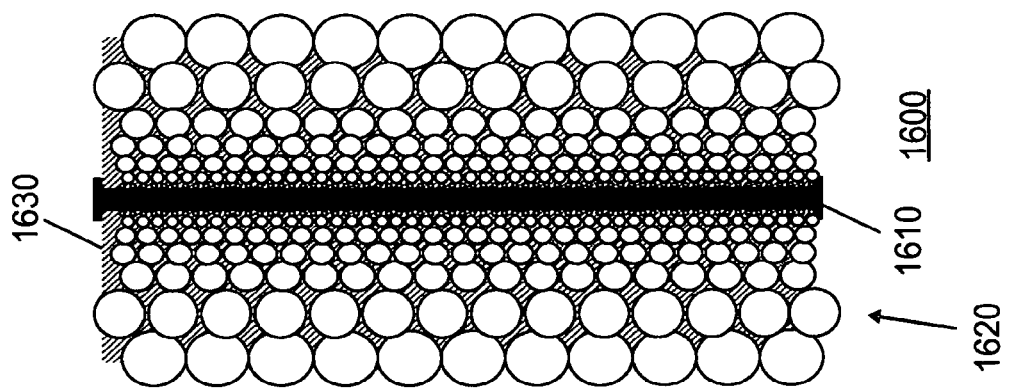
FIG. 16 is a schematic cross sectional view of a fiber coated with a composite material as shown in FIG. 1.
Figure 22:
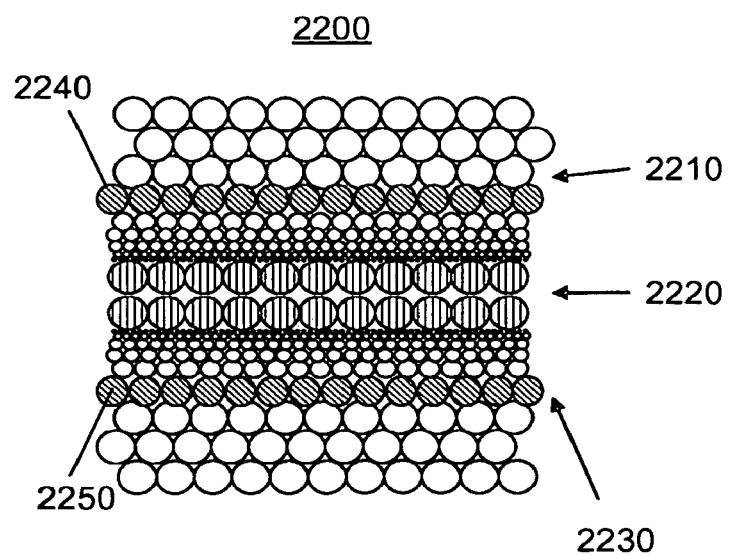
FIG. 22 is a schematic cross sectional view of an exemplary structure of microscale particles for a helmet liner pad.

In other embodiments, fibers and textiles, in general, helmets, helmet liners or helmet liner pads, and any existing structure or item can be coated or provided with a film as illustrated, for example, in FIGS. 16, 17 and 22. Fibers can be woven into cloth and thereby shield the wearer at least partly from an impacting compression wave. The coated fiber 1600 of FIG. 16 includes a core fiber 1610 that has been coated with a sequence of mono-dispersed layers 1620 of particles with increasing size. The particles are confined through an intermediary material 1630. Alternatively, one could form a similar structure without the core fiber 1610 or remove the core fiber 1610 after the gradient layer structure has been formed. As indicated above, densely packed particle structures can be formed by one or more of the gradient layers or by applying densely packed particle structures next to the gradient structure.

In FIG. 17, an alternative coated fiber 1700 includes a core fiber 1710 that has been coated with the concentric composite material 1400 of FIG. 14. Different core-materials 1720 and 1730 for the composite material 1400 are indicated. A cloth including the coated fiber 1700 provides mitigation and/or remediation of an incident compression wave and additionally can provide agent materials, such as medicine or flame suppressants and retardants. Thus, agent materials can be introduced where they are needed the most upon impact of a bomb blast. Similarly, a helmet, helmet liner or helmet liner pads can be coated with composite materials of that kind as discussed in connection with FIG. 21. Alternatively, the helmet liner and helmet liner pads can be made with composite materials of the kind discussed in connection with FIG. 21. As indicated above, densely packed particle structures can be formed by one or more of the gradient layers or by applying densely packed particle structures next to the gradient structure.

Figure 18:
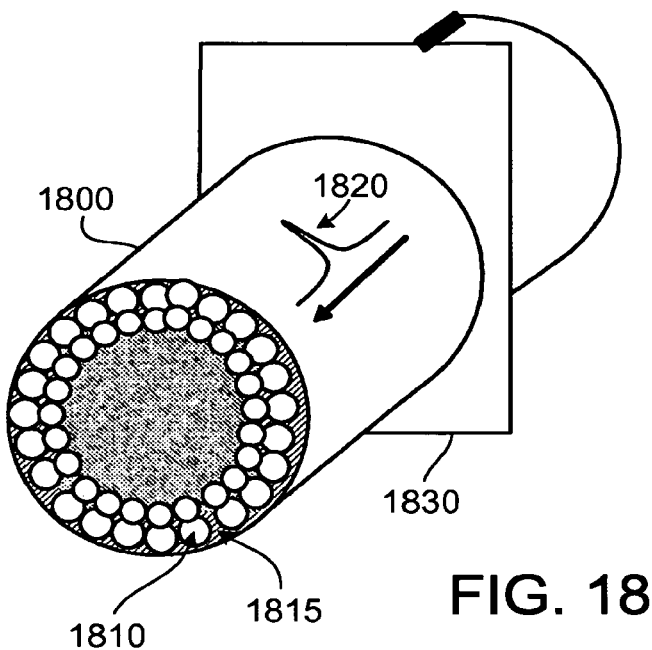
FIG. 18 is a perspective view of a pipeline.

Destructive compression waves can also be generated under different conditions. For example, the opening and closing of valves in pipeline systems can generate compression waves, even shock waves that propagate along the pipes and can case damage, including the rupture of the walls of the pipes. FIG. 18 shows schematically a pipe 1800 with a valve 1830. To reduce the risk of compression wave induced damage, the inside of the pipe 1800 can be coated with a composite material 1810 including a gradient layer structure, a densely packed particle structure, and an intermediary material 1815. The gradient can be formed perpendicular and/or parallel to the walls of the pipe 1800. A compression wave 1820 generated when operating the valve 1830 will then decrease in amplitude when impacting onto or traveling along the walls of the pipe 1800. Additionally, or alternatively core-shell particles can be included in the composite material 1810, thereby providing a core material for, e.g., mitigating the damage of leaking oil or sealing hair fractures of the pipe 1800. In addition, or alternatively, the outside can be coated similarly.

Thus, applications of the composite material can include the mitigation and/or remediation of a compression wave, caused by, e.g., a bomb blast or the opening or closing of values, traveling along pipelines and other conduits used for transport of liquids and gases, to include fossil fuels, flammable liquids, and waste materials and to mitigate and/or remediate fire, leakage, release of gases and/or other effects. The composite material can be manufactured into a casing, outer and/or inner coating, cladding, film or liner. The composite material can further be designed to alleviate stress and fatigue caused by experiencing extreme changes in temperature.

In the following, the case of fossil fuel pipelines is discussed as a specific example in greater detail. Especially in areas with risk of asymmetric warfare, pipelines can be provided with layers of the composite material on the inside and on the outside. Then, the composite material can mitigate and/or remediate the effects of a bomb blast by absorption and dissipation in a predetermined manner, which can originate on either side of the material. In addition, one can use the wave to mitigate and/or remediate effects of the bomb blast and the leaking, eventually burning oil, by rupturing and/or vaporizing, e.g., core-shell particles, which populate specific layers within or next to the gradient layer structure of the composite material. Particles of the outside gradient layers, for example, can contain flame retardants and flame suppressants, foams and dispersants, smoke suppressants. Some core-shell particles can further include materials associated with the treatment of burns, infection, inflammation, pain, antibiotics, and materials used for triage medical treatment. Other core-shell particles can contain a material that blocks RF transmission, and impedes the dispersal of biological and/or radioactive agents.

The interior layers of the composite material are configured in a gradient layer structure to cause maximum disruption of compression wave and diminishing of the reflected wave. Some particles within or bordering to the gradient layer structure can be core-shell particles containing surfactants, which can break down and aid in the dispersal of fossil fuels in order to mitigate and/or remediate its effect on the environment. Inside and outside layers can contain core-shell particles with a core material that alleviates stress and fatigue caused by experiencing extreme changes in temperature.

When, for example, a bomb detonates next to the pipeline, the outer layers of the composite material closest to the detonation absorb the blast energy and cause thereby the rupture of the hollow particles and core-shell particles, which release their contents. As the shock wave moves through the composite material, deformation of the blast wave increases. Further, as the wave reaches those core-shell particle layers one after the other, the rupture of core-shell particles can occur in a predetermined sequence to provide a flame retardant and suppressant, generate non-flammable foam, and/or other coagulants designed to contain the flow of materials thereby preparing the area for decontamination and collection of the material released by the effect of the blast into the environment. Contemporaneously, the composite material can introduce into the blast's target environment the materials that treat burns and other wounds or impede the dispersal of biological and radioactive agents. It can further introduce into that environment RF shielding materials.

Figure 19:
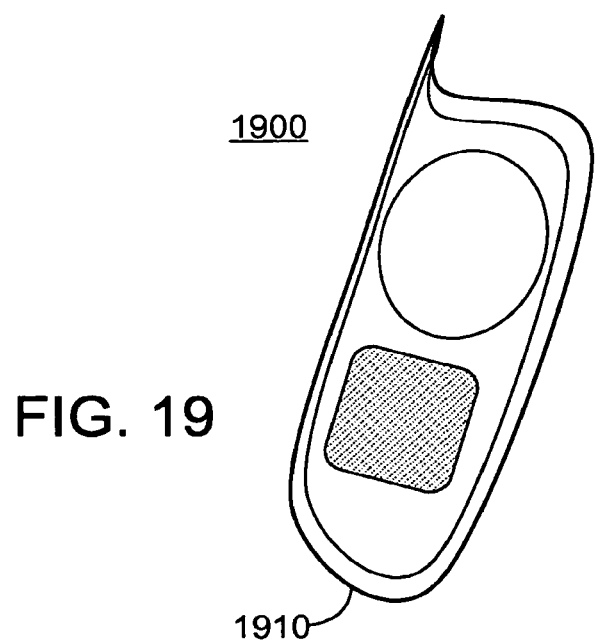
FIG. 19 is a perspective view of a hand held device.

In FIG. 19, a hand held device 1900 is coated with a composite material 1910 to increase the resistance against impacts by affecting the propagation of a shock wave caused by, e.g., falling onto the ground. Alternative examples, for devices that can profit from shock absorption as explained, for example, in connection with FIG. 20 include laptops, cell phones, audio devices, and e-books.

Figure 21:
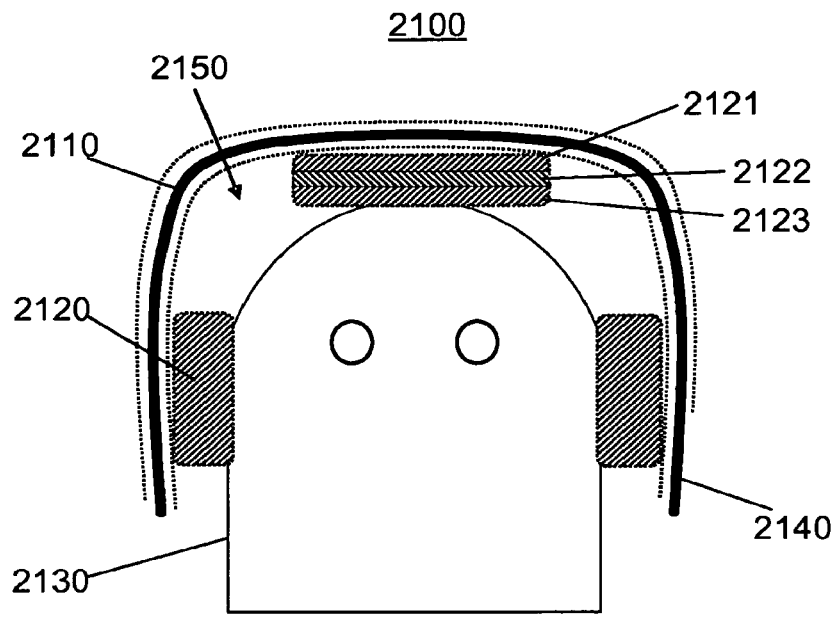
FIG. 21 is a cross section through a helmet with helmet liner pads, and a helmet liner.

FIG. 21 illustrates the application of the composite material in the context of a shielding device, specifically, a helmet 2100. The helmet includes a helmet structure 2110 to which helmet liner pads 2120 are attached. It is common to wear a helmet just with those helmet liner pads in certain environments. In addition, one can wear the helmet 2100 with a helmet liner 2130 that can give additional shelter for a specific environment (temperature, sun light, wind, sand, etc.). In some configurations, one uses the helmet liner 2130, for example, a cold weather helmet liner, with the helmet liner pads 2120. A compression wave caused by a detonating bomb or hitting a hard surface, e.g. pavement, can be mitigated and/or remediated based on the composite material including a gradient layer structure, a densely packed particle structure, and/or a core-shell material, which mitigate and/or remediate by absorption, dissipation, and providing core materials in a predetermined manner the effects of the compression wave striking the helmet 2100. The composite material can be incorporated into the helmet liner pads 2120 and/or the helmet liner 2130 and/or the helmet structure 2110.

The composite material, in addition to mitigating the effects of the compression wave, can signal concussive injury with or without penetration of the helmet 2100. It can provide immediate treatment of wounds with antibiotics, anti-inflammatories, pain medicine and blood coagulants, for example, for helmet penetrating and non-penetrating events before triage medical treatment. The composite material can therefore maximize the comfort of the helmet wearer while providing various safety features.

The composite material can be either applied directly onto the helmet as an inside and/or outside coating 2140. The composite material can further be incorporated in the helmet liner pads 2120 and/or the helmet liner 2130. Different composite material can also be provided in a series of pad elements 2121, 2122, 2123 thereby providing specific features at different locations. In some applications, the exterior layers of the pads closest to the wearer are designed to wick away moisture.

The material of the composite material can be self-extinguishing when exposed to combustion. The material can be a material that vaporizes and/or otherwise become a material, which will not drip, thereby protecting the scalp and skin of the wearer of the helmet 2100 from burns and aggravation of head and/or neck injury.

An exemplary structure for the series of pad elements 2121, 2122, 2123 is shown in FIG. 22. The microcapsules in the composite material rupture when impacted at different levels of force. The composite material that is closest to the scalp and skin and closest to the helmet structure is based on a gradient layer structure 2210, 2230. In FIG. 22, only one gradient layer structure and one densely packed particle structures next to the gradient structure is shown within the pad elements 2210 and 2230 but many more gradient layer structures with gradients of various directions and amplitudes and densely packed particle structures can be used. In general, the gradient layer structures 2210, 2230 each can be sequenced to increase the absorption of the compression wave.

The gradient layer structures of the pad elements 2210 and 2230 closest to the scalp and skin can further include core-shell particles 2240, 2250 with core materials such as flame retardants and suppressants, materials that wick away moisture, antibiotics, anti-inflammatories, pain medicine and blood coagulants.

The composite material of an intermediary pad element 2220 can include a densely packed particle structure of core-shell particles that provide after rupture an inelastic non-toxic inflammable foam. The foam can expand into a space 2150 between the head and the helmet structure 2110 thereby stabilizing the helmet head system and any head injuries. In addition, or alternatively, the foam can be contained within the helmet liner pad or pads and/or the helmet liner thereby increasing their size and tightening the helmet to the head. Thus, the inelastic foam mitigates and/or remediates by absorption and by keeping the helmet properly seated to protect the skull from further impacts and exposure to, e.g., the heat from combustion.

The helmet liner and/or the helmet liner pads can be made completely of pure composite material pad elements as shown in FIG. 22. Alternatively, a pad can include a cushioning material around which (or in between layers of the cushioning material) the composite material is wrapped in a textile like structure. For example, the intermediary pad element 2220 can be replaced with a cushioning material.

In some embodiments of the pads or the helmet liner, the composite material can include core-shell materials that contain a non-toxic, and washable, dye. Assuming that there is no penetration of the helmet 2100, when impacted by a compression wave, the gradient layer structures closest to the helmet mitigate and/or remediate the force of the compression wave. However, if the force of the impact is within a specified range, the composite material acts as a (physically triggered) sensor when the color filled core-shell particles rupture and mark the areas of impact or the occurrence of a compression wave.

When the helmet is removed, it is possible to determine that the wearer has sustained a possible concussive injury even though there is no penetration of the helmet. If the dye is triggered, after the helmet is examined and/or the wearer. In some applications, the dye can then be removed when washed.

The gradient layer structures continue to interact with following compression waves.

The layers closest to the skull, in addition to absorbing the impact, can also direct the force away from most sensitive areas of the skull thereby using the compression wave against itself to maximize the distortion of the compression wave.

Even in the case of a penetration of the helmet 2100, the core-shell particles closest to the skull, which can contain antibiotics and blood coagulants will rupture within the region of penetration, and thereby delivering their content into any wounds created and mitigating and/or remediating by triage treatment designed to stabilize medical conditions, prevent infection and to aid in cauterizing the wound.

The above discussed features can similarly be implemented in, e.g., different layers of a "cold weather" liner. Thus, the helmet liner 2130 itself can contain a composite material with core-shell particles providing various materials, when ruptured. In addition to absorb the blast wave, the generated foam can also protect against and treat neck wounds and provide acoustic protection as the foam can cover the neck and the ears of the wearer.

Due to the modular concept, the helmet liner pads 2120 and/or the helmet liner 2130 can be replaced after the mitigation and remediation of an impact or if some core-shell particles have ruptured or exchange is appropriate.

The above discussed features can similarly be implemented within the inside and/or outside coating 2140, which can be reapplied if necessary.

Example helmets include combat helmets and sport helmets, such as bike helmets, riding helmets, and motor cycle helmets.

The composite material can further be applied in form of a panel, e.g., a piece of molded composite material which you can attach to either a specific part, the door of a vehicle, for example, or which you can attach to a plate, like those suspended from the side of assault vehicles. The panel can further be easily transported and mounted to building or any object (large or small) that can benefit from shielding against compression waves.

Figure 23:
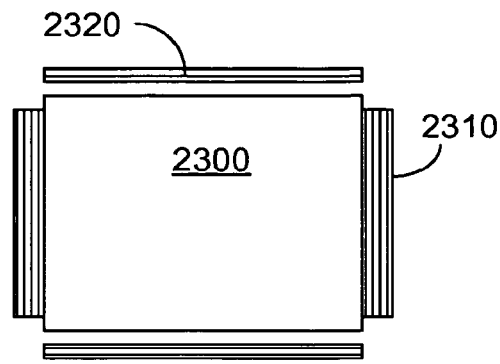
FIG. 23 is a schematic representation of a transportation device provided at least partly with a composite material.

In the following, the composite material is discussed in the context of shielding a transportation device, for military and/or civilian use. FIG. 23 shows schematically a transportation device 2300 such as vehicles, ships, boats, and aircraft, (airplanes, helicopters, space ships, etc.) or a part thereof. The transportation device can be manned or unmanned. It can transport people, surveillance devices, measurement devices, ordinance, or goods. Specific examples include tanks and Humvees (e.g., exterior shielding), airplanes, and helicopters (e.g., body, cockpit glass, engine, ordinance, and rotor blade shielding), unmanned drones used for surveillance and/or as a weapons platform (e.g., body, engine, optics, exterior and ordinance shielding), ships and submarines (e.g., hull and wall shielding).

The composite material can be applied to a surface of the transportation device 2300 as a coating 2310. Alternatively or additionally, the composite material can be attached to the surface as a removable unit 2320, e.g., as a film or panel that fits to and is shaped according to the shielded surface. Alternatively the composite material can be used as filling material for cavities of outer wall structures of the transportation device 2300, e.g., to fill the outer walls of ships or the doors of cars with, e.g., granular composite material based on concentric gradient layer structures.

The composite material mitigates and/or remediates the effects of a blast through its structure and by using that force as an activator to rupture and/or vaporize core-shell materials containing core materials, which are, e.g., flame retardants and suppressants, foam generators and dispersants, smoke suppressants, materials which can impede RF transmission and electrical impulses, materials associated with the treatment of burns, and other wounds, infection, inflammation, pain, antibiotics, and materials used for triage medical treatment, and materials which act as a shield against biological and radioactive agents. The composite material can be transparent when applied, e.g., to glass, polycarbonate resin, or other materials used for viewing without essentially distorting visibility and degrading over period of use and exposure to extreme changes in temperature.

For example, for a vehicle, the composite material can be applied as a film attached to the surface of the vehicle, or can form completely molded panels attached to the sides, bottom and top. The composite material can be re-applied in field conditions after the composite material is triggered by a bomb blast. When used as a panel, as a coating, or as a film, the composite material can be light in weight. The outer layer of such a panel and/or film closest to the vehicle can contain a resin to bind it to the vehicle.

When, for example, a bomb detonates in the vicinity of the vehicle (representative for any transportation device), the outer layers of the composite material closest to the blast absorbs the blast energy causing the rupture of core-shell particles, the latter releasing the flame retardants, dispersants and suppressants, the smoke suppressants, as well as injecting into the targeted environment materials used to treat burns, and other wounds, infection, inflammation, pain, antibiotics, and materials used for triage medical treatment. Additionally, the composite material can introduce into that environment RF shielding materials or other materials to impede the transmission of electric impulses and thereby to reduce the risk to personnel already on site and to first responders from another bomb triggered by a remote signal following the initial blast. Materials to impede biological agents and radioactivity can also be introduced into the target area.

As the shock wave moves from the outer layer through the composite material, to the inner layer particles, deformation of the blast wave increases. Contemporaneously, the shock wave activates core-shell materials within the composite material, while at the same time the inner layers direct the shock wave in a predetermined manner to those areas where the vehicle is best protected against blast waves.

In FIG. 24, a waste receptacle 2400 consists entirely of a composite material that includes gradient layer structures 2410 and 2415 and core-shell particles 2420 and 2430. The core-shell particles can be part of the gradient layer structure as illustrated for the core-shell particles 2420 in the gradient layer structure 2415. The core-shell particles can further form a layer themselves as illustrated for the core-shell particles 2430. The outer particles of the composite material can be confined by a binding layer 2440. The binding layer can include, for example, a sensor material that changes color in response to a chemical signature in its environment. The binding layer 2440 can alternatively or additionally be provided between layers of the composite material, e.g., between the core-shell particle layer 2430 and the gradient layer structure 2420. As discussed above one or more layers of the gradient layer structure can include multi-particle layers and thereby form densely packed particle structures. Additionally or alternatively, one or more densely packed particle structures can be included next to the gradient structure 2420.

Materials suitable as core material of the core-shell particles 2420, 2430, include flame retardants and suppressants, foam-generating materials and dispersants, materials which suppress and/or deform acoustic sound waves, materials which suppress smoke and dust, for example. The core material can further contain materials associated with the treatment of burns, and other wounds, infection, inflammation, pain, antibiotics, and materials used for triage medical treatment, Moreover, materials can include RF transmission blocking materials that impede electrical impulses, and/or materials, which impede the dispersal of biological and radioactive agents in order to reduce the risk to first responders from secondary devices placed and planned to be activated by remote signal. The core material can fill the shell completely or partly, and can be provided itself as core-shell particle(s), such as microcapsules.

One can manufacture the complex structure of the composite material for the waste receptacle layer by layer or attach pre-manufactured, e.g., layer sequences. The composite material can moreover be used in the form of a clear or opaque material.

As a shell material and/or a core material of the core-shall particle layers 2420 and 2430, the composite material can include a material that changes color (for example, in response to gaseous chemical signatures of explosives as discussed above in connection with FIG. 15), fire suppressant, and/or a rodenticide. For example, those materials can be present in the surface layer, or any inner layer of the composite material.

Figure 42:
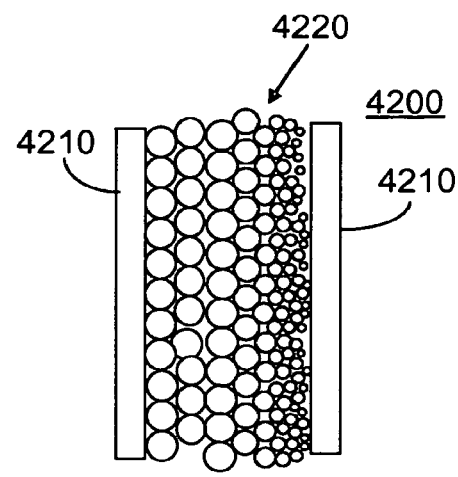
FIG. 42 is a schematic representation of a safety glass with a composite material in a sandwich structure.
Figure 55:
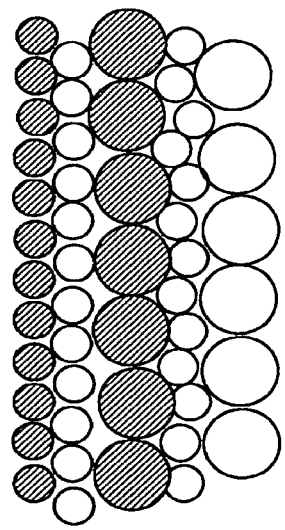
FIG. 55 is a schematic cross sectional view of a densely packed particle structure.

Additional applications can involve the suppression of compression waves to make wall structures or windows safer. As shown in FIG. 42, a safety glass 4200 includes two side windows 4210. A composite material 4220 is positioned between the two side windows 4210. To be transparent, the particles of the composite material can be made of, for example, silica or glass. Also small size polymer nanoparticles of the order of 100 nm (e.g., polystyrene particles) can also be essentially transparent. Side windows 4210 are at least partly transparent and can be made, for example, of polymers (e.g., polycarbonate). Composite material 4220 can be attached to at least one of the side windows 4210. In safety applications, the composite material can be applied, for example, as a coating or film. Alternatively, composite material 4220 can be, for example, be positioned as a self supporting foil between the two wide windows 4210. Also composite material 4220 is at least partly transparent.

The structure as described in FIG. 24 can similarly also be the basis for a waste receptacle liner or any of the herein described embodiments. In general, any structure and use of material in any of the configuration described herein with reference to a specific application of the composite material can be applied in a similar way to another application or configuration of the composite material. For simplification, the various configurations and applications of the composite material were discussed based on drawings showing primarily layers that consist of essentially a single particle in direction of the thickness of the layer. However, each of the illustrated layers can in principal be a mono-dispersed layer or multi-particle layer and thereby be representative for a densely packed particle structure. In the following FIGS. 25 to 27, composite materials with multi-particle layers (two layers again being representative for two and more layers) are discussed in more detail. These or similar composite materials can be used in embodiments as described for example, in connection with FIGS. 1 to 6, 9, 13 to 24.

Figure 25:
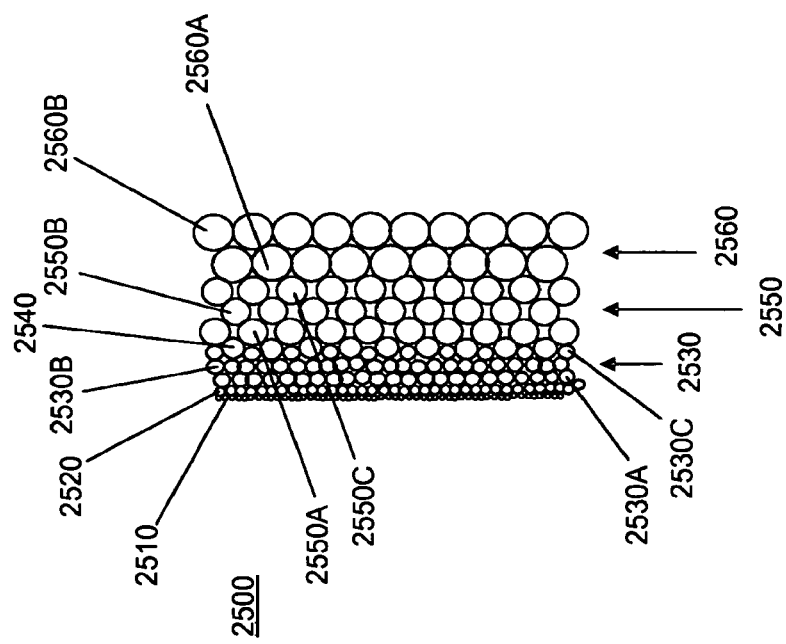
FIG. 25 is a schematic cross sectional view of a composite material with a gradient layer structure illustrating multi-particle layers.

For example, while FIGS. 1 and 2 show generic embodiments of composite materials 100 and 200, respectively, FIG. 25 shows an embodiment of a composite material 2500 with a particle size gradient formed by mono-dispersed and multi-particle layers. Specifically beginning at the small-particle side, two mono-dispersed layers 2510 and 2520 are densely packed. A first multi-particle layer 2530 comprises two densely packed sub-layers 2530A, 2530B and a loosely packed sub-layer 2530C. Sub-layer 2530C interleaves with loosely packed mono-dispersed layer 2540 that on the other side interleaves with a first of three loosely packed sub-layers 2550A to 2550C of multi-particle layer 2550. The largest particles form a multi-particle layer 2560 of two densely packed sub-layers 2560A and 2560B, being a two layer densely packed particle structure.

In densely packed mono-dispersed layers and densely packed mono-dispersed sub-layers (e.g., mono-dispersed layer 2510 and sub-layer 2560B), particles are in contact with the neighboring particles within the layer and sub-layer, respectively. In contrast, particles of loosely packed mono-dispersed layers or sub-layers are mostly not in contact with the neighboring particles within the layer and sub-layer but are in contact with particles of neighboring layers/sub-layers. In general, regions with loosely and densely packed particles can both be present within a mono-dispersed layer or sub-layer.

Figure 26:
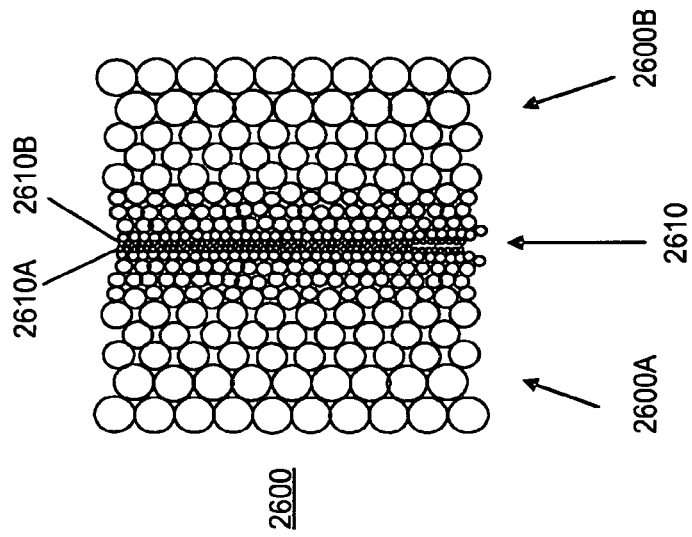
FIG. 26 is a schematic cross sectional view of a composite material with a gradient layer structure illustrating an alternating gradient direction.

FIG. 26 shows an example of a composite material 2600 that provides a gradient that changes direction similar to FIG. 9. Specifically, composite material 2600 includes two symmetric layer sequences 2600A and 2600B as shown in FIG. 25 for composite material 2500 that are attached to each other at the small-particle side, thereby forming a multi-particle layer 2610 comprising two mono-dispersed sub-layers 2610A and 2610B (being a two layer densely packed particle structure) in the middle of composite material 2600.

Figure 27:
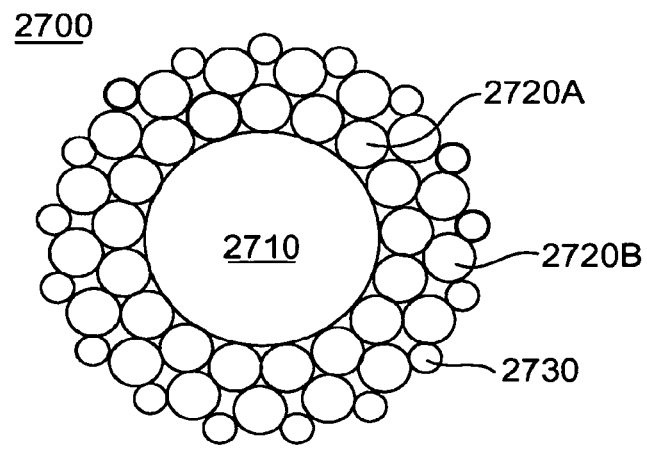
FIG. 27 is a schematic cross sectional view of a composite material illustrating multi-particle layers with concentric particle layers.

Similarly for concentric configurations as shown generally in FIG. 6, a specific embodiment of a concentric composite material (a concentrically layered particle structure 2700) is shown in FIG. 27 that includes a mono-dispersed layer and a multi-particle layer, which are oriented concentrically around a central particle 2710. Central particle 2710 is surrounded by a multi-particle layer of a densely packed sub-layer of particles 2720A and a loosely packed sub-layer of particles 2720B. As a surface layer, a mono-dispersed layer includes loosely packed plurality of particles 2730 that partially fill the space between loosely packed particles 2720B. Thus, the mono-dispersed layer overlaps partly with the loosely packed sub-layer. Central particle 2710, sub-layers 2720A, 2720B, and mono-dispersed layer 2730 form a gradient layer structure with decreasing particle size with increasing radial distance from the center of central particle 2710. In some configurations, sub-layers 2720A, 2720B are representative for a two layer densely packed particle structures and mono-dispersed layer 2730 does not need to be representative for mono-dispersed layers of a gradient. In some configurations, sub-layers 2720A, 2720B are not representative for a densely packed particle structure but mono-dispersed layer 2730 is representative for densely packed particle structures.

Figure 28:
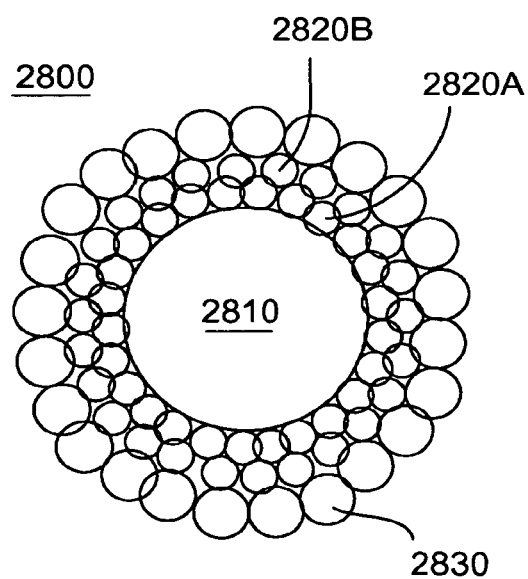
FIG. 28 is a schematic cross sectional view of a composite material illustrating multi-particle layers with concentric particle layers.

In contrast, a concentrically layered particle structure 2800 is shown in FIG. 28 that is configured to form a gradient layer structure having increasing particle size with increasing radial distance from the center of central particle 2810 with the exception of that central particle 2810 being the largest particle. Concentrically layered particle structure 2800 includes further a layer with the two densely packed mono-dispersed sub-layers 2820A, 2820B and a densely packed mono-dispersed layer 2830 is shown as a surface layer. Similar consideration with respect to the interpretation of the structure can be done as above for FIG. 27.

While FIGS. 27 and 28 specifically describe multi-particle layers for concentric layer structures, FIGS. 29 to 32 describe multi-particle layers for planar layer structures.

Figure 29:
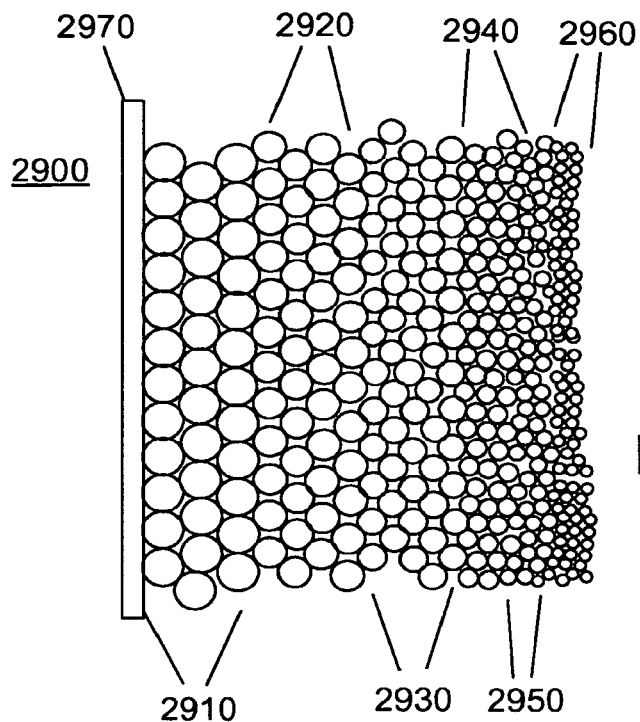
FIG. 29 is a schematic cross sectional view of a composite material with planar multi-particle layers on a substrate.

In particular, FIG. 29 shows a composite material 2900 of 6 multi-particle layers applied to a glass or polycarbonate substrate 2970. The mean particle size multi-particle layers decreases with increasing distance to substrate 2970. Specifically, composite material 2900 includes multi-particle layer 2910 comprising 3 sub-layers of 320 nm polystyrene particles, multi-particle layer 2920 comprising 4 sub-layers of 260 nm polystyrene particles, and multi-particle layer 2930 comprising 5 sub-layers of 220 nm polystyrene particles. Multi-particle layers 2910 to 2930 are hexagonal close packed (hcp) layers. Gradient layer structure 2900 includes further multi-particle layer 2940 comprising 6 sub-layers of 160 nm polystyrene particles, multi-particle layer 2950 comprising 4 sub-layers of 130 nm polystyrene particles, and multi-particle layer 2960 comprising 2-4 sub-layers of 110 nm PMMA particles. Multi-particle layers 2940 to 2960 are cubic close packed (ccp) layers. While, for example, layers 2910 to 2920 may act as densely packed particle structures, layers 2930 to 2960 may act more like a gradient structure or visa-versa depending on the physical properties of the particles. However, this structure is only exemplary to illustrate the various aspects of densely packed particle structures and gradient structures. In principal, densely packed particle structures may include large numbers of layers comparable to the number of gradient layers.

Composite material 2900 is held together without a binding material. It is assumed that the binding is caused be hydrogen bonding of acidic functions of the material.

Composite material 2900 can be produced by spin coating using particle concentrations of about 2.5% for layers comprising 3-4 sub-layers. It has been found that lower concentrations of about 1% for larger particles (larger than 200 nm) can yield mono-dispersed layer or a layers comprising 2 sub-layers. The particle dispersions are based on ⅓ water and ⅔ methanol.

Thus, it is assumed that the concentration of the particles allows controlling the number of sub-layers. Moreover, it is assumed that the size of the particles affects the structural packing of the particles within a layer (hcp and ccp).

Figure 30:
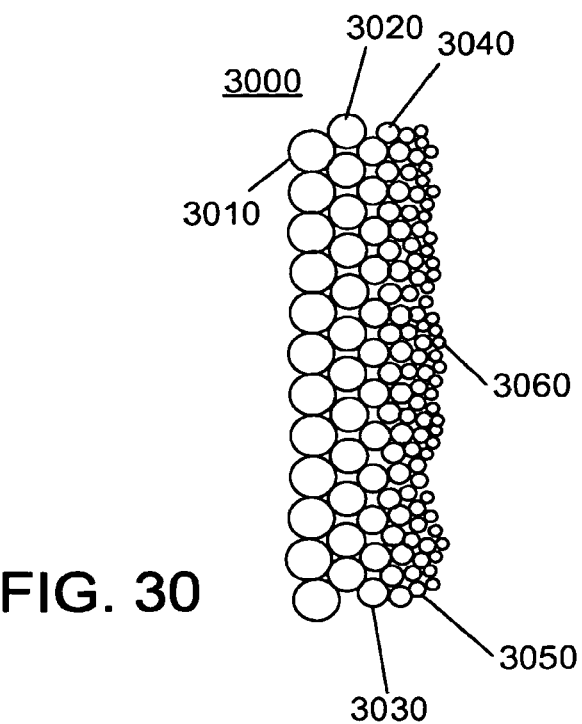
FIG. 30 is a schematic cross sectional view of a composite material with planar multi-particle layers forming a uni-directional gradient.

FIG. 30 shows a schematic presentation of a 6 composite material 3000. Each layer can be a multi-particle layer or a mono-dispersed layer. An example of a composite material 3000 can comprise polystyrene particles of 320 nm, 260 nm, and 220 nm diameter in layers 3010, 3020, and 3030, respectively. Layer 3040 can include 160 nm PS particles and/or 160 nm silica particles. Alternatively, layer 3040 can include 140 nm PMMA particles. Layer 3050 can include 140 nm PMMA particles, 130 nm PS particles, or 110 nm PMMA particles. Layer 3060 can comprise 110 nm PMMA particles. In some embodiments, layer 3060 comprises 260 nm PS particles.

Figure 31:
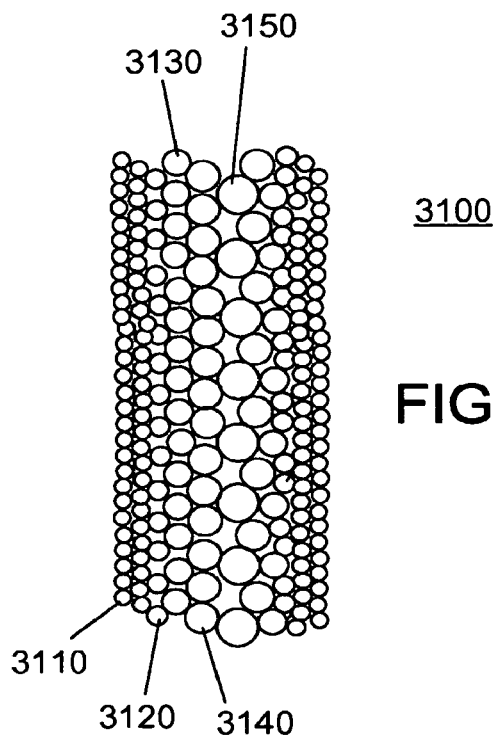
FIG. 31 is a schematic cross sectional view of a composite material with planar multi-particle layers forming a gradient with changing direction.

FIG. 31 shows a 9-layer composite material 3100 that includes two 5 layer gradients. The particles of the various switch from hcp configuration to ccp configuration and back as the size changes. All particles are made of polystyrene with —COOH functionality. All layers indicated as mono-dispersed layer can also be multi-particle layers and vice versa, which may not change the packing structure. In particular, gradient structure 3100 includes a layer 3110 of 130 nm particles, a layer 3120 of 160 nm particles, a layer 3130 of 220 nm particles, a layer 3140 of 260 nm particles, and a layer 3150 of 320 nm particles. An inverted sequence of similar layers follows layer 3150.

As can be seen in the lower right corner, smaller particles can fill loosely packed areas of larger particle layers, thereby initiating islands of specifically packed particles. The packing structure can assimilate within close packed sub-layers.

Figure 32:
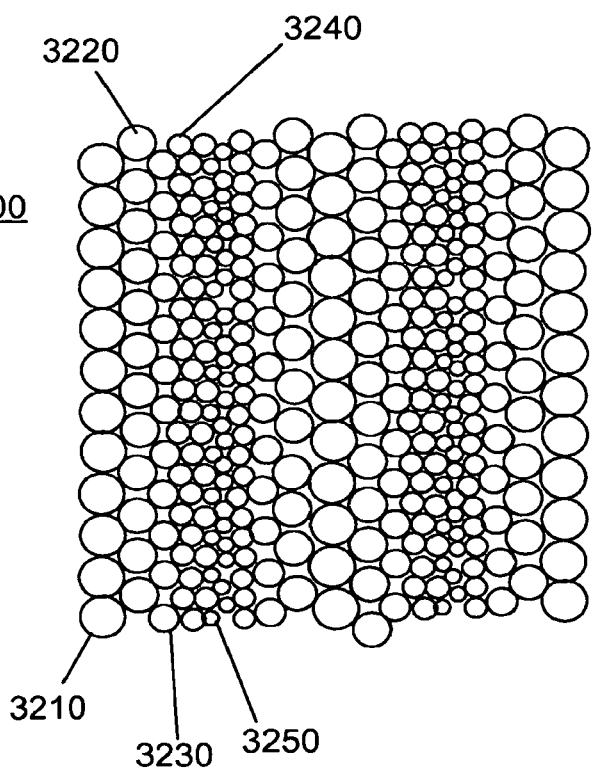
FIG. 32 is a schematic cross sectional view of a composite material with planar multi-particle layers forming a gradient alternating in direction.

FIG. 32 shows a composite material 3200 with an alternating gradient direction. Specifically, the composite material 3200 includes 17 layers that form four regions of non-alternating gradients based on a change in particle size of neighboring layers of about 20%. All particles are polystyrene nanospheres with —COOH functionality. Only a single layer of particles is shown for each of the three larger particles layers 3210, 3220, and 3230 as well as for the layer of smallest particles 3250. A multi-particle layer 3240 of two densely packed sub-layers is shown.

The composite materials of FIGS. 30 to 32 can be considered to include densely packed particle structures if one assumes one of the layers to be representative for a multi-particle layer. Alternatively or additionally, one can apply to the sides of the gradient structures to form a composite material with gradient structure and densely packed particle structures.

As described above, any of the described composite material can further include core-shell particles as, for example, described in connection with FIGS. 11, 13, 14, 17, 22, and 24 as a separate layer(s) and/or as part of the gradient layer structure itself or densely packed particle structures. For example, filled core-shell particles of polystyrene can replace the layers of larger particles, e.g., of the 320 nm, 260 nm and 220 nm particles of FIG. 31.

In general, composite materials can include, for example, layers of mono-dispersed particles, layers of mono-dispersed core-shell particles, multi-particle layers, multi-particle layers including sub-layers of core-shell particles, multi-core-shell particle layers, and multi-core-shell particle layers including sub-layers of non-core-shell particles.

In some embodiments, the composite materials based on layers of mono-dispersed particles, layers of mono-dispersed core-shell particles, multi-particle layers, multi-particle layers including sub-layers of core-shell particles, multi-core-shell particle layers, and multi-core-shell particle layers including sub-layers of non-core-shell particles can be formed with or without intermediary material. Additionally or alternatively, intermediary material may be only used for binding layers of the larger (or smaller) particles of, e.g., a gradient layer structure. Moreover, intermediary material may be only used in some areas and not in others.

In various applications, the composite materials based on layers of mono-dispersed particles, layers of mono-dispersed core-shell particles, multi-particle layers, multi-particle layers including sub-layers of core-shell particles, multi-core-shell particle layers, and multi-core-shell particle layers including sub-layers of non-core-shell particles can be applied to devices such as containers as shown in FIGS. 15 and 24 as examples for waste receptacles. These composite material can further applied to fibers and used in connection with textiles as discussed in connection with FIGS. 16 and 17. Textile applications can include textiles for use in firefighting, law enforcement, military, defense, sports, and fashion. Such cloth or film can be suitable for forming uniforms, helmets, helmet liners, helmet liner pads etc. that exhibit the beneficial effect of reacting to environmental changes in a predetermined manner. Specific examples can include inner liners for uniforms or jackets that can be attachable and/or fused into the cloth.

Additional applications, can involve the suppression of compression waves (including shock waves) in pipes. Shock waves are, for example, generated through valve operation in oil pipelines as discussed in connection with FIG. 18. The composite material can further be applied to surfaces that require impact resistance. Examples include housing of hand held devices, helmets, vehicles or components thereof, as discussed in connection with FIGS. 19, 21 to 24. The composite material in those applications can be applied as a coating and/or provided as a liner. The composite material can further be used in connection with cushions, for example, the helmet pads shown in FIG. 21.

In the following, a large variety of materials are discussed that can be applied in the composite material, specifically, for the solid particles and core-shell particles. In general, the composite material can include particles of the same (single material system) or various different materials. In various embodiments, suitable particles can comprise silica; porous silica; aluminum hydroxide; polymeric materials; ceramic polycarbonate; metal and metal alloy spheres; perlite, carbonate; bicarbonate and halide salts; ceramics; silicates; chelators, such as, for example, calcium or EDTA; foams or foam generating reagents, or a combination thereof.

Fire suppression can be achieved with particles comprising one or more of potassium bicarbonate, aluminum, magnesium hydroxide, surfactants, aluminum hydroxide, potassium bicarbonate, halocarbons, potassium iodide, lithium carbonate, sodium carbonate, sodium hypochlorite, potassium nitrate, magnesium hydroxide and various other hydrates, fluorocarbon surfactants, hydrocarbon surfactants, hydroflurocarbons (HFCs), pentabromodiphenyl ether, antimony trioxide, halocarbons, chlorinated and brominated materials (polybrominated diphenyl ether (PBDE or DecaBDE, OCtaBDE, PentaBDE), polybrominated biphenyl (PBB) and brominated cyclohydrocarbons), and urethane.

For example, core materials that can be used for fire retardance or suppression include hydroxides and hydrates, halocarbons, carbonate, bicarbonate, halide and nitrate salts, polybrominated materials, surfactants and hydrofluorcarbons. In particular, aluminum hydroxide can break down under heat to provide two primary methods for extinguishing a fire ball associated with a bomb blast. First, it expels water vapor upon thermal breakdown which assists in quenching the fire. Additionally, the thermal breakdown process is endothermic and can thus absorb a large amount of heat resulting from the blast zone. Still further, the resultant material, after break down is an alumina ($Al_2O_3$), the presence of which can form a protective layer against the spread of fire. Still further, the inert gases produced (water and carbon dioxide) can also act as diluents in the combusting gas, effectively lowering the partial pressure of oxygen which slows the reaction rate.

In applications coupled with textiles, Tetrakis(hydroxymethyl)phosphonium salts can be used as core material Moreover, $ZrO_2$ eruptively generated aerosol can serve as the anti-explosion and fireproof agent, and therefore, can be applied in security applications.

In some embodiments, Hydroflurocarbons (HFCs) can be used for fire suppression. In particular, a series of HFCs are commercially available from Dupont® that offer fire suppression with little or no ozone depletion. In some embodiments, pentabromodiphenyl ether can be used as a core fire retardant (eventually in conjunction with antimony trioxide). Still further, halocarbons can also be used as flame retardants core materials.

In some embodiments, chlorinated and brominated materials can also be used as fire retardant core materials. These materials can release hydrogen chloride and hydrogen bromide during thermal degradation. These react with H* and OH* radicals in the flame resulting in the formation of inert molecules and Cl* or Br* radicals. The halogen radicals have lower energy than H* and OH* and therefore reduce the propagation of the flame (reduction in oxidation potential). Antimony can also be used with halogenated flame retardants. Brominated flame retardants are produced synthetically in over 70 variants and are considered to be effective flame retardants. Any of the three classes of the brominated flame retardants can be separated into three classes or families: polybrominated diphenyl ether, polybrominated biphenyl, and brominated cyclohydrocarbons.

Fluorocarbon surfactants and hydrocarbon surfactants can also be used as flame retardants. For example, the fluorocarbon surfactants disclosed and described in U.S. Pat. Nos. 4,090,967 and 4,014,926, the entire disclosure of which are hereby incorporated by reference, can be used for coating gas lines and gas containing receptacles. These materials can produce foam that spreads over a surface, effectively suppressing the vaporization of gasoline. These foams can have, for example, an expansion ratio of between 50/1 to 1000/1. In order to mitigate and/or remediate a radioactive or "dirty" environment, potassium iodide can be used as a core material to mitigate and/or remediate, for example, radioactive iodine 131, which is known to cause thyroid cancer. Other core materials suitable for use in radioactive remediation include the known family of chelators. Chelators are materials that can selectively bind to radioactive metals. Two exemplary chelators commercially available in relatively large quantities are calcium and EDTA. In some embodiments, one or more particle layers of the composite material can comprise an inert material, such as, for example, a porous silica particle. To that end, porous silica can offer exceptional absorption characteristics.

Foam generating composite materials can be applied in applications such as petroleum/oil based conveyance systems, refining operations, chemical conveyance systems, and storage systems (e.g., as clotting or sealing material). As core-materials or particle materials, the foam generating composite material can then include, for example, epoxy materials (resin and hardener), which requires activation, an activating material, and a foaming agent. In addition, a reinforcing material, e.g., carbon fibers can be provided to be penetrated by the foam. Exemplary foaming agents include Telomer-based materials such as fluorosurfactants, aqueous film-forming foam (AFFF), alcohol-resistant aqueous film-forming foam (AR-AFFF), fluoroprotein (FP), film-forming fluoroprotein (FFFP), and alcohol-resistant film-forming fluoroprotein (AR-FFFP). Fluorosurfactants are based on perfluorinated telomer chemistry. Foaming agents can further include polyurethane, polyethylene, cross-linked, polystyrene, and urethane.

Composite materials for helmet liners or helmet liner pads can include, for example, latex based foam systems that require a latex solution as dissolved polymer, the foaming agent, a curative and a gel, as well as a fire retardant (e.g., one of the polybrominated class).

In some embodiments, the composite material can provide shielding against RF signals to assist in the prevention of a remote detonation. For example, an RF shielding layer can be provided by incorporating a conductive element in one or more of the particle layers. A number of materials are known to be capable of providing RF shielding, including, for example, copper and nickel. By incorporating electrically conductive and/or electromagnetic radiation absorptive particles into one or more layers, an RF signal can be shielded thus inhibiting the ability for remote detonation of an explosive device.

In some embodiments, one or more layers can comprise a piezoelectric material. According to this embodiment, the piezoelectric material can interact with vibrations of the surrounding environment to produce electricity. For example, acoustic waves could be used to attenuate a material designed as described so that piezoelectric materials in one of the layers are utilized to produce electricity. The produced electricity can then be harnessed for use internally by one or more layers of the composite material or can be used external to the material.

It should be understood that any one or more layers of the composite material can be customized to interact with or react to changes in the surrounding environment in a predetermined manner. To that end, the selection of materials depends on the particular predetermined interaction or reaction that is desired.

Production of particles, such as, for example, core-shell particles, can comprise a solvent cast process, a continuous solvent cast process, an extrusion process, and a combination thereof. In some embodiment, such a process can require that the material and/or precursor materials be at least partially soluble in a volatile solvent or water; remain stable in solution with a reasonable minimum solid content and viscosity; and be capable of forming a homogeneous film and/or an in-situ gradient, and releasing from a casting support.

For selected core or agent materials, the microcapsules can be manufactured by conventional micro-encapsulation technique. Micro-encapsulation is defined as a process by which clusters of a solids, liquids or gases are packaged within a shell material. Micro-encapsulation is commonly distinguished as either a chemical or physical process. Both processes can be used to produce the core shell structures.

In some embodiments, the microcapsules can be formed from a conventional polymer or polycarbonate composition. It should be appreciated that such polymers and polycarbonates are further customizable in that they can be produced with a variety of physical attributes. For example, microcapsules can be manufactured having specifically desired strengths, elastic coefficients, colors, and thicknesses. The use of polymers can also offer energy absorbing characteristics as they decrease deflection of compression and sound waves. Further, polycarbonates can be used as a transparent material and ceramic/polycarbonate composite materials can be used, for example, in specific applications where increased levels of shielding (emf, induction, radiation etc.) are desired.

Exemplary chemical micro-encapsulation techniques that can be used to manufacture the encapsulated core-shell particles include polycondensation (interfacial polymerization), colloidosome formation, polymer precipitation by phase separation, layer-by-layer polyelectrolyte deposition, surface polymerization and copolymer vesicle formation. Likewise, exemplary physical micro encapsulation techniques include centrifugal extrusion, fluid bed, a Wurster process, and pan coating. In addition, centrifugal extrusion techniques can be used to produce larger particles, such as those ranging from about 250 micrometers to about a few millimeters in size.

In addition to the microencapsulated core-shell particles described above, one or more layers of the composite material can also comprise any of the core materials described above without the core or shell encapsulation coating. In addition, one or more layers can also comprise the microencapsulated shell coatings described above, in the absence of the core material.

The shell of a core-shell particle can be produced using a variety of processes. In various embodiments, the process used for the production of a core-shell particle can comprise FBE powder coating/lining; metallizing; electrostatic spray; dip coating; organic coating; parylene coating; spray coating; screen coating; roller, spin coating, extrusion processes, passive adsorption, covalent coupling, or any combinations thereof. In some embodiments, the process used for the production of a core-shell particle can comprise the one or more of the following techniques and/or material systems: polymers, for example, but not limited to baked phenolic, elastomeric urethane, epoxy, polyurethane, vinyl ester, polyester, polystyrene, or any combinations thereof.

It should be appreciated that any individual encapsulation method can be suitable for the production for particle sizes having a specific size range and that one or more methods can be suitable for the production of a specific size particle. Exemplary encapsulation methods and particle size ranges are detailed in Table 2 below. It should be appreciated that the recited ranges are not limiting and can vary.

TABLE 2

| Encapsulation Method | Size Range (μm) |
|---|---|
| Physical Methods | |
| Stationary co-extrusion | 1,000-6,000 |
| Centrifugal co-extrusion | 125-3,000 |
| Submerged nozzle co-extrusion | 700-8,000 |
| Vibrating nozzle | >150 |
| Rotating disk | 5-1,000 |
| Pan Coating | >500 |
| Fluid bed | 50-10,000 |
| Spray drying | 20-150 |
| Chemical Methods | |
| Simple/Complex coacervation | 1-500 |
| Phase Separation | 1-500 |
| Interfacial polymerization | 1-500 |
| Solvent evaporation | 1-500 |
| In-situ polymerization | 1-500 |
| Liposome | 0.1-1 |
| Sol-gel methods | 0.1-1 |
| Nanoencapsulation | <1 |

The multilayered composite material can be manufactured by a number of techniques. Initially, once the selection of particles and the corresponding particle sizes are determined for a given layer, these particles can be suspended in a liquid vehicle system or medium to form a batch composition for the given layer. The batch composition can then be used to form a layer of the material on a substrate. In one embodiment, it is contemplated that the succesive layers of the composite material can be applied as a film or coating to the substrate. Accordingly, a batch composition for each given layer can be provided and successivly applied to a surface of the substrate. Deposition techniques can include, for example, chemical vapor deposition, electrophoretic deposition, plasma enhanced vapor deposition, spin-coating, dip coating, flexographic printing, spread coating, sequential spray, foaming, spray coatings, casting, slurry based processes, and sequential processes. Those techniques can allow, for example, the production of waste receptacles and transparent liners. Dip coating, flexographic printing, and knife-edge layering can be applied, for example, for the production of commercial quantities. Spin-coating can be used, for example, to produce samples for experiments.

In some embodiments, it is also contemplated that the composite material can be manufactured as a stand alone article without requiring it to be applied to or supported by a substrate. For example, successive batch compositions can be used to form multiple plys of a stand alone film. Alternatively, batch compositions can also be used to manufacture molded articles such as for example, injection molded, extrusion molded, and blow molded articles.

The batch composition for providing a given layer of the composite material can comprise a plurality of the desired particles suspended or dispersed in a suitable liquid vehicle system or medium. The liquid vehicle system can be formulated based upon any one of the following stabilization techniques including electrostatic stabilization, steric stabilization, electrosteric stabilization, depletion stabilization, stabilization by masking van der Waals forces, and stabilization by hydration forces. The stabilization mechanisms work by preventing or hindering the flocculation of the particles in suspension. In some embodiments, it is preferred for the liquid vehicle stabilization techniques to be an electrostatic or electrosteric stabilization. Electrostatic stabilization uses ions in solution to generate like charges on the particles in suspension. Electrosteric stabilization uses a charged polymer that adsorbs on the particle surfaces, causing double-layer repulsion. Either technique can be used to stabilize a suspension. Further, exemplary particles in liquid vehicle dispersions can be produced in aqueous form or from other suitable mediums that have low volatility and suitable thermal stability, such as for example, ethylene glycol.

For electrostatic stabilization, an acid or base (the choice of which can be dependant upon the charge of the particle surfaces) can be added to an aqueous suspension. The addition can adjust the pH of the suspension, which can affect the charge on the particle shear planes, i.e., the zeta potential. If the particle surface has a positive charge, adding an acid to the suspension decreases viscosity effectively increasing the magnitude of the zeta-potential. When acid is added to the suspension, the particle shear planes develop a net negative charge, causing the particles to repel each other. The opposite is true for a suspension of negatively charged surfaces to which a base can be added to give the particle shear planes a net positive charge and in order to suitably disperse the particles in the suspension.

For electrosteric stabilization, the presence of a dispersant can directly influence the stability of the suspension until the particle surfaces are completely covered. Dispersants can be added in relation to the particles surface area, charge and size of the particles ensuring the correct amount of coverage. For example, in some embodiments, a polyelectrolyte dispersant should have the opposite charge of the particle surface being dispersed. The addition of a polyelectrolyte can change the isoelectric point allowing a dispersion to result without the need to adjust the pH of the suspension. When added to a suspension near the point of zero charge, the water used in the suspension can have a greater affinity for itself than the polymer, and hence the polymer can adhere to the particle surfaces. To prevent coagulation, an ionic solution can also be added to an electrosterically stabilized suspension to counter act the charge buildup. To that end, it should be understood that a stable suspension can be important as it can allow a higher solids loading with lower apparent viscosity than an unstable suspension can allow.

Still further, the batch compositions can comprise additives such as colorants, biocides, surfactants, plasticizers, binders, dispersants, acid, base, pore formers, and the like. Additionally, it should also be understood that the batch compositions can be formulated to provide transparent, translucent, or even opaque composite materials. For example, it can be desired for the composite material to be transparent. This can enable the manufacture of, for example, a transparatent film, liner or, alternatively, a composition that can be applied to glass or similar substrates without affecting the pre-existing transparancy of the substrate upon which it is applied. Alternatively, it can be preferred for the composite material to have a predetermined color suitable for use in forming stand alone articles or coatings having certain aesthitic appearances.

As summarized above, it is further contemplated that the composite materials can be used in a variety end use applications including, for example, military, energy and related infrastructure, electronics, sensors and actuators, lubricants, medical applications, catalysis, structural materials, ceramics, civil engineering applications, aerospace, automotive applications, textile and antiballistic materials. In some embodiments, it is contemplated that the composite material is particularly well suited for use as or in combination with an antiballistic material.

In some embodiments, a composite material can be applied onto the surface of any desired object in order to provide the blast energy absorption and any secondary blast mitigation effects described herein. For example, the material can be applied to the inside surface of a trash receptacle. Alternatively, the material can be provided in the form of a stand alone film that is suitable for use in manufacturing liners that can be removably placed inside pre-existing trash receptacles. The liner can be manufactured having any predetermined color. Alternatively or in addition, the liner can also be transparent. Still further, it is also contemplated that the composite material can be used to form the trash receptacle itself thus eliminating the need to apply either a separate coating or a liner in order to provide the blast energy absorption and any secondary blast mitigation effects described herein. Once again, the manufactured trash receptacle can also have any predetermined color or be transparent.

Thus, the response of the composite material can be considered to be smart in that it does have a designed or engineered response to an external stimulus. Specifically, the properties of the composite material adapt in response to the external stimulus. The composite material can be further provided to be multifunctional, e.g., include multiple features such as absorption of compression waves, mitigation of fire, remediation of biological systems etc.

EXAMPLES

The invention is further described in the following examples, which do not limit the scope of the invention described in the claims.

Prophetic Example 1

Exemplary Batch Composition

In an exemplary embodiment, a composite material could be comprised of a plurality of tape casted layers. The tape casting could be used to apply the composite material layers to a pre-existing substrate or to form a stand alone multi-layered composite material. An exemplary and non-limiting batch composition that could be used to prepare each successive layer of the composite material is set forth below in Table 3:

TABLE 3

| Component | wt % | Function |
|---|---|---|
| Microspheres | 55.66 | Layer 1 |
| Xylene | 18.55 | Solvent |
| Ethanol | 18.55 | Solvent |
| Butvar 98[1] | 4.08 | Binder |
| Menhaden oil | 1.12 | Dispersant |
| Santicizer 160[2] | 1.02 | Plasticizer |
| UCON[3] | 1.02 | Plasticizer |

[1]Commercially available from Electron Microscopy Sciences, Hatfield, Pennsylvania;
[2]Commercially available from the Ferro Corporation, Walton Hills, Ohio;
[3]Commercially available from Dow Chemicals, Midland Michigan Based upon the formulation set forth in Table 3, the microspheres, solvents and dispersant can first be mixed in a ball-mill for approximately 24 hours. After mixing in the ball mill, the binder and plasticizer component can then be added to the ball mill and the resulting mixture can be mixed for another 24 hour period. After mixing is completed, the composition can be tape cast onto a coated paper or a steel belt to form a particle layer. The tape casting can be performed by using a commercially available tape casting apparatus such as a Unicast 2000. The tape cast layer can then be allowed to dry naturally under ambient conditions. This process can be repeated using batch compositions comprised of particles having differing median particle sizes until a desired number of particle layers have been tape cast to form the particle size gradients and densely packed particle structures described herein.

Prophetic Example 2

Use as a Blast Wave Absorbing Material

With reference to FIG. 1, the material of the composite material can be used as a blast wave absorbing material. For example, a material manufactured according to prophetic example 1 can be disposed on the interior surface of a waste receptacle so that the layer 110 comprising the largest median particle size is oriented to be the first layer exposed to the impact of the bomb blast shock wave. The layers comprised of smallest particles, layer 170, would be position or located adjacent to the waste receptacle wall. The layers 110, 120, and 130 can be comprised of particles having the core-shell microstructure as depicted in FIG. 11. The shell 1120 of the material can be pliable such that it can deform upon impact of a bomb blast (shock wave 20). The particle cores can be comprised of one or more blast mitigating materials, such as sodium hypochlorite, potassium nitrate, and the like. Layer 140 can comprise a RF shielding material (such as copper, nickel, copper and nickel alloys, cermets, and the like). The adjacent remaining layers 150, 160 and 170 can be comprised of particulate materials, such as a porous silica, whose median particle size distribution allows a sufficient increase in the inter layer particle contact points to efficiently reduce the impact 105 across the material 100 and the remaining layers (150, 160 and 170).

Upon impact of the shock wave 20, the core-shells in layers 110, 120 and 130 can deform and a portion of the energy associated with the bomb blast can be removed from the system due to this deformation. As the shells deform, they can also apply pressure to the adjacent particles upon which they contact, thus, transferring impact energy to the energy required for deformation and angular pressure on its neighboring particles. Ultimately the shells 1120 deform to a point where shell rupture occurs releasing the core fire retardant materials directly into the blast zone. As the core-shell particles rupture in successive layers, the cores from different particles are introduced into the blast zone, which can further enable, if desired, more complex systems or combinations of systems to be introduced, thus allowing sequential reactions to occur in a user defined manner. The staggering of core materials in a pre-designed manner allows sequential reactions whose sum reaction is greater than their individual contributions.

In addition to the core-shell rupturing, as the shock wave 20 traverses across the first layer 110, it would reach the interface between the first layer 110 and the second layer 120. As the particles comprising the first layer 110 are larger than the particles populating the second layer 120, there also exists at the interface an increase in surface contact points. As in the case of the first layer 110, the impact energy, deforms, compresses and re-orientates the individual particles comprising the second layer 120 resulting in a reduction of the energy of the impact 105. The deformation, compression, re-orientation and transfer of energy relation-ships continues across the cross section of the material 100 and though subsequent layers from layers 120 to 130, 130 to 140, 140 to 150, 150 to 160 and 160 to 170.

Prophetic Example 3

Experimental Design

In some embodiments, a composite material could be comprised of encapsulated materials having particle sizes of 500 nm, 5 µm, and 50 µm. The mean particle diameter and the tensile strength of a particulate filled rigid polyurethane resin at a given volume fraction can be expressed as a linear relationship. In addition, the ability of the particle to flow and compress decreases with average particle size, while strength and transverse rupture strength (TRS) increase with decreasing particle size.

A unique slope of the linear relationship between friction angle and void ration was identified for monosize specimens of varying particle shapes. It was also observed that the friction angle decreases as the aspect ratio increases provided that the void ratio of the two specimens was the same. The friction angle was proportional to the coordination number for monosize specimens regardless of individual specimen size.

Testing protocols for a composite material produced in accordance with the present invention can include: 1) shock tube analysis wherein shock waves are generated by the rupture of a thin diagram separating high and low pressure gases, wherein samples are mounted at the end of a tube; 2) simulations of blast effects using small (e.g., gram range) explosive charges, scaling models, and optical shock wave imaging techniques, wherein shock waves are simulated using scaling law; and 3) detonation techniques wherein the velocity at which a detonation wave travels through the explosive product is determined, typically in the range of from about 2,000 to about 8,000 m/s.

It should be appreciated that several types of experimental designs can be investigated. For example, experimental designs based upon particles can be investigated. The primary input of energy occurs via the interaction of clusters, molecules, atoms, or ions with a surface. The amount of transferred energy ranges from eV to a few keV. Energy dissipation processes can be studied by means of spectroscopic techniques and laser interferometry. These experiments are not time resolved, but rather quasi-stationary. Dynamics can also be investigated. For example, a dynamic observation can be made of the energy dissipation process requiring excitation of a surface via an ultra-short laser pulse providing photon energies of a few eV. Using a pump-probe technique with a second delayed pulse can probe the reaction of a system upon excitation. Analysis techniques can include diffraction, spectroscopic techniques, laser interferometry, and various imaging techniques. Still further, effects of friction can also be investigated. This can include a study of the transport of particles and electrons at surfaces and in thin layers, particularly energy dissipation due to both mechanical friction and friction due to scattering at the surface and interfaces. Friction analysis techniques can include spectroscopic and imaging techniques.

Example 4

Preparation of a Multilayer Composite Materials

Various types of multilayer composite materials were produced by spin-coating various layers of particles on a polycarbonate substrate. The polycarbonate substrate had a thickness of about 1 mm but in general the thickness of the substrate can vary and be adapted, for example, to the application.

To increase the adhesion of the first layer of particles, the polycarbonate substrate was irradiated with a mercury lamp using the ultraviolet transition at 253.7 nm. In the presence of air, the oxygen of the air reacted under the irradiation to create oxygen containing radicals at the surface of the polycarbonate. The final product of the reaction is an organic acid functionality at the surface that renders the surface hydrophilic and provides a hydrogen-bonding surface upon which the layers of the nanostructures were built. The time period of UV irradiation was about 30-60 minutes, usually about one hour.

After irradiation, the polycarbonate substrate was transferred to a spin coater and a first layer of particles was deposited. As particles, nanospheres were provided with carboxylic acid functionality on the surface (polystyrene particles) or polar in nature (silica and PMMA).

All nanospheres were provided in a mixture of 25% water and 75% methanol. Due to the small size and their repulsion due to their polarity, most of the nanospheres did not aggregate. If aggregation was present, particles settled out of the suspension. Then, the dispersion was placed in a sonicator to break up the aggregates and redisperse the nanospheres. All dispersions contained 2.5% nanospheres, thereby providing one to two layers of nanospheres in the film. If more particles in a layer were desired, the particle concentration was increased to 5%.

The spin coater was operated in a two step sequence after 75 µl of nanospheres suspension were placed on the substrate. The first step lasted 5 seconds and the substrate was spun at 300 rpm to spread the dispersion over the entire substrate. The spin coater speed was then increased to 4000 rpm (2000 rpm, if the 5% solution was used) for one minute.

The substrate with the layer was removed and heated at 50° C. for 5 minutes to aid in evaporating the solvent. In a test run, five different layers of nanospheres were added before the heating step, which worked just as effectively. The multilayer composite material was built up in this way until the desired number of layers was deposited. Before testing, the samples were stored for a day. The concentration of 2.5% corresponded to a dilution of between 1:4 and 1:8 of the provided stock solutions.

The spin coating proved to be a good technique to produce lab samples of various gradient structures and densely packed particle structures. Spin coating allowed generating multilayer gradients using monolayers or multiple layers of each different size particle used in the gradient by adjusting the concentration of nanoparticles in the dispersion solution and/or the spin at which the substrate was coated. The layer structures were confirmed by profilometry, force microscopy and electron microscopy as discussed below.

The following samples of gradient structures and densely packed particles structures were produced on polycarbonate substrates according the above described procedure:

Samples #01 and #02: Polycarbonate-130-160-220-260/ 130-160-220-260/etc. The set of four layers was repeated eight times (32 layers in total).

Samples #03/#04: Polycarbonate-130-160-220-260-220-160/130-160-220-260-220-160/etc. The set of six layers was repeated five times (30 layers in total).

Samples #05/#06: Polycarbonate-130-160-220-260-320-400-320-260-220-160/130-160-etc. The set of ten layers was repeated three times (30 layers in total).

Sample #07: Polycarbonate-150-150-150-etc. The 150 nm layer was repeated 30 times (30 layers in total).

Sample #08: Polycarbonate-320-400/320-400/320-400/ etc. The two layers were repeated 13 times (26 layers in total).

(Sample #09 as a duplicate of sample #8 was not produced.)

Sample #10: Polycarbonate-400-320-260-220-160-130/ 400-320-260-220-160-130/400-320-etc. The set of six layers was repeated four times (24 layers in total).

The samples were produced under conditions that created layers having a thickness of one or two layers particles for each size. The nanoparticles were characterized by their diameter in nm. All nanospheres were solid polystyrene particles, except that the 400 nm particles were hollow polystyrene particles and the 150 nm were solid silica particles.

The carboxylic acid functionalized nanoparticles, e.g., polystyrene or silica, formed a "bound" film by an assumed interparticle hydrogen bonding. Essentially, there were electrostatic interactions among the particles that made the layers stay together. This was confirmed by removing an intact film from the substrate with a piece of tape.

The coatings were transparent or, at the very least translucent.

Figure 33:
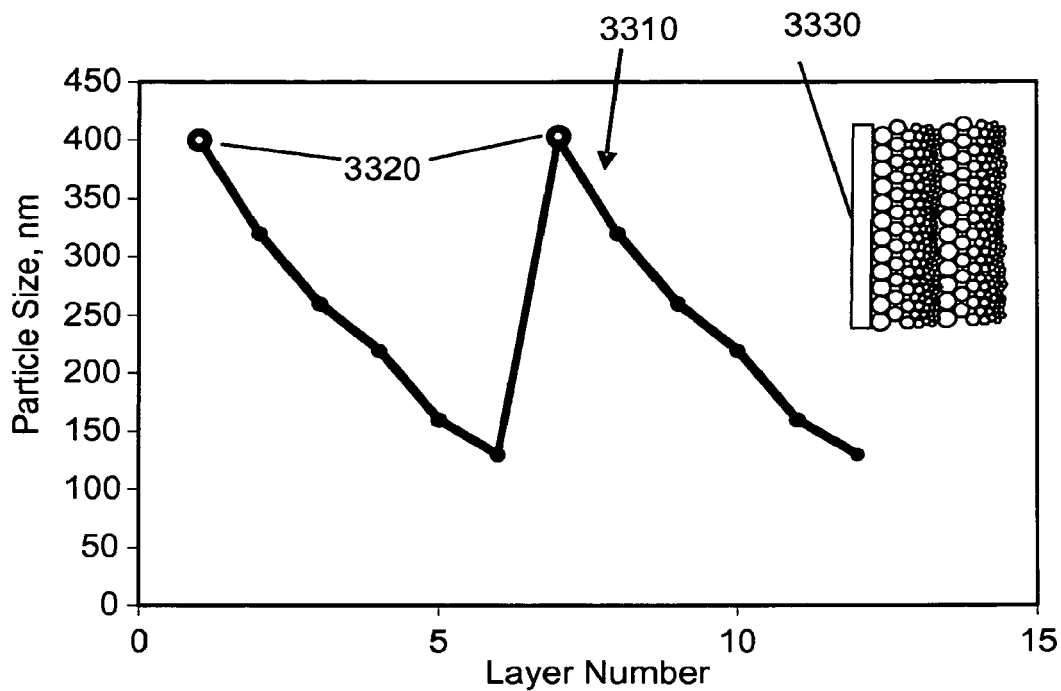
FIG. 33 is a plot of the particle size over the layers of a gradient structure.

In FIG. 33, the particle size is plotted for the first twelve layers to illustrate the gradient of the particles size across the multilayer structure of sample #10. The particle size varies in a saw-tooth-manner from the largest particle to the smallest 130 nm solid nanosphere. A saw-tooth 3310, i.e., a transition from large to small particles, corresponds to a region with a gradient directed in the same direction and all saw-tooth have the gradient in the same direction. In FIG. 33, the 400 nm hollow spheres are indicated by circles 3320.

A cut view 3330 through the first two gradients is schematically illustrated in the top right corner of FIG. 33.

Accordingly, the surface of the composite material according to sample #10 is formed by the smallest particles.

Figure 34:
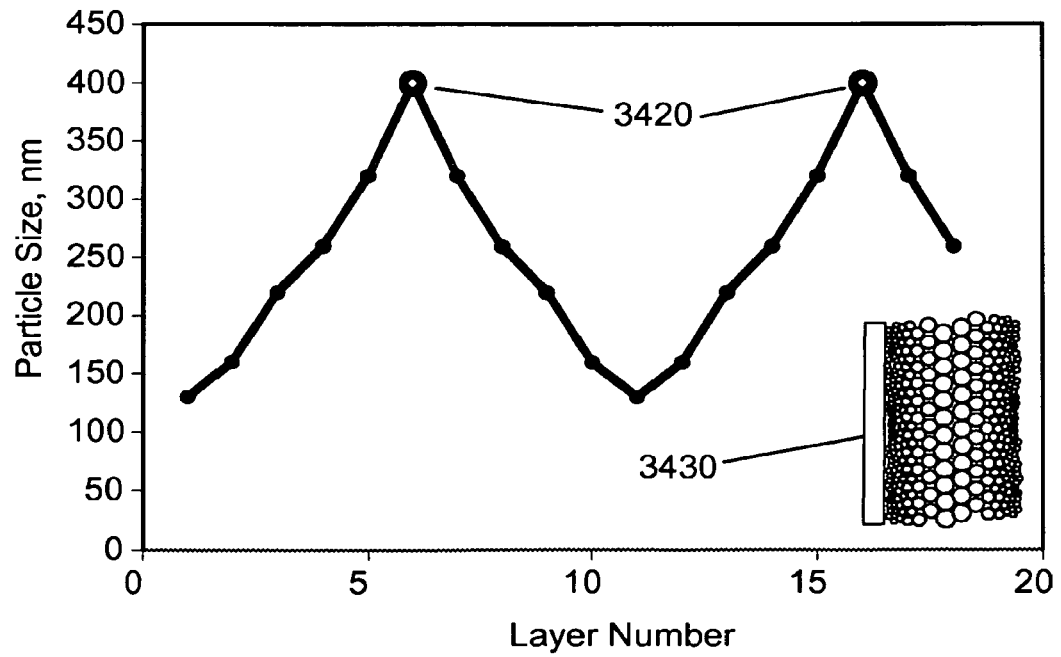
FIG. 34 is a plot of the particle size over the layers of a gradient structure.

In FIG. 34, the particle size is plotted versus the first 18 layers to illustrate the gradient of the particles size across the multilayer structure of samples #05 and #06. The particles size varies continuously from the smallest 130 nm particles to the largest particles (the 400 nm hollow sphere are indicated by reference number 3420) via the particles with the sizes 160 nm, 220 nm, 260 nm, 320 nm. Then the gradient direction changes and the particle size decreases again down to the smallest 130 nm particles via the particles with the sizes 320, 260 nm, 220 nm, and 160 nm. Also in the structure shown in FIG. 34, the surface of the composite material is formed by the smallest particles. Combining the gradient structures (samples #1 to #6 and #10) and densely packed particle structures (samples #7 and #8) can result in layered composite materials with gradient structures and densely packed particle structures.

Example 5

Impact Test of the Samples of Example 4

An impact tester was built using a weight (steel impactor) that was dropped onto an assembly, e.g., a multilayer structure sandwiched between two polycarbonate plates. The assembly was attached below a tube that housed the weight, which can be dropped from a predetermined height.

The impact tester comprised further a spring loaded sample mount with a dynamic force sensor. The dynamic force sensor was configured to detect the transmission of the shock through the assembly. Specifically, the sensor detected the arrival of the shock wave at, e.g., the edge of the gradient's substrate.

A comparison was performed between various assemblies: a) no sample/no plates at all, b) two polycarbonate plates without sample, and c) a sandwich of two plates with one of the samples #01-#10 between the plates. Assemblies a) and b) were used as controls to provide a reading of the true force, the force transmitted though two pieces of blank polycarbonate. The controls allowed for a measure of the effectiveness of the sample (assembly c) in attenuating the shock. Specifically, the weight impacted the top piece of polycarbonate, sending a shock wave into the gradient film.

Figure 35:
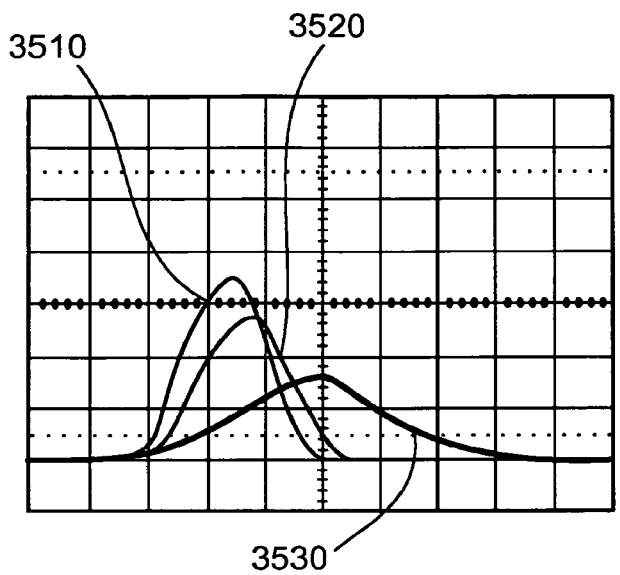
FIG. 35 is a plot of signals of an impact tester for various assemblies.

The plot of FIG. 35 overlays the three transmitted signals as measured. In particular, signal 3510 corresponds to the initiated shock wave as measured without sample and without plates, signal 3520 corresponds to two polycarbonate plates without sample, and signal 3530 corresponds to a sandwich of two plates with an exemplary gradient sample between the plates.

As one can see, signals 3510, 3520, and 3530 differed in their time of detection and in the maximum of the signal. Thus, the sample delayed the shock wave and reduces its maximum.

For the various samples, the measurements were analyzed from an oscilloscope using the maximum force detected by the sensor, the width of the force peak and the time delay of the maximum force. The data are summarized in Table 4 below and ordered according to the reduction of the measured force.

TABLE 4

| Sample | Max. Force, N | Width, ms | Delay, ms |
| --- | --- | --- | --- |
| Bare sensor | 1334 | 0.16 | — |
| Polycarbonate x2 | 1156 | 0.27 | 0.10 |
| #1/#2 (averaged) | 872 | 0.31 | 0.18 |
| #3/#4 (averaged) | 783 | 0.30 | 0.21 |
| #7 | 712 | 0.31 | 0.20 |
| #10 | 712 | 0.30 | 0.21 |
| #5/#6 (averaged) | 623 | 0.34 | 0.22 |
| #8 | 578 | 0.34 | 0.24 |

According to the measurement, samples #01 and #02 with a discontinuous gradient of small to large particles reduced the force the least. Structures with incorporated hollow particles reduced the force the more than gradient structures with only solid particles. The densely packed particle structure of two particle types (hollow core-shell and solid) in sample #08 with the most hollow particles reduced the force the most. Second best were samples #05 and #06, which comprised a continuous gradient and included the hollow particles of 400 nm diameter. Also the densely packed particle structure of a single particle configuration in sample #07 reduced the force.

Example 6

Analysis of the Surface and Structure of Multilayer Composite Materials

To analyze the surface and structure of gradient layers, two types of gradient layer structures were produced using the method as described in Example 4. The types differed in the direction of the gradient. Specifically, five samples #11 with gradient 320-260-220-160-130-160-220-260-320 and three samples #12 with gradients 130-160-220-260-320-260-220-160-130 were produced. One of the goals of the analysis was to look at a cross section of the gradient layer structure with an environmental scanning electron microscope (SEM) and estimate the number of layers for each layer of nanoparticles with a specific size. The parameters of the production included a concentration of 2.5% (1:4 dilution) and spinning at 4000 rpm.

Figure 36:
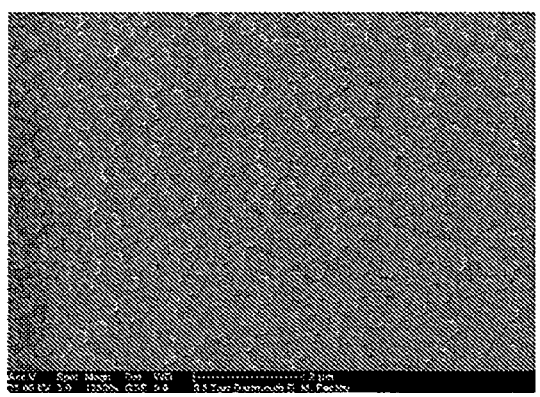
FIG. 36 is a scanning electron microscope image of a composite material.

FIGS. 36 to 39 show SEM images of the top surface and a cross-section for samples #11 and #12. The SEM of FIG. 36 shows the largest (320 nm) particles as the top layer. The top layer is little disorganized. The 260 nm layer below the top layer seemed closer to an hcp arrangement.

Figure 37:
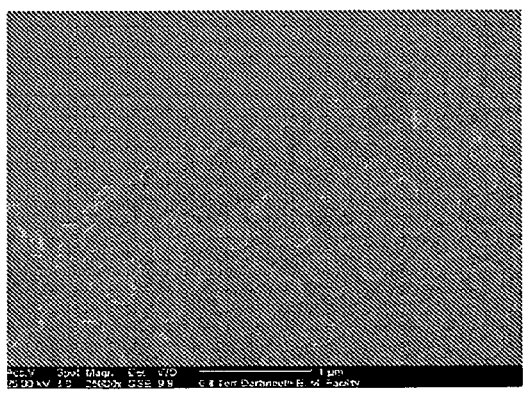
FIG. 37 is a scanning electron microscope image of a cross section of the composite material of FIG. 36.

The SEM of FIG. 37 is the edge view of the same film carefully broken and put into the microscope to look at the cross section, i.e., the break. The break was not a clean brake. Most of the layers going through the gradient could be identified. Looking also at lower layers of the gradient layer structure, it was estimated that the parameters resulted in gradient layer structures comprising monolayers for each of the particle sizes (herein also referred to as monolayer gradient). Accordingly, the applied deposition conditions (1:4 dilution and 4000 rpm spin speed) generated the monolayer gradients.

Based on the SEM measurement, the thickness was estimated to be about 900 nm. Due to the close packing in direction of the gradient, the sum of the sizes of the particles in each layer did not equal the measured thickness.

Figure 38:
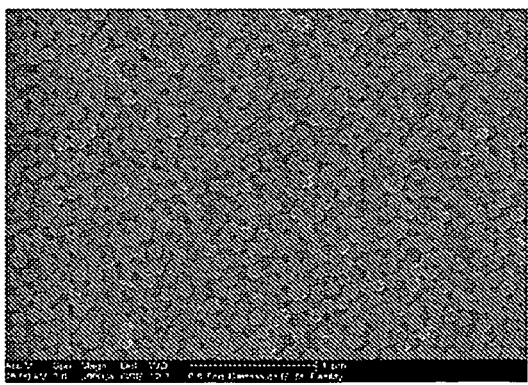
FIG. 38 is a scanning electron microscope image of a composite material.
Figure 39:
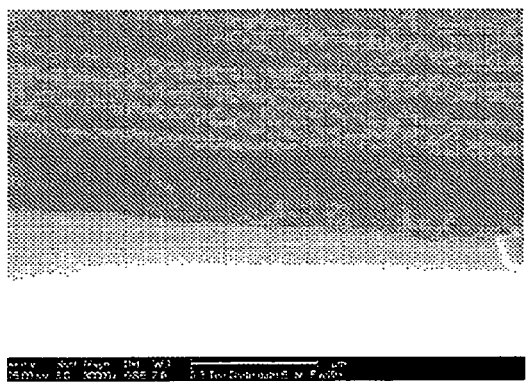
FIG. 39 is a scanning electron microscope image of a cross section of the composite material of FIG. 38.

As can be seen from similar SEM images reproduced in FIGS. 38 and 39, sample #12 was also produced as a monolayer gradient. That can be seen, for example, in the cross sectional view shown in FIG. 39. Based on the SEM measurement, the film was measured to be about 800 nm thick.

To confirm the thickness measurement, the films of samples #11 and #12 were measured using a profilometer. A section of the film was removed and a stylus was moved across the film until it moved to the bare substrate. Several measurements were taken and averaged to compensate for variations in the film thickness and the quality of the glass substrate. The average thickness for sample #11 was 960 nm and the average thickness for sample #12 was 1030 nm. These values agree with the SEM measurements and confirms the monolayer gradient structure.

Example 7

Hardness Test of Multilayer Composite Materials

To analyze the hardness of gradient layer structures, two types of gradient layer structures were produced using the method as described in Example 4. The types differed in the direction of the gradient. Specifically, sample #13 included four alternating gradients (with 17 layers in total) with particle sizes between 320 nm and 130 nm and between 130 nm and 320 nm. Sample #14 included two gradients (with nine layers in total) with particle sizes between 130 nm and 320 nm and 320 nm and 130 nm. The parameters of the production included a concentration of 2.5% (1:4 dilution) and spinning at 4000 rpm. One of the goals of the analysis was to characterize the surface hardness using nanoindentation-a technique to measure hardness on the nanoscale.

Nanoindentation presses a pyramidal tip with dimensions of a few tens of nanometers into the sample and measures the force applied as a function of the depth to which the tip is pushed into the sample. Multiple indentations were repeated at the same location on the sample. Specifically, 19 cycles of indentation and removal were made for the measurements. Measurements were made at two surface locations on the composite materials. Four different maximum force values at each surface location were used to allow for different maximum depths for indentation into the film.

Figure 40:
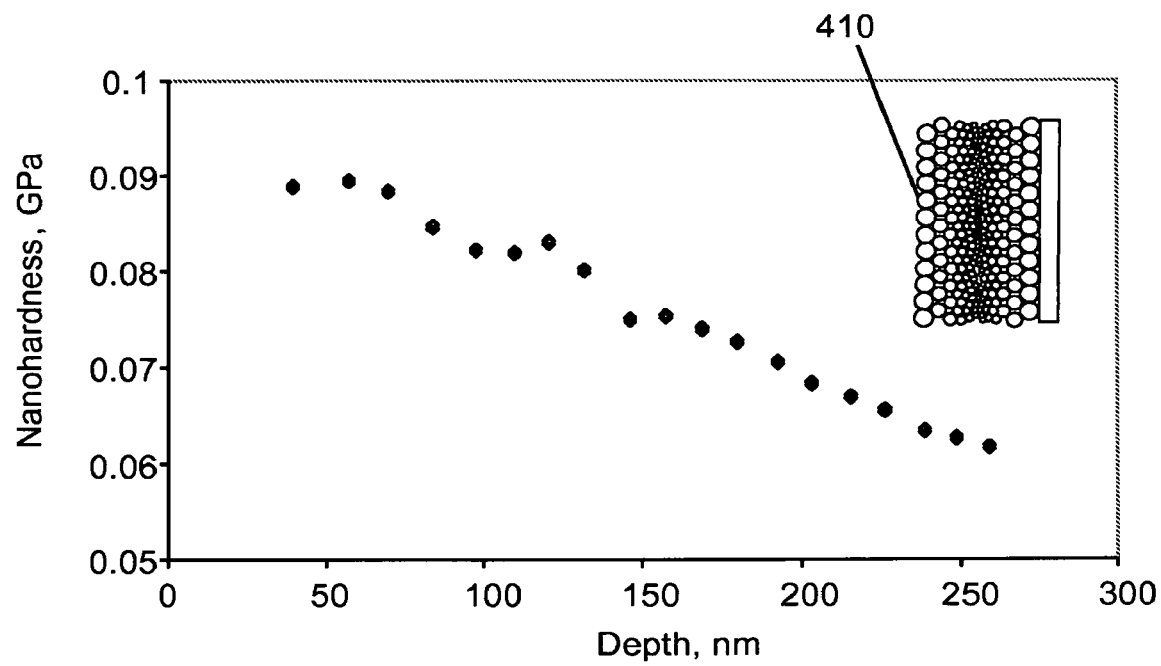
FIG. 40 is a plot of a depth-dependent hardness of a surface of a composite material.
Figure 41:
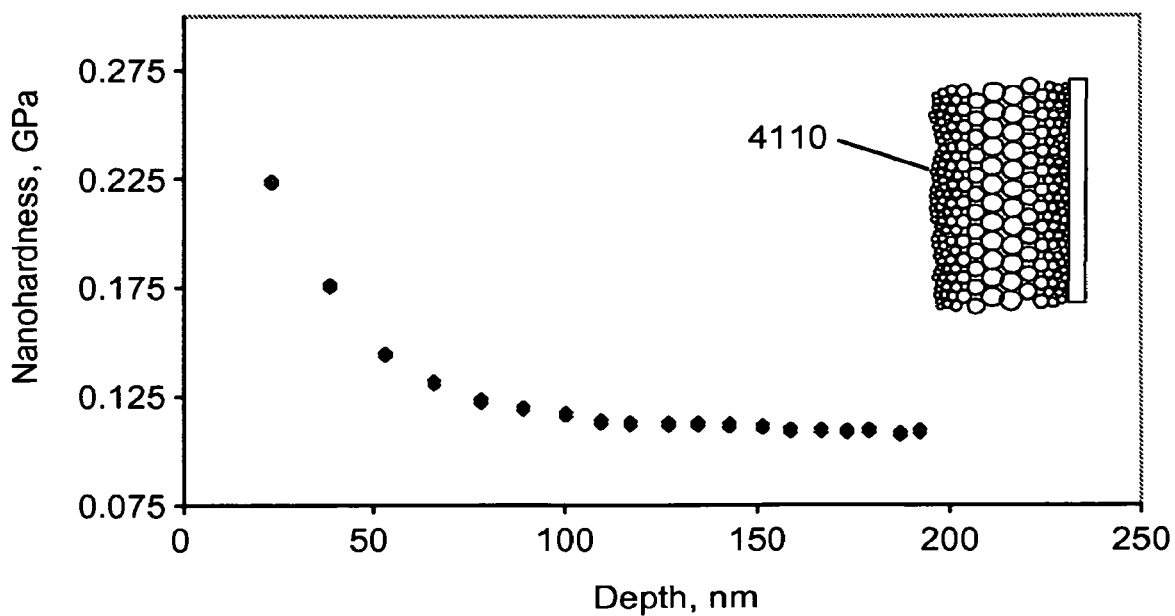
FIG. 41 is a plot of a depth-dependent hardness of a surface of a composite material.

FIGS. 40 and 41 show hardness plots for the samples #13 and #14, respectively, for a maximum force of 200 µN. Schematic representations 4010 and 4110 of the samples #13 and #14, respectively, are included in the top right corner of the plots and show that in sample #13 large particles form the surface, while in sample #14 small particles form the surface. The plots are representative for a series of measurements.

The force-depth curves were converted to nanohardness and Young's modulus data as a function of indentation depth. Young's modulus (E) is a measure of the stiffness of an elastic material such as a polymer. It is the ratio of the stress over the strain in the film and experimentally determined from the slope of a stress-strain curve. Nanohardness is defined as resistance to permanent or plastic deformation at the nano-micro level. Hardness is a measure of resistance to an indentation. Both properties are measurement technique dependent as there are different scales depending on the equipment used. Data from nanoindentation generally correlates with, but does not exactly agree numerically with measurements on a macroscale.

Arbitrarily, a depth of 200 nm was selected for averaging the values of hardness and elastic modulus for the four different forces at that point. The results for the two sampling sites on each of samples #13 and #14 were for sample #13: Hardness=0.050 GPa/0.045 GPa and Young's modulus=1.75 GPa/2.48 GPa and for sample #14: Hardness=0.102 GPa/0.067 GPa and Young's modulus=2.87 GPa/4.12 GPa. For comparison, the literature values for polystyrene in bulk from are Hardness=0.15 GPa and Modulus=2.2 GPa.

The derived nanohardness and Young's modulus seemed to depend on the gradient-although the effect is not large as the composite materials only comprised a two gradient structures. The values for the small-to-large-to-small gradient differed from those of the opposite orientation. The determined values were in the same range as those for a bulk thin film of polystyrene, but the fact that the two samples were different seemed to indicate that the packing of the nanoparticles influences these properties.

It was further assumed that the gradient was better defined away from the edge, i.e., in the center. In general, the films appeared to be slightly harder than the bulk.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A composition comprising:
a plurality of repeating units, wherein each of the plurality of repeating units comprises:
a first layer of first particles having a first mean diameter, and
a second layer of second particles having a second mean diameter; and an intermediary material selected from the list consisting of ionomers, polymers, polymerizable monomers, resins, cyclodextrins or combinations thereof, wherein said intermediary material allows mobility of and contact between the first particles within the first layer and mobility of and contact between the second particles within the second layer, whereby said contact allows momentum transfer between said particles, and wherein the first mean diameter and the second mean diameter are different and are less than 500 nm; and wherein the first particles or the second particles are core-shell particles having a core that is partly or completely filled with a liquid, a gas and/or a gel; and wherein the composition attenuates a compression wave.

2. The composition of claim 1, wherein the first particles or the second particles are polystyrene.

3. The composition of claim 1, wherein the first particles or the second particles are silica.

4. The composition of claim 3, wherein the first particles or the second particles are polarized.

5. The composition of claim 1, wherein the first particles or the second particles contain metal.

6. The composition of claim 5, wherein the first particles or the second particles are copper.

7. The composition of claim 1, wherein a composition of the first particles and a composition of the second particles are different.

8. The composition of claim 1, wherein at least a portion of the first particles in the first layer contact at least a portion of the second particles in the second layer.

9. The composition of claim 1, wherein at least a portion of the first particles or the second particles of a repeating unit are in contact with at least a portion of adjacent first particles or adjacent second particles of an adjacent repeating unit.

10. The composition of claim 1, further comprising a binding layer between a repeating unit and an adjacent repeating unit.

11. The composition of claim 1, wherein at least one of the plurality of repeating units is in contact with a substrate.

12. The composition of claim 11, wherein the substrate is at least a portion of an electronic device.

13. The composition of claim 11, wherein the substrate is glass.

14. The composition of claim 1, wherein the first mean diameter and the second mean diameter are less than 250 nm.

15. The composition of claim 1, wherein at least one of the plurality of repeating units comprises a third layer of third particles of a third mean diameter.

16. The composition of claim 1, wherein the first particles or the second particles comprise a binding coating.

17. The composition of claim 16, wherein the binding coating is hydrophobic.

18. The composition of claim 1, wherein the composition is transparent.

19. The composition of claim 1, wherein the core-shell particles are partly or completely filled with a fire suppressant, a foaming agent, a medically active agent or a dye.

* * * * *